(12) United States Patent
Asanuma et al.

(10) Patent No.: US 9,575,167 B2
(45) Date of Patent: Feb. 21, 2017

(54) RADAR APPARATUS AND SIGNAL PROCESSING METHOD

(71) Applicant: FUJITSU TEN LIMITED, Kobe-shi, Hyogo (JP)

(72) Inventors: Hisateru Asanuma, Kobe (JP); Hiroyuki Ishimori, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 140 days.

(21) Appl. No.: 14/103,481

(22) Filed: Dec. 11, 2013

(65) Prior Publication Data
US 2014/0292559 A1    Oct. 2, 2014

(30) Foreign Application Priority Data

Mar. 29, 2013  (JP) ................. 2013-073554

(51) Int. Cl.
| | |
|---|---|
| G01S 13/93 | (2006.01) |
| G01S 13/06 | (2006.01) |
| G01S 13/34 | (2006.01) |
| G01S 13/536 | (2006.01) |
| G01S 13/72 | (2006.01) |
| G01S 13/46 | (2006.01) |

(52) U.S. Cl.
CPC ............ *G01S 13/06* (2013.01); *G01S 13/345* (2013.01); *G01S 13/536* (2013.01); *G01S 13/931* (2013.01); *G01S 13/726* (2013.01); *G01S 2013/462* (2013.01); *G01S 2013/9375* (2013.01)

(58) Field of Classification Search
CPC ....... G01S 13/06; G01S 13/536; G01S 13/345
USPC .......................................................... 342/70
See application file for complete search history.

(56) References Cited

U.S. PATENT DOCUMENTS

| | | | | |
|---|---|---|---|---|
| 6,018,308 A | * | 1/2000 | Shirai | ..................... G01S 7/412 342/118 |
| 6,404,328 B1 | * | 6/2002 | Alland | ..................... G01S 7/411 340/435 |
| 6,812,882 B2 | * | 11/2004 | Ono | ........................ G01S 13/34 342/114 |

(Continued)

FOREIGN PATENT DOCUMENTS

| | | |
|---|---|---|
| JP | A-2001-191876 | 7/2001 |
| JP | 2004-198438 A | 7/2004 |
| JP | 2011-191195 A | 9/2011 |

OTHER PUBLICATIONS

Apr. 10, 2015 Extended European Search Report issued in European Patent Application No. 13197506.2.

(Continued)

*Primary Examiner* — Marcus Windrich
(74) *Attorney, Agent, or Firm* — Oliff PLC

(57) ABSTRACT

There is provided a radar apparatus capable of emitting a transmission wave relating to a transmitting signal which is frequency-modulated, and receiving a reflection wave coming from a target at which the transmission wave is reflected as a receiving signal, to derive at least position information of the target based on the receiving signal. A deriving unit derives a fluctuation value of a signal level relating to the receiving signal for a stationary target among the targets. A calculating unit calculates a fluctuation integrated value integrated by the fluctuation value. A judging unit judges the stationary target as a target other than a control subject if the fluctuation integrated value is below a predetermined threshold.

10 Claims, 36 Drawing Sheets

(56) References Cited

U.S. PATENT DOCUMENTS

| | | | | |
|---|---|---|---|---|
| 2003/0076255 A1* | 4/2003 | Ono | ............ | G01S 13/34 |
| | | | | 342/70 |
| 2006/0227037 A1* | 10/2006 | Ando | ............ | G01S 7/4017 |
| | | | | 342/70 |
| 2011/0221628 A1* | 9/2011 | Kamo | ............ | G01S 7/295 |
| | | | | 342/70 |
| 2011/0298656 A1* | 12/2011 | Bechler | ............ | G01S 13/931 |
| | | | | 342/26 R |
| 2012/0200450 A1* | 8/2012 | Ishimori | ............ | G01S 13/931 |
| | | | | 342/70 |
| 2013/0038484 A1* | 2/2013 | Ohkado | ............ | G01S 13/345 |
| | | | | 342/70 |
| 2013/0261950 A1* | 10/2013 | Sasabuchi | ............ | B61L 23/041 |
| | | | | 701/301 |
| 2014/0111369 A1* | 4/2014 | Oh | ............ | G01S 15/931 |
| | | | | 342/52 |

OTHER PUBLICATIONS

Mar. 31, 2016 Office Action issued in European Application No. 13 197 506.2.

Nov. 29, 2016 Office Action issued Japanese Patent Application No. 2013-073554.

* cited by examiner

FIG. 7
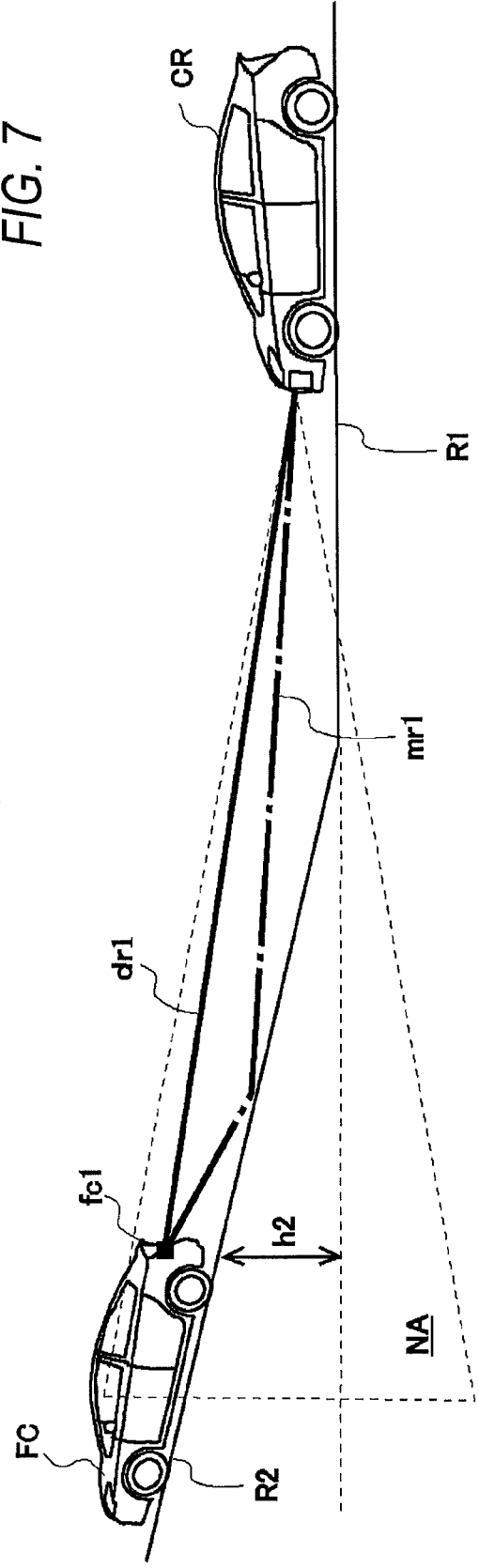
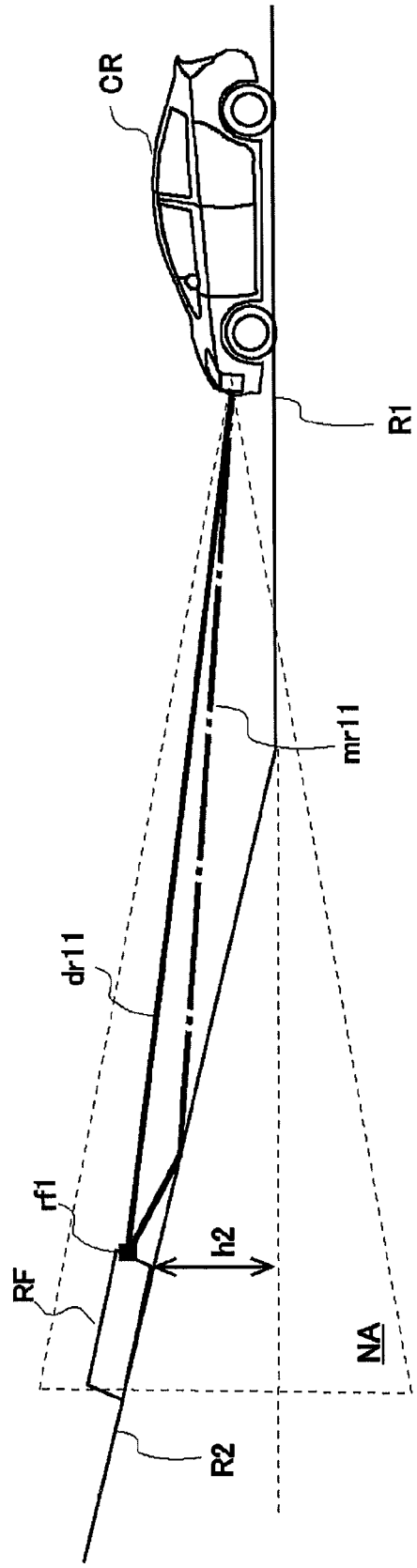

FIG. 9
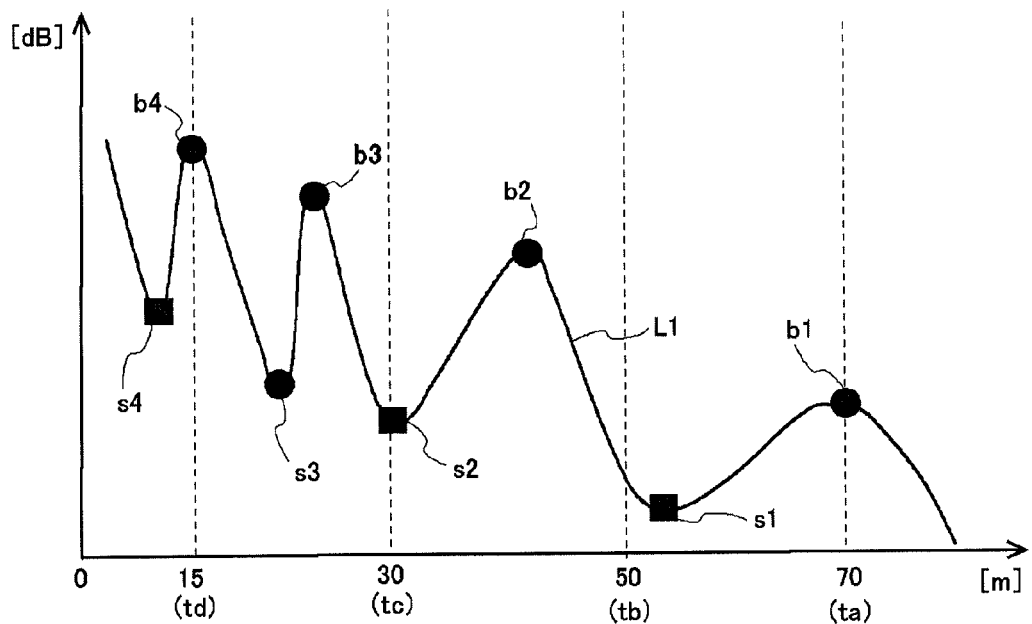
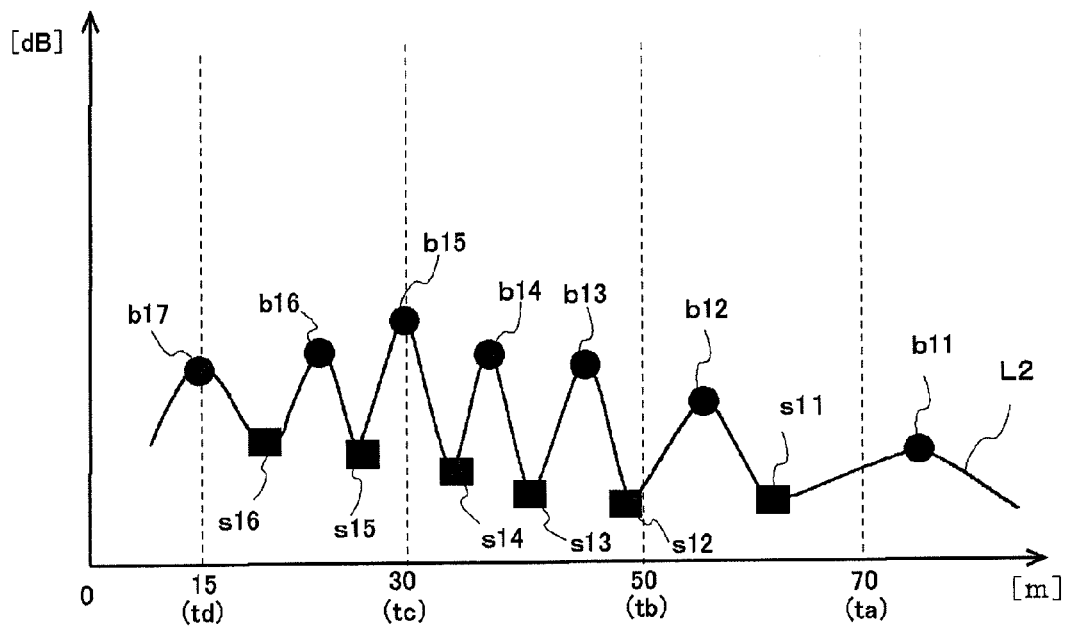

FIG. 13
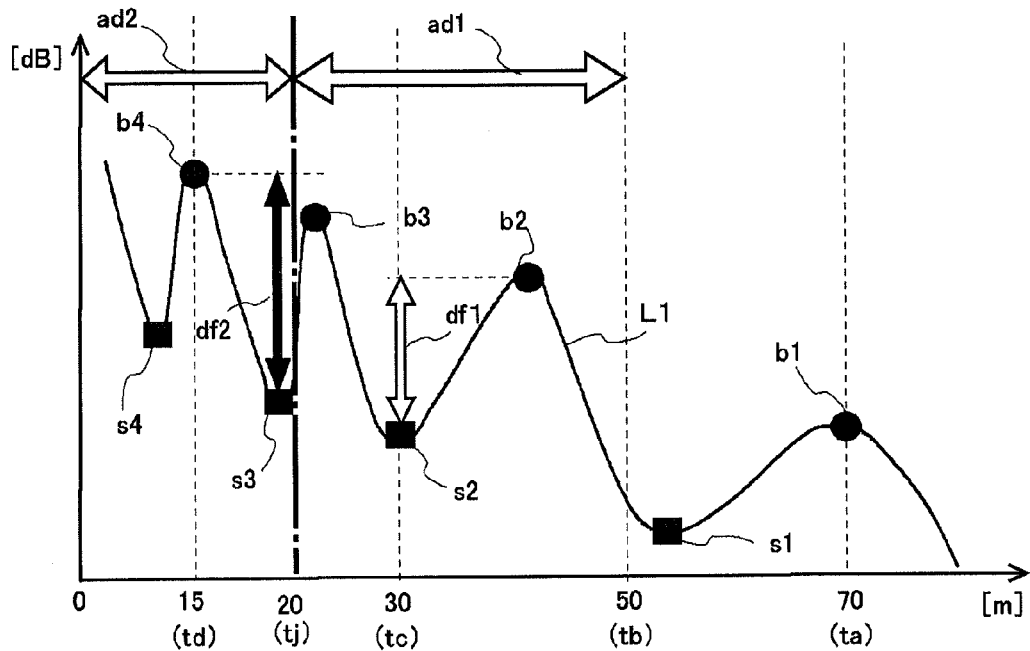
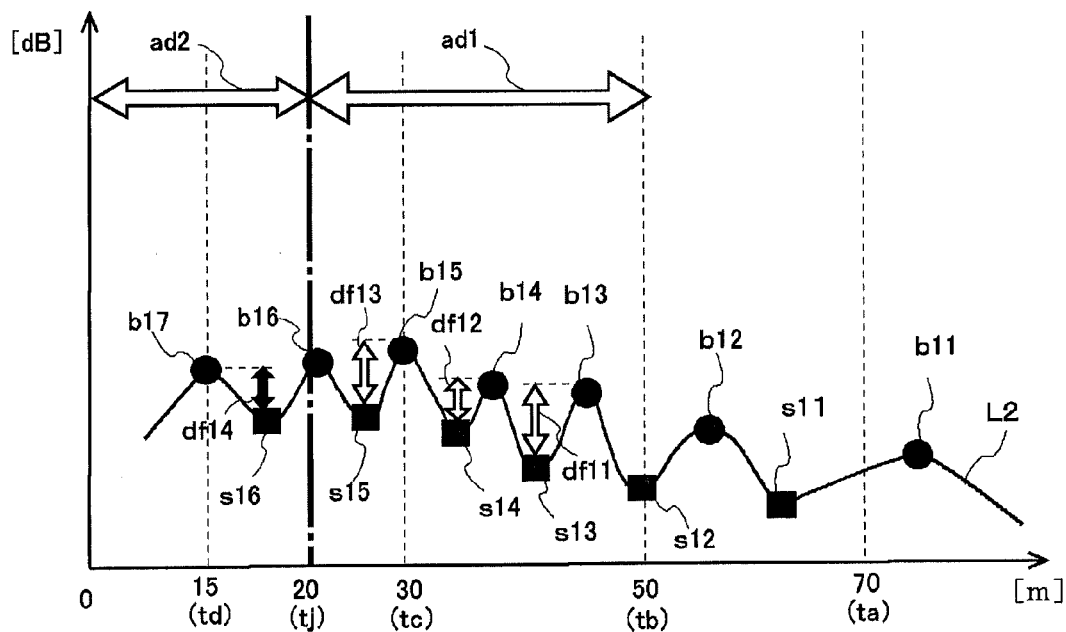

RADAR APPARATUS AND SIGNAL PROCESSING METHOD

CROSS-REFERENCE TO RELATED APPLICATIONS

This application is based on and claims priority from Japanese Patent Application No. 2013-073554 filed on Mar. 29, 2013.

TECHNICAL FIELD

The present invention relates to a signal process for derivation of a target.

BACKGROUND

In the past, a radar apparatus provided in a vehicle derives moving targets corresponding to other vehicles (hereinafter referred to as a preceding vehicle) traveling in the same traffic lane as a traveling subject vehicle ahead of the subject vehicle, and stationary targets (hereinafter referred to as a stationary target) corresponding to other vehicles (hereinafter referred to as a stopped vehicle) stopped in the same traffic lane as the traveling subject vehicle ahead of the vehicle. Further, the radar apparatus derives stationary targets (hereinafter referred to as an on-road object) corresponding to objects (hereinafter referred to as an on-road object) installed on a road surface of the traffic lane, such as a manhole or a joint member for jointing a road and a road, ahead of the subject vehicle traveling in the same traffic lane.

In a case where the stationary target is derived from the moving target and the stationary target, the radar apparatus derives target information including position information, such as a distance of these targets, and relative speed information to output the vehicle information to a vehicle control device capable of controlling a behavior of the vehicle. The reason why the radar apparatus outputs the target information about the moving target or the stationary target to the vehicle control device is that the vehicle control device executes, for example, the control of ACC (Adaptive Cruise Control) or PCS (Pre-Crash Safety System) based on the target information. That is, the radar apparatus outputs the target information about the moving target to the vehicle control device to execute the control of the ACC follow-up traveling in a state in which inter-vehicular distance between the vehicle and the preceding vehicle is constantly maintained. In addition, the radar apparatus outputs the target information about the moving target to the vehicle control device to execute the control of the PCS capable of preventing collision between the stationary target and the vehicle or alleviate the effect of the collision.

Since the vehicle cannot cross over the on-road target, contrary to the stationary target, the on-road target is one which is not necessary to be output to the vehicle control device from the radar apparatus. That is, in the case where the vehicle control device executes the control of the ACC or the PCS, the on-road target is the stationary target other than the control subject.

For this reason, to correctly determine whether the derived stationary target is the stationary target or the on-road target, the radar apparatus judges a kind of the target, for example, based on a signal level relating to a receiving signal of the stationary target and a signal level relating to a receiving signal of the on-road target.

Specifically, since the stationary target has a height of a vehicular body to a certain extent, a reception antenna of the radar apparatus receives a reflection wave (hereinafter referred to as a direct wave) outputted from the transmission antenna and then directly reflected from the stationary target, or receives a reflection wave of multi-path (hereinafter referred as a multi-path wave) reflected from the road surface at which the reflection wave from the stationary wave is reflected.

Since the multi-path wave is received by the reception antenna in delayed timing relative to the direct wave, a frequency and phase of the multi-path wave are different from those of the direct wave. In a case where the receiving signal (hereinafter referred to as a direct signal) of the direct wave and a receiving signal (hereinafter referred to as a multi-path signal) of the multi-path signal which have the frequency difference and the phase difference are synthesized, a receiving signal having a given amplification variation is generated. As the vehicle approaches the stationary target and thus a distance between the vehicle and the stationary target becomes short, the signal levels of the direct signal and the signal level of the multi-path signal are increased. For this reason, the amplification variation of the receiving signal of the stationary target is characterized by being increased as the distance between the vehicle and the stationary target becomes short.

Meanwhile, since the on-road target hardly has any height in a height direction of the vehicle, the radar apparatus does not receive the multi-path wave, but receives the direct wave. for this reason, the receiving signal of the on-road target becomes a value of a substantially constant signal level with almost no amplitude variation. Further, as the distance between the vehicle and the on-road target becomes short, the value of the signal level of the receiving signal is increased, but in a case where the distance between the vehicle and the on-road target is below a predetermined distance, the on-road target has hardly a height relative to the height of the vehicular body, so that the on-road target is out of a transmission region of the transmission wave of the radar apparatus. As a result, the value of the signal level of the receiving signal is characterized by being abruptly decreased if the distance of the on-road target is below the predetermined distance. That is, the receiving signal of the on-road target is characterized in that the amplitude variation is hardly generated, and if the distance between the vehicle and the on-road target is below the predetermined distance, the value of the signal level is abruptly decreased. A technology for interrupting the control of the vehicle to the on-road target is disclosed in the case where the stationary target is judged as the on-road target based on the above-described features of the receiving signal levels of the stationary target and the on-road target (e.g., see Patent Document 1)

Patent Document 1: Japanese Patent Application Publication No. 2001-191876A

However, in a case where a slope of the road surface on which the vehicle exists is different from that of the road surface on which the on-road target exists, the feature of the receiving signal of the on-road target may be changed. Specifically, the road surface on which the on-road target exists has a slope such as an ascent, contrary to the road surface on which the vehicle exists, since the on-road target exists at a high position to a certain extent in a height direction (hereinafter referred to as a reference direction) on the basis of the road surface on which the vehicle exists (i.e., flat road surface with respect to the road surface of the ascent on which the on-road target exists), the on-road target has a certain height with respect to the position on which the vehicle exists. In the case where the on-road target exists on the road surface of the ascent, the direct wave and the multi-path wave are generated from the transmission wave of the on-road target, similar to the stationary wave, and are synthesized to generate a receiving signal having an amplitude variation.

As the vehicle comes close to the on-road target and thus the distance between the vehicle and the on-road target becomes short, the signal levels of the direct signal and the multi-path signal are increased. Therefore, there is a feature in that as the distance becomes short, the amplitude variation of the receiving signal resulted by synthesizing the direct signal and the multi-path signal is relatively increased. That is, the feature of the signal level relating to the receiving signal of the on-road signal existing on the road surface having the slope of the ascent is identical to the feature of the signal level relating to the signal level relating to the receiving signal of the stationary target. For this reason, the radar apparatus may judge the receiving signal as the stationary target other than the control subject of the vehicle control device, and judges the target information about the stationary target which is not output to the vehicle control device, as the stationary target of the control subject to output it to the vehicle control device.

SUMMARY

It is therefore an object of the present invention to provide a technology of reliably judging a stationary target other than a control subject.

(1) According to an aspect of the embodiments of the present invention, there is provided a radar apparatus capable of emitting a transmission wave relating to a transmitting signal which is frequency-modulated, and receiving a reflection wave coming from a target at which the transmission wave is reflected as a receiving signal, to derive at least position information of the target based on the receiving signal, the radar apparatus comprising: a deriving unit configured to derive a fluctuation value of a signal level relating to the receiving signal for a stationary target among the targets; a calculating unit configured to calculate a fluctuation integrated value integrated by the fluctuation value; and a judging unit configured to judge the stationary target as a target other than a control subject if the fluctuation integrated value is below a predetermined threshold.

(2) The radar apparatus according to (1), wherein the signal level relating to the receiving signal is a signal level of an angular signal.

(3) The radar apparatus according to (1) or (2), wherein the fluctuation value is a value derived from a maximum value and a minimum value of the signal level.

(4) The radar apparatus according to (3), wherein the deriving unit derives the fluctuation value from the maximum value to the minimum value if the stationary target exists at a position which is above a predetermined distance, and derives the fluctuation value from the minimum value to the maximum value if the stationary target exists at a position which is below the predetermined distance.

(5) The radar apparatus according to any one of (1) to (4), wherein the judging unit is configured to easily judge the stationary target as a target other than the control subject if a moving target exists at a distance closer than the stationary target.

(6) The radar apparatus according to any one of (1) to (5), wherein the calculating unit increases an integration rate of the fluctuation value as the signal level is high.

(7) The radar apparatus according to any one of (1) to (6), further comprising a target judging unit configured to judge whether or not there is a diverged target which is an other stationary target belonging to the same object as the stationary target, wherein the judging unit does not perform the judgment if the diverged target exists.

(8) The radar apparatus according to any one of (1) to (7), further comprising a continuous target judging unit configured to judge whether or not there is a continuous stationary target which continuously exists in a traveling direction of a vehicle mounted with the radar apparatus at a side of a traffic lane on which the vehicle is traveling, wherein if the continuous stationary target exists, the judging unit does not perform the judgment when the stationary target has a substantially symmetrical positional relation to the other stationary target with respect to the continuous stationary target.

(9) The radar apparatus according to (7), further comprising a continuous target judging unit configured to judge whether or not there is a continuous stationary target which continuously exists in a traveling direction of a vehicle mounted with the radar apparatus at a side of a traffic lane on which the vehicle is traveling, wherein the target judging unit changes a judgment condition of the diverged target if the continuous stationary target exists.

(10) According to another aspect of the embodiments of the present invention, there is provided a signal processing method of emitting a transmission wave relating to a transmitting signal which is frequency-modulated, and receiving a reflection wave coming from a target at which the transmission wave is reflected as a receiving signal, to derive at least position information of the target based on the receiving signal, the signal processing method comprising: deriving a fluctuation value of a signal level relating to the receiving signal for a stationary target among the targets; calculating a fluctuation integrated value integrated by the fluctuation value; and judging the stationary target as a target other than a control subject if the fluctuation integrated value is below a predetermined threshold.

According to the aspects of (1) to (10), if the fluctuation integrated value is below the predetermined threshold, the stationary target is judged as the target other than the control subject. Therefore, it is possible to reliably distinguish the stationary target to be controlled and the stationary target other than the control subject, thereby preventing the execution of an unnecessary control.

According to the aspect of (2), since the signal level relating to the receiving signal is the signal level of the angular signal, it is possible to judge whether the stationary target to be judged, among the plurality of stationary targets, is to be controlled or not.

According to the aspect of (3), since the fluctuation value is the value derived from the maximum value and the minimum value of the signal level, it is possible to define a feature of the signal level in the stationary target to be controlled and a feature of the signal level in the stationary target other than the control subject.

According to the aspect of (4), since the deriving unit derives the fluctuation value from the maximum value to the minimum value, if the stationary target exists at the position which is above the predetermined distance, and derives the fluctuation value from the minimum value to the maximum value, if the stationary target exists at the position which is below the predetermined distance, it is possible to perform the correct judgment based on the feature appearing in the signal level of the stationary target other than the control subject, if it approaches above a predetermined distance.

According to the aspect of (5), since the judging unit is configured to easily judge the stationary target as the target other than the control subject if the moving target exists at the distance closer than the stationary target, it is possible to easily judge the stationary target as the stationary target other than the control subject. In other words, it is difficult to judge the stationary target as the target of the control subject. If the stationary target is incorrectly judged as the target of the control subject despite the target other than the control subject, and thus the moving target exists ahead of the stationary target, the target of the control subject is a moving target closer to the vehicle, but a wrong control, such as deceleration, is executed for the stationary target at the time when the moving target passes the stationary target. If the stationary target is a stationary target which becomes a correct control subject, the moving target ahead of the vehicle avoids the stationary target, such as deceleration. Therefore, there is no problem if the vehicle is controlled for the moving object. Accordingly, if the moving target exists ahead of the stationary target, it is hard to judge the stationary target as the target of the control subject, thereby preventing the wrong control due to the wrong judgment.

According to the aspect of (6), since the calculating unit increases the integration rate of the fluctuation value as the signal level is high, a difference between the signal level of the stationary target to be controlled, and the signal level of the stationary target other than the control subject becomes apparent, thereby correctly performing the judgment of the on-road target.

According to the aspect of (7), since the judgment is not performed if the diverged target exists, it is possible to prevent misjudgment in which the stationary target other than the control subject is judged as the stationary target to be controlled, thereby decreasing a process load caused by judging whether it is the stationary target other than the control subject.

According to the aspect of (8), since if the continuous stationary target exists, the judging unit does not perform the judgment when the stationary target has a substantially symmetrical positional relation with the other stationary target, with the continuous stationary target being interposed between the stationary target and the other stationary target, it is possible to prevent mis-judgment in which the stationary target other than the control subject is judged as the stationary target to be controlled, thereby decreasing a process load caused by judging whether it is the stationary target other than the control subject.

According to the aspect of (9), since the target judging unit changes a judgment condition of the diverged target if the continuous stationary target exists, it is possible to prevent the mis-judgment which judges the stationary target other than the control subject as the stationary target to be controlled, irrespective of driving circumference of the vehicle.

BRIEF DESCRIPTION OF THE DRAWINGS

In the accompanying drawings:
FIG. 7 is a diagram describing a reflection wave in cases where a vehicle and a stopped vehicle, and the vehicle and an on-road object are away from each other at a first distance, respectively;
FIG. 9 is a changing graph of an angular signal;
FIG. 13 is a graph illustrating a fluctuation value of the angular signal.

DETAILED DESCRIPTION OF THE EMBODIMENTS

Hereinafter, embodiments of the present invention will now be described with reference to the accompanying drawings. It should be noted that the technical scope of the present invention is not limited to embodiments described herein, but it is defined by the appended claims and their equivalents.

First Embodiment

1. Configuration

<1-1. View of Overall Vehicle>

Figure 1:
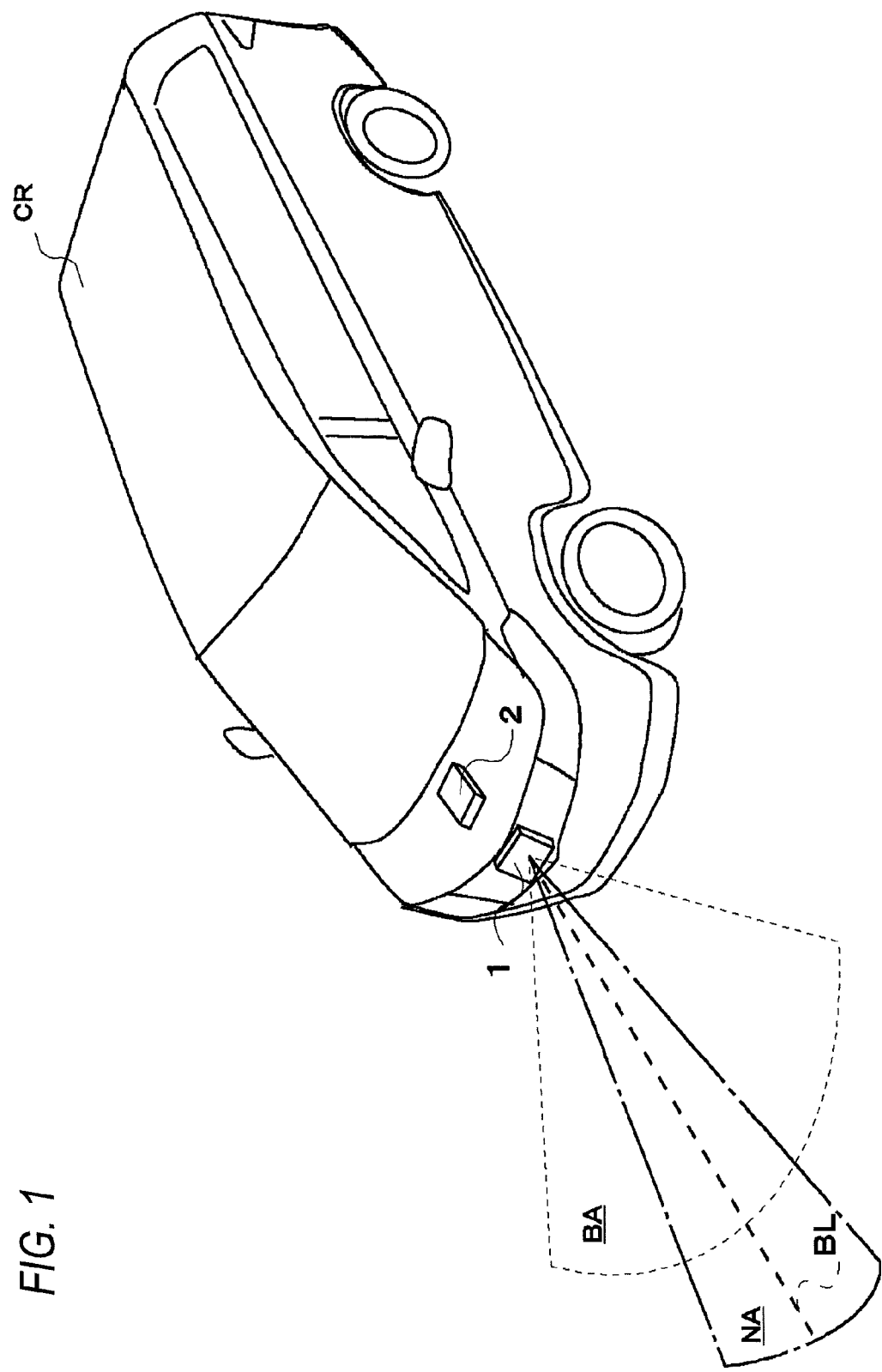
FIG. 1 is a diagram of an overall vehicle.

FIG. 1 is a view of an overall vehicle CR. The vehicle CR usually includes a radar apparatus 1 and a vehicle control device 2 which are provided in a vehicle control system 10 according to this embodiment. The radar apparatus 1 is installed near a bumper in front of the vehicle CR. The radar apparatus 1 scans a given scanning scope through once scanning to derive a distance corresponding to a traveling direction of the vehicle CR between a target and the vehicle CR, that is, a vertical distance when the reflection wave reflected from the target arrives at a reception antenna of the radar apparatus 1. Also, the radar apparatus 1 derives a horizontal distance which is a distance between the vehicle CR and the target in a horizontal direction (vehicle width direction) of the vehicle CR. Specifically, the horizontal distance is a distance of the target with respect to the vehicle CR in a direction substantially perpendicular to a reference axis BL which imaginarily extends in a traveling direction of the vehicle CR. For example, supposing that the reference axis BL is ±0 m, a left direction of the vehicle CR is a negative value of the horizontal distance, while a right direction of the vehicle CR is a positive value of the horizontal distance. In this instance, the horizontal distance is derived by performing a trigonometric operation function based on information about an angle of the target with respect to the vehicle CR and the vertical distance. In this way, the radar apparatus 1 derives a position of the target with respect to the vehicle CR. Further, the radar apparatus 1 derives a relative speed which is a speed of the target with respect to the speed of the vehicle CR.

In this instance, FIG. 1 shows a beam pattern of a transmission wave transmitted from two transmission antennas (transmission antenna 13a and transmission antenna 13b illustrated in FIG. 2) of the radar apparatus which will be described later. Supposing that the reference axis BL is an angle ±0 degree, a beam pattern NA of the transmission wave outputted from the transmission antenna 13a has a narrow angular range (e.g., ±6 degrees) in comparison to a beam pattern BA of the transmission wave outputted from the transmission antenna 13b, and is output as a relatively sharp beam pattern having a long vertical distance. The reason of the long vertical distance is that an output level outputting the transmission wave is relatively high.

Contrary to this, the beam pattern BA of the transmission wave outputted from the transmission antenna 13b has a wide angular range (e.g., ±10 degrees) in comparison to the beam pattern NA of the transmission wave outputted from the transmission antenna 13a, and is output as a relatively broad beam pattern having a short vertical distance. The reason for short vertical distance is that the output level outputting the transmission wave is relatively low. By outputting a transmission wave of a different beam pattern at each a transmission period of a transmission period in which the transmission antenna 13a outputs the transmission wave, and a transmission period in which the transmission antenna 13b outputs the transmission wave, it is possible to prevent an error in each derivation due to phase aliasing of the reflection wave from the target. The process of deriving the angle of the target will be described later.

A mount position of the radar apparatus 1 in FIG. 1 is near the front bumper of the vehicle, but it is not limited to the vicinity of the front bumper of the vehicle. As long as the position derives the target according to a purpose of controlling the vehicle CR by the vehicle control device 2 which will be described later, other mount position, such as a rear front portion of the vehicle CR or a side mirror of a lateral portion of the vehicle CR, is possible.

The vehicle CR includes the vehicle control device 2 in the vehicle CR. The vehicle control device 2 is an ECU (Electronic Control Unit) for controlling each device of the vehicle Cr.

<1-2. System Block Diagram>

Figure 2:
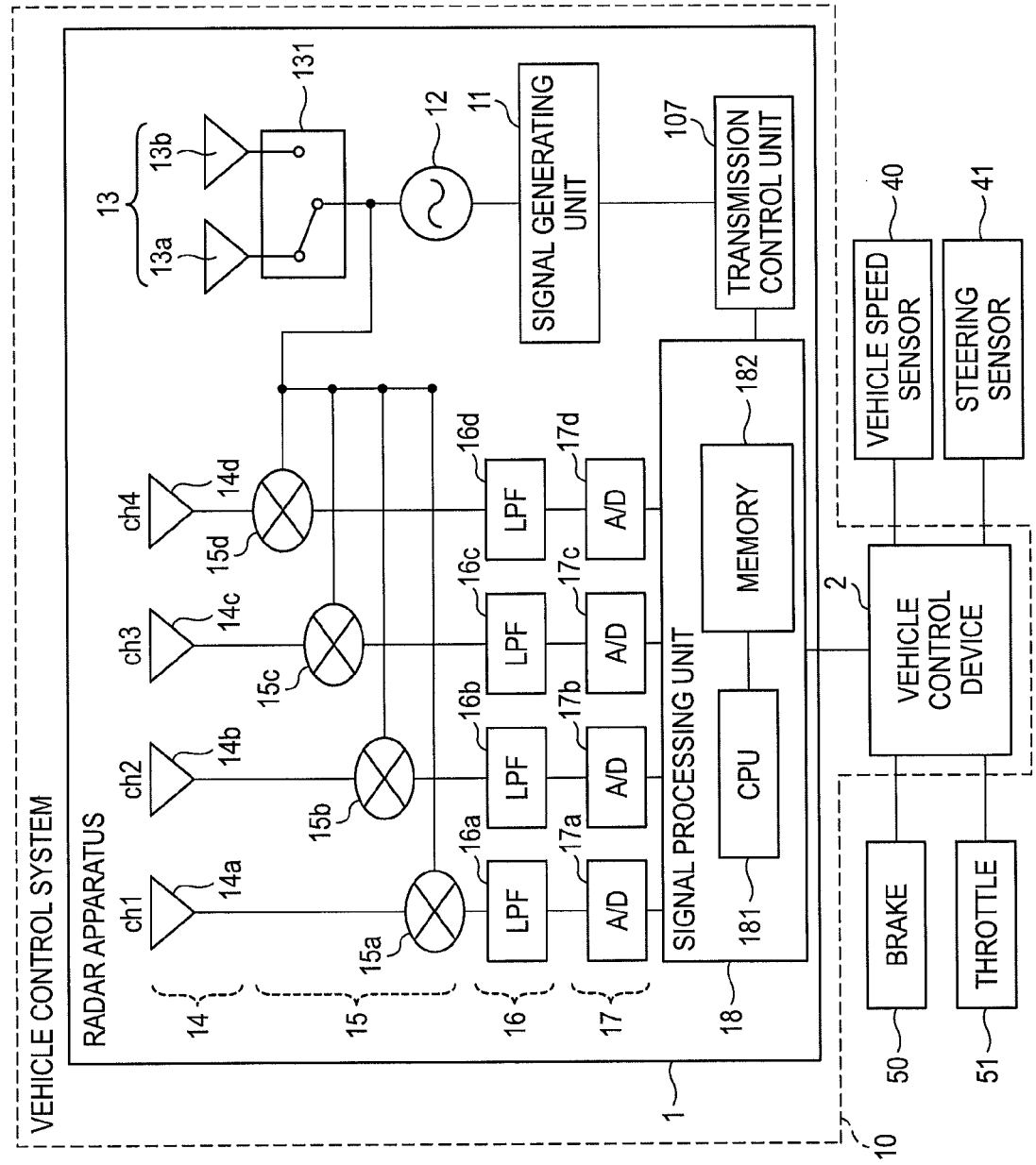
FIG. 2 is a block diagram of a vehicle control system.

FIG. 2 is a block diagram of the vehicle control system 10. The vehicle control system 10 is configured so that the radar apparatus 1 and the vehicle control device 2 are electrically connected to each other, and the target information on the position and the relative speed of the target which are usually derived from the radar apparatus is output to the vehicle control device 2. That is, the radar apparatus 1 outputs the target information including the vertical distance, the horizontal distance, and the relative speed of the target with respect to the vehicle CR to the vehicle control device 2. The vehicle control device 2 outputs operation of various devices of the vehicle CR based on the target information. In addition, the vehicle control device 2 of the vehicle control system 10 is electrically connected to various sensors provided in the vehicle CR, such as a vehicle speed sensor 40 and a steering sensor 41. Further, the vehicle control device 2 is electrically connected to various devices provided in the vehicle CR, such as a brake 50 and a throttle 51.

The radar apparatus 1 generally includes a signal generating unit 11, an oscillator 12, a transmission antenna 13, a reception antenna 14, a mixer 15, an LPF (Low Pass Filter) 16, an AD (Analog/Digital) converter 17, and a signal processing unit 18.

The signal generating unit 11 generates a modulation signal, for example, of which a voltage is changed in a triangular-wave shape based on a control signal of a transmission control unit 107 which will be described later.

The oscillator 12 is a voltage control oscillator for controlling an oscillation frequency with a voltage, and frequency-modulates a signal of a given frequency band (e.g., a signal of a frequency band of which a center frequency is 76.5 GHz), based on the modulated signal generated from the signal generating unit 11, to output it to the transmission antenna 13 as a transmitting signal.

The transmission antenna 13 outputs a transmission wave relating to the transmitting signal to the outside of the vehicle. The radar apparatus 1 according to this embodiment includes two transmission antennas, that is, a transmission antenna 13a and a transmission antenna 13b. The transmission antennas 13a and 13b are switched in a predetermined period by a switching of a conversion unit 131, and the transmission wave is continuously output to the outside of the vehicle from the transmission antenna 13 connected to the oscillator 12. The transmission antenna 13a and the transmission antenna 13b have a different arrangement (antenna pattern) of antenna elements. Therefore, the beam pattern of the transmission wave transmitted from the transmission antennas 13a and 13b is different from each other, as illustrated in FIG. 1.

The conversion unit 131 is a switch for converting a connection of the oscillator 12 and the transmission antenna 13, and connects the oscillator 12 and any one of the transmission antenna 13a and the transmission antenna 13b according to the signal of the transmission control unit 107.

The reception antenna 14 is a plurality of array antennas receiving a reflection wave coining from the target at which the transmission wave continuously transmitted from the transmission antenna 13 is reflected. In this embodiment, the reception antenna 14 includes four reception antennas, that is, reception antennas 14a(ch1), 14b(ch2), 14c(ch3) and 14d(ch4). Each antenna of the reception antennas 14a to 14d is arranged at a regular interval.

The mixer 15 is provided at each reception antenna. The mixer 15 mixes the receiving signal and the transmitting signal. A beat signal which is a difference between both signals, that is, the transmitting signal and the receiving signal, is generated by mixing the transmitting signal and the receiving signal, and is output to the LDF 16.

The transmitting signal and the receiving signal which generate the beat signal will now be described by taking a signal processing method of FM-CW (Frequency Modulated Continuous Wave) as an example with reference to FIG. 3. Although the FM-CW method will be described as an example in this embodiment, the present invention is not limited to this method, if the method derives the target by combining a plurality of periods, such as an up period in which the frequency of the transmitting signal ascends, and a down period in which the frequency of the transmitting signal descends.

Figure 3:
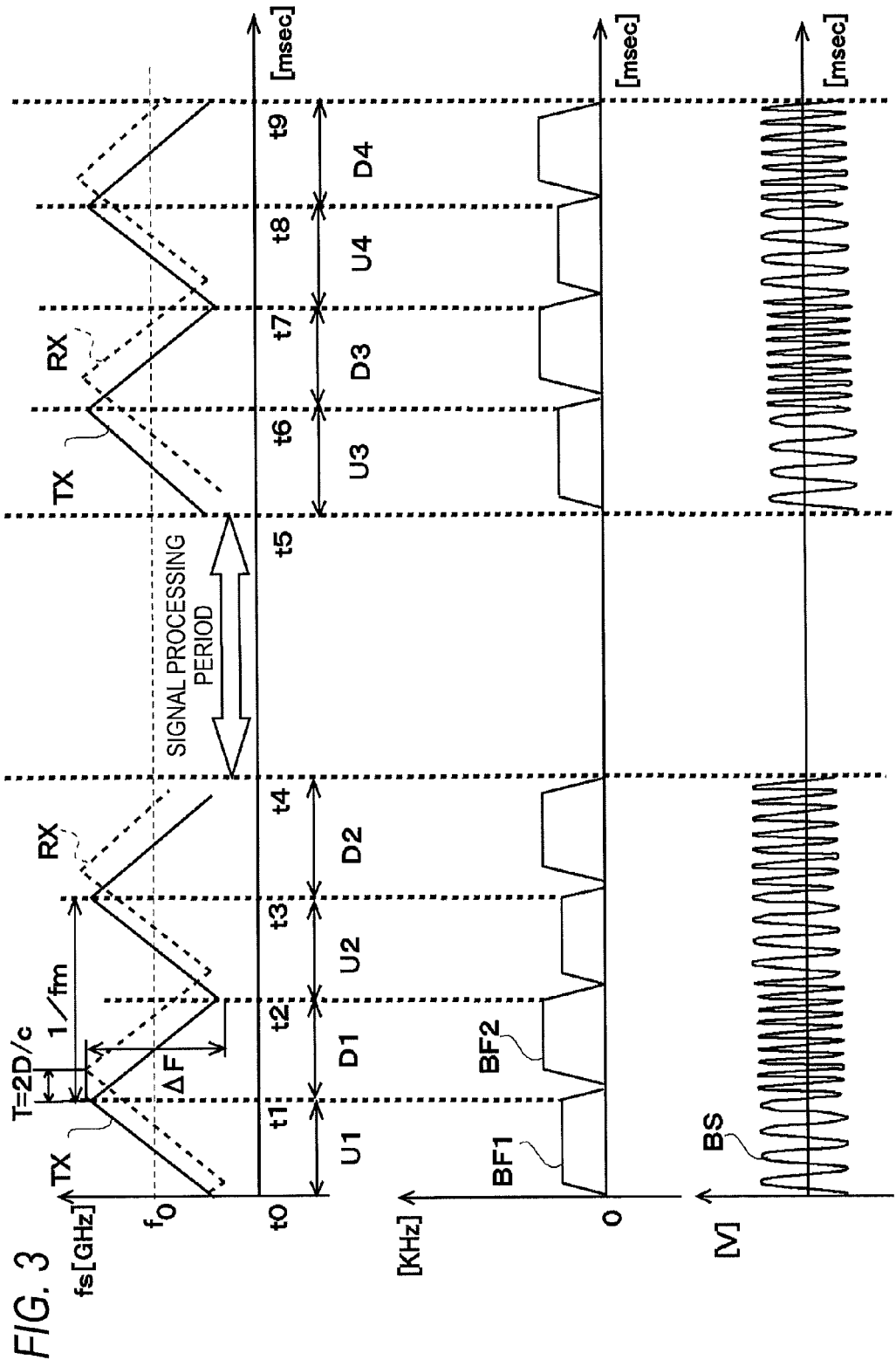
FIG. 3 is a diagram illustrating an FM-CW type signal.

Symbols that appear in expressions described below and signals and beat frequencies of the FM-CW shown in FIG. 3 are as follows: fr: distance frequency, fd: speed frequency, Fo: center frequency of a transmission wave, ΔF: frequency deviation width, fm: repetition frequency of a modulation wave, c: speed of light (speed of a wave), T: reciprocating time of a wave between the vehicle CR and the target, fs: transmission/reception frequency, R: vertical distance, V: relative speed, θm: angle of the target, θup: angle corresponding to a peak signal in the up period, and θdn: angle corresponding to a peak signal in the down period.

2. FM-CW Signal Processing

As one example of the signal processing used for the process of deriving the target, the signal processing method of FM-CW (Frequency Modulated Continuous Wave) will be described. Although the FM-CW method will be described as an example in this embodiment, the present invention is not limited to this method, if the method derives the position of the target or the like by combining a plurality of periods, such as a period in which the frequency ascends, and a period in which the frequency descends.

FIG. 3 is a diagram illustrating a FM-CW signal. An upper drawing in FIG. 3 shows signal waveforms of an FM-CW transmitting signal TX and a FM-CW receiving signal RX. Further, a middle drawing in FIG. 3 shows a beat frequency generated by a difference frequency between the transmitting signal TX and the receiving signal RX. In addition, a lower drawing in FIG. 3 shows a bit signal corresponding to the bit frequency.

In the upper drawing in FIG. 3, a vertical axis represents a frequency (GHz), and a horizontal axis represents a time (msec). In the drawing, the transmitting signal TX has a property where, supposing that the center frequency is Fo (e.g., 76.5 GHz), the frequency is repeats a constant change within 200 MHz so that the frequency ascends up to a predetermined frequency (e.g., 76.6 GHz) and then descends to a predetermined frequency (e.g., 76.4 GHz). The transmitting signal has the period (hereinafter referred to as an up period; e.g., U1, U2, U3 and U4 in FIG. 2) in which the frequency ascends up to a predetermined frequency and the period (hereinafter referred to as a down period; e.g., D1, D2, D3 and D4) in which the frequency descends to a predetermined frequency after it ascended to the predetermined frequency. Further, if it the reception antenna 14 receives the transmission wave outputted from the transmission antenna 13 as the reflection wave which is reflected from the object, the receiving signal RX is input to the mixer 15 via the reception antenna 14. Similar to the transmitting signal TX, the receiving signal RX also has an up period in which the frequency ascends up to a predetermined frequency and a down period in which the frequency descends to a predetermined frequency.

The radar apparatus 1 of this embodiment transmits the transmission wave corresponding to two cycles of transmitting signal TX, in which a combination of one up period and one down period is one cycle of the transmitting signal TX, to the outside of the vehicle. For example, the transmission wave of a beam pattern NA is output from the transmission antenna 13a during the first cycle (period U1 of up period at times t0 to t1 and period D1 of down period at times t1 to t2). The transmission wave of a beam pattern BA is output from the transmission antenna 13b during the next second cycle (period U2 of up period at times t2 to t3 and period D2 of down period at times t3 to t4). The signal processing unit 18 performs a signal processing to derive the target information using the transmitting signal TX and the receiving signal RX (signal processing period at times t4 to t5). After that, the transmission wave of the beam pattern NA is output from the transmission antenna 13a during the third cycle (period U3 of up period at times t5 to t6 and period D3 of down period at times t6 to t7), and the transmission wave of the beam pattern BA is output from the transmission antenna 13b during the fourth cycle (period U4 of up period at times t7 to t8 and period D4 of down period at times t8 to t9). After that, the signal processing unit 18 performs the signal processing to derive the target information. Subsequently, the same process is repeated.

In this instance, a temporal delay (time T) occurs in the receiving signal RX relative to the transmitting signal TX in accordance with the distance of the target with respect to the vehicle CR. In addition, if there is a speed difference between the speed of the vehicle CR and the speed of the target, a difference occurs between the transmitting signal TX and the receiving signal RX by Doppler shift.

In the middle drawing in FIG. 3, a vertical axis represents a frequency (GHz), and a horizontal axis represents a time (msec). The drawing shows a bit frequency indicative of the difference between the transmitting signal and the receiving signal in the up period and the down period. For example, a bit frequency BF1 is derived in the period U1, while a bit frequency BF2 is derived in the period D1. The bit frequency is derived in each period.

In the lower drawing in FIG. 3, a vertical axis represents an amplitude (V), and a horizontal axis represents a time (msec). The drawing shows a bit signal BS, which is an analog signal, corresponding to the bit frequency, and after the bit signal BS is filtered by the LPF 16 which will be described later, it is converted into digital data by the AD converter 17. In this instance, although FIG. 2 shows the bit signal BS corresponding to the receiving signal RX in the case of receiving it from one reflective point, if the transmission wave corresponding to the transmitting signal TX is reflected from a plurality of reflective points and is received by the reception antenna 14 as a plurality of reflection waves, the receiving signal RX generates a signal according to the plurality of reflection waves. Further, for the reflection wave from one target, only direct wave is received, or the direct wave and the multi-path wave are received, in accordance with the slope of the road surface on which the target exists, with respect to the road surface on which the vehicle exists. The bit signal BS indicative of the difference between the transmitting signal TX and the receiving signal RX is synthesized by each difference between the plurality of receiving signals RX and the plurality of transmitting signals TX.

Returning back to FIG. 2, the LPF (Low Pass Filter) 16 is a filter capable of decreasing a component of a frequency higher than a predetermined frequency, without decreasing a component of a frequency lower than the predetermined frequency. That is, a cutoff frequency is set to pass at least the frequency component of the target to be controlled. In this instance, the LPF 16 is also installed in each reception antenna, as well as the mixer 15.

The AD converter 17 derives plural sampling data by sampling the beat signal that is an analog signal in a predetermined cycle. Further, the AD converter 16 quantizes the sampled data to convert the beat signal of the analog data into digital data, and output the digital data to the signal processing unit 18. The AD converter 17 is installed in each reception antenna, as well as the mixer 15.

Subsequently, after the bit signal BS is converted into the digital data by the AD converter 17, it is FFT-processed by the signal processing unit 18 to acquire FFT data having a value of the signal level and phase information for every frequency of the bit signal BS.

The signal processing unit 18 is a computer including a CPU 181 and a memory 182, and acquires the FFT data by FFT-processing the beat signal of the distal data outputted from the AD converter 17. The signal processing unit 18 extracts a signal. of which the value of the signal level exceeds a predetermined threshold, among the bit signals of FFT data as a peak signal. The signal processing unit 18 derives paired data by pairing the peak signal of the up period and the peak signal of the down period.

Herein, the vertical distance of the paired data is derived by Expression 1, and the relative speed of the paired data is derived by Expression 2. Further, the angle of the paired data is derived by Expression 3. The horizontal distance of the paired data is derived by an operation using a trigonometric operation function from the information about the vertical distance and the angle derived by Expression 3

[Expression 1]

$$R = \frac{(f_{up} + f_{dn}) \cdot c}{2 \times (4 \times \Delta F \times f_m)} \quad (1)$$

[Expression 2]

$$V = \frac{(f_{up} - f_{dn}) \cdot c}{2 \times (4 \times \Delta F \times f_m)} \quad (2)$$

-continued

[Expression 3]

$$\theta_m = \frac{\theta_{up} + \theta_{dn}}{2} \quad (3)$$

Further, in the case where the signal processing unit 18 derives the target information of the current process. The signal processing unit filters paired data target information of the current process and predicted information with a given filter constant (e.g., (paired data target information× filter constant 0.25)+(predicted information×filter constant 0.75)=target information about target of current process). The signal processing unit 18 performs the filtering process by changing the given filter constant at the filtering process of the paired data, since the paired data corresponding to the target to be filtered satisfies a given condition.

The signal processing unit 18 performs the judgment of the stationary target, in addition to the control subject, based on the signal level relating to the receiving signal of the stationary target. Specifically, the signal processing unit 18 derives fluctuation values of the signal level (e.g., signal level of angular signal) relating to the receiving signal of the stationary target, and judges it as the stationary target, other than the control subject of the vehicle control device 2, if the value (hereinafter referred to as a fluctuation integrated value) calculated by integrating the fluctuation values is below a predetermined threshold. The fluctuation values are integrated as an absolute value. Further, the signal processing unit 18 sets a flag (hereinafter referred to an on-road target flag) indicating that the stationary target judged as the stationary target, other than the control subject, is the on-road target, to an on state. As a result, since the radar apparatus 1 does not output the target information about the stationary target, of which the on-road target flag is set to the on state, to the vehicle control device 2, it is possible to reliably determine the stationary target (on-road target) other than the control subject and the stationary target (stopped target) of the control subject, thereby preventing a unnecessary control from being executed. Further, since it is judged based on the fluctuation integrated value of the angular signal, it is possible to judge whether or not the stationary target, which is an object to be judged, among the plurality of stationary targets is the control subject.

In this instance, the stationary target is a target existing at the same position, without moving even as time passes. The moving target is a target moving at a specific speed to have a relative speed different from the speed of the vehicle CR.

The memory 182 is stored with an execution program, such as various computation operations executed by the CPU 181. Further, the memory 182 is stored with plural target information derived by the signal processing unit 18. Specifically, the memory is stored with target information of the target of each process (e.g., previous process or process before the previous process) including the current process. The memory 182 is stored with a value of the filter constant used when the target information of the target is derived. In addition, the memory 182 is stored with map data of likelihood that the target exists in the same traffic lane as the vehicle CR, which is a self-lane existing value representing a degree of the target existing in the same traffic lane as the vehicle CR by the relative horizontal distance and vertical distance of the target described later.

The transmission control unit 107 is connected to the signal processing unit 18, and outputs the control signal to the signal generating unit 11 for generating a modulated signal, based on the signal from the signal processing unit 18. Further, the transmission control unit 107 outputs the control signal to the conversion unit 131 connected to any one transmission antenna of the transmission antenna 13a and the transmission antenna 13b and the oscillator 12, based on the signal from the signal processing unit 18.

The vehicle control unit 2 controls operations of various devices provided in the vehicle CR. That is, the vehicle control device 2 obtains information from various sensors, such as the vehicle speed sensor 40 and the steering sensor 41. The vehicle control device 2 controls the behavior of the vehicle CR by operating various devices, such as the brake 50 and the throttle 51, based on the information obtained from various sensors and the target information obtained from the signal processing unit 18 of the radar apparatus 1.

Examples of the vehicle control performed by the vehicle control unit 2 may include the following. The vehicle control device 2 controls the vehicle CR to follow up the preceding vehicle which is the moving target in the traffic lane as the vehicle CR. Specifically, the vehicle control device 2 controls at least one of brake 50 and the throttle 51 according to the traveling of the vehicle CR to perform the control of ACC which allows the vehicle CR to follow-up drive the preceding vehicle in the state of securing a given inter-vehicular distance between the vehicle CR and the preceding vehicle.

Further, the vehicle control device 2 performs the control of protecting passengers of the vehicle CR in preparation for that the vehicle CR collides with an obstacle. Specifically, in a case where there is danger that the vehicle CR collides with an obstacle (e.g., stationary target corresponding to a vehicle stopped ahead of the vehicle CR on the same traffic lane as the traveling vehicle CR), a user of the vehicle CR is given by warning indication using an alai in device (not illustrated), or PCS (Pre-crash Safety System) is controlled to reduce the speed of the vehicle CR by controlling the brake 50. Further, the vehicle control device 2 performs the PCS control by fixing the passenger to a seat by means of a seat belt or fixing a headrest to reduce damage of a passenger's body of the vehicle CR against an impact when collision occurs.

The vehicle speed sensor 40 outputs a signal according to the speed of the vehicle CR based on a rotational speed of an axle of the vehicle CR. The vehicle control device 2 takes a current speed of the vehicle based on the signal from the vehicle speed sensor 40.

The steering sensor 41 detects a steering angle of a steering wheel which is operated by a driver of the vehicle CR, and transmits the information about an angle of a vehicle body of the vehicle CR to the vehicle control device 2.

The brake 50 decelerates the speed of the vehicle CR by the operation of the driver of the vehicle CR. Further, the brake 50 decelerates the speed of the vehicle CR by the control of the vehicle control device 2. For example, the speed of the vehicle CR is decelerated to maintain the distance between the vehicle CR and a preceding vehicle at a constant distance.

The throttle 51 accelerates the speed of the vehicle CR by operation of the driver of the vehicle CR. Further, the throttle 51 accelerates the speed of the vehicle CR by the control of the vehicle control device 2. For example, the throttle 51 accelerates the speed of the vehicle Cr to maintain the distance between the vehicle CR and the preceding vehicle at a constant distance.

2. Processing Flowchart

<2-1. Overall Processing>

Figure 4:
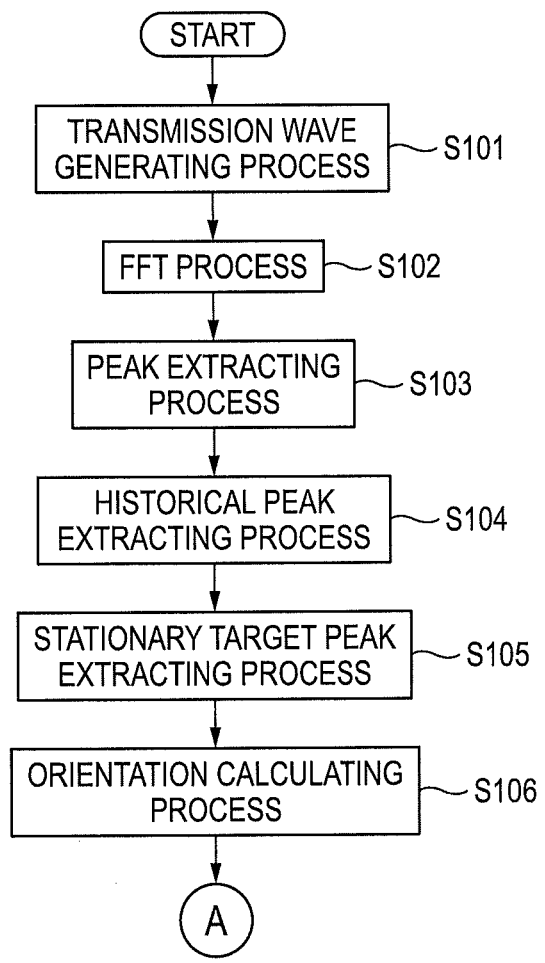
FIG. 4 is a flowchart illustrating a process of deriving target information which is executed by a signal processing unit.
Figure 5:
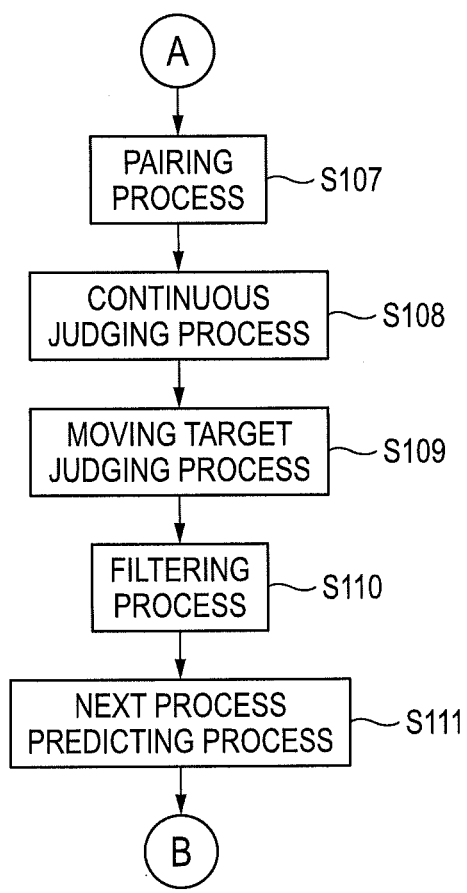
FIG. 5 is a flowchart illustrating the process of deriving target information which is executed by the signal processing unit.
Figure 6:
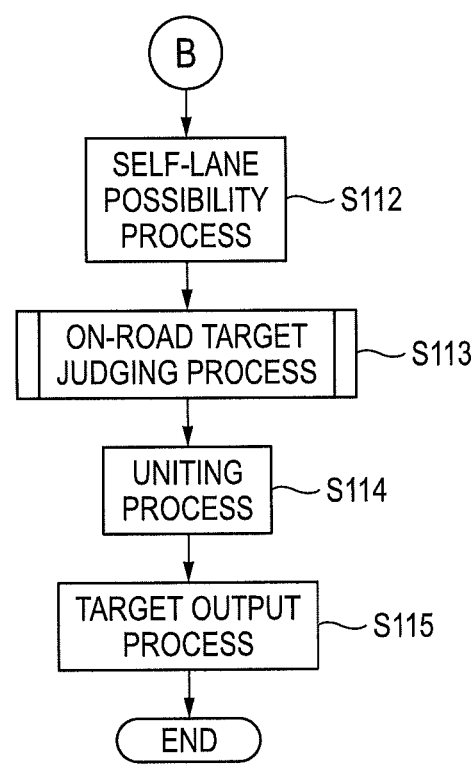
FIG. 6 is a flowchart illustrating the process of deriving target information which is executed by the signal processing unit.

FIGS. 4 to 6 are flowcharts illustrating the process in which the signal processing unit 18 derives the target information. The signal processing unit 18 outputs an instruction signal of generating the transmission wave to the transmission control unit 107 (step S101). The signal generating unit 11 is controlled by the transmission control unit 107 to which the instruction signal is input from the signal processing unit 18, and the transmission wave corresponding to the transmitting signal TX is generated. The generated transmission wave is output outwardly from the vehicle.

The reception antenna 14 receives the reflection wave which comes from the target at which the transmission wave reflects, and the mixer 15 mixes the transmitting signal TX and the receiving signal RX corresponding to the reflection wave to generate the beat signal BS which is a difference between the transmitting signal TX and the receiving signal RX. The beat signal which is the analog signal is filtered by the LPF 16, and is converted into the digital data by the AD converter 17, and then is input to the signal processing unit 18.

The signal processing unit 18 performs the FFT processing with respect to the beat signal of the digital data to obtain FFT data having a value of the signal level of the bit signal for every frequency (step S102).

Subsequently, the signal processing unit 18 extracts the bit signal, of which the value of the signal level exceeds the given threshold, among the bit signals of FFT data (step S103). Accordingly, the number of peak signals to be processed by the signal processing unit 18 in the current process is determined.

The signal processing unit 18 extracts a peak signal of the current process which exists, for example, within ±3 BIN (1 BIN corresponds to a frequency of about 468 Hz) with respect to a prediction peak signal predicting the frequency of the peak signal of the current process from the target information about the target derived in the previous process, among the peak signals of the current process which is extracted in the peak extracting process, as a historical peak signal having a temporal continuity with the peak signal corresponding to the target of the previous process (step S104).

And, the signal processing unit 18 executes a process of extracting the peak signal of each period, of which a frequency difference between the peak signal of the up period and the peak signal of the down period becomes a frequency difference corresponding to the speed of the vehicle CR, from the speed information of the vehicle CR of the speed sensor 40 as a peak signal corresponding to the stationary target (step S105).

In this instance, performing the process of extracting the historical peak (step S104) and the process of extracting the stationary target (step S105) is to select the peak signal corresponding to the target having the necessity which should be preferentially output to the vehicle control device 2 by the signal processing unit 18. For example, since the peak signal of the target of the current process having the temporal continuity with the target derived in the preceding process has a high possibility that the target actually exists in comparison to the target which is not derived in the previous process but is newly derived, the peak signal may have a high priority level. Also, since the target information about the stationary target having the danger of collision may be output to the vehicle control device 2 to control the vehicle in accordance with the distance between the stationary target and the vehicle and the relative speed, the stationary target may have the high priority level.

The signal processing unit 18 performs the orientation operation based on the peak signal in each period of the up period and the down period (step S106). Specifically, the signal processing unit 18 derives the orientation (angle) of the target by a given orientation calculating algorithm. For example, the orientation calculating algorithm is ESPRIT (Estimation of Signal Parameters via Rotational Invariance Techniques). A proper value and a proper vector of a correlation matrix are calculated from the phase information of the received signal in each reception antennas 14a to 14d, and an angle θup corresponding to the peak signal of the up period and an angle θdn corresponding to the peak signal of the down period are derived. Meanwhile, in the case where each peak signal of the up period and the down period is paired, the angle of the target is derived by Expression 3 described above.

The information about the frequency of one peak signal corresponds to the information about the vertical distance and the relative speed of the target, but may include information about a plurality of targets in the frequency of one peak signal. For example, in the position information of the target with respect to the vehicle CR, the information about a plurality of targets having the same value of the vertical distance but the different value of the angle may be included in the peak signal of the same frequency. In this instance, the phase information about the plurality of reflection waves coming from different angles becomes different phase information. For this reason, the signal processing unit 18 derives the target information about the plurality of targets existing at different angles with respect to one peak signal based on the phase information of each reflection wave.

In the case of performing the orientation operation, the phase may be rotated at an angle of 350 degrees, and thus angle information different from the original angle at which the target exists may be derived. For example, in a case where phase information of the reflection wave from the target received by the reception antenna is 420 degrees, even though the target exists in the region of the beam pattern BA other than the beam pattern NA illustrated in FIG. 1, the phase information is judged as an angle of 60 degrees (420 degrees to 360 degrees) by phase-aliasing, so that wrong angle information, in which there target exists in the region of the beam pattern NA not included in the beam pattern BA, may be derived. For this reason, the transmission wave of different beam pattern is respectively output from two transmission antenna of the transmission antennas 13a and 13b, and the reception level at each transmission antenna with respect to the same target is compared to each other to derive the correct angle of the target.

Specifically, the angle is derived as follows, based on the reflection wave for the transmission wave of each beam pattern. In the case where the phase information of the reflection wave is 60 degrees, the value of the signal level of each angular spectrum corresponding to the reflection wave of the transmission wave of the transmission antenna 13a and the reflection wave of the transmission wave of the transmission antenna 13b are compared to each other, and if the value of the signal level of the angular spectrum corresponding to the reflection wave of the transmission wave of the transmission antenna 13a is high, an angle corresponding to the phase information 60 degrees in the region of the beam pattern NA except for the region of the beam pattern BA is derived as an angle of the target. Further, the value of the signal level of the angular spectrum corresponding to the reflection wave of the transmission wave of the transmission antenna 13b is high, an angle corresponding to the phase information 420 degrees in the region of the beam pattern BA except for the region of the beam pattern NA is derived as an angle of the target. Since the transmission wave of different beam pattern is output for each cycle from the transmission wave of 2 cycles of transmission signal TX, the target by the phase-aliasing in the case of the orientation operation prevents derivation of the wrong angle information.

Then, the signal processing unit 18 performs a pairing process of pairing the peak signal of the up period and the peak signal of the down period illustrated in FIG. 5 (step S107). For the historical peak signal extracted in the historical peak extracting process (step S104) among the whole peak signals derived in the process of step S103, the pairing process is performed with respect to the historical peak signal of the up period and the historical peak signal of the down period. Further, for the stationary target peak signal extracted in the stationary target peak extracting process (step S105), the pairing process is performed with respect to the stationary target peak signal of the up period and the stationary target peak signal of the down period. In addition, for the remaining peak signals except for the historical peak signal and the stationary target peak signal among the whole peak signals extracted in the peak extracting process, the pairing process is performed with respect to the remaining peak signal of the up period and the remaining peak signal of the down period.

In this instance, the pairing process of the peak signal of the up period and the peak signal of the down period is performed by, for example, operation using a Mahalanobis distance. Specifically, before the radar apparatus 1 is mounted to the vehicle CR, plural data, that is, normal-paired data paired in a correct combination and mis-paired data paired in a wrong combination, is acquired while experimentally pairing the peak signal of the up period and the peak signal of the down period, and an average value for every three parameters of the plurality of normal-paired data is derived from three parameter values of a difference in values of the signal levels, a difference in values of the angle, and a difference in values of the signal levels of angular spectrum, and then is stored in the memory 182 in advance.

The Mahalanobis distance is derived by Expression 4 below using the average value for every three parameters of all combinations of the peak signal of the up period and the peak signal of the down period and three parameters of the plurality of normal-paired data, among the peak signals of FFT data obtained in the current process. The signal processing unit 18 derives the paired data of the current process, in which the Mahalanobis distance is minimized, as the normal-paired data. That is, as the value of the Mahalanobis distance is small, the possibility that it is the normal-paired data is high.

Herein, the Mahalanobis distance is a value of one group represented by a multivariable vector $x=(x1, x2, x3)$, for example, in which an average is $\mu=(\mu1, \mu2, \mu3)^T$ and a covariance matrix is $\Sigma$. In this instance, $\mu1$, $\mu2$, and $\mu3$ represent values of three parameters of the normal-paired data, and x1, x2, and x3 represent values of three parameters of the paired data of the current process.

$$D_M(x) = \sqrt{(x-\mu)^T \Sigma^{-1}(x-\mu)} \quad \text{[Expression 4]}$$

The signal processing unit 18 derives the vertical distance, the relative distance, and the horizontal distance, which is based on the angle, of the paired data which is judged as the normal-paired data, using the parameter values of the normal-paired data in the pairing process and Expressions 1 to 3 above. The horizontal distance includes an absolute horizontal distance and a relative horizontal distance. The absolute horizontal distance is a horizontal distance of which the left direction in a vehicular width direction of the vehicle CR having the reference axis BL of ±0 m is the negative value, while the right direction is the positive value. Also, the relative horizontal distance is a distance derived from the horizontal distance of the target according to the information about a curve radius of the same traffic lane as the traveling vehicle CR, and the information about the vertical distance and the absolute horizontal distance of the target. Specifically, the relative horizontal distance is a horizontal distance of which the left direction in the vehicular width direction of the vehicle CR having the reference axis BL of ±0 m is the negative value, while the right direction is the positive value, according to information about a rotational angle of a steering wheel which is input from the steering sensor 41 when a driver of the vehicle CR operates the steering wheel of the vehicle CR.

Using the relative horizontal distance as the target information is when it is necessary to take into consideration a curve state of the same traffic lane as the traveling vehicle at calculation of the horizontal distance. Hereinafter, in the case where it is described simply as the horizontal distance, a description will be given as at least one of the absolute horizontal distance and the relative horizontal distance. In the especially necessary case, only one horizontal distance will be described, but it is not limited thereto (e.g., relative horizontal distance). The other horizontal distance (e.g., absolute horizontal distance) may be used.

Next, the signal processing unit 18 judges (continuity judgment) whether a temporally consecutive relation exists between the paired data target information of the current process and the predicted target (step S108). The predicted information is one predicting the relative speed in the target information of the target of the previous process of the signal processing unit 18, and the vertical distance, the horizontal distance, and the relative speed included in the paired data target information of the current process from variations in values of the target information up to that time. The case where the temporally consecutive relation between the paired data target information of the current process and the predicted information exists means a case where a difference value in the vertical distance, the horizontal distance and the relative speed between the paired data target information of the current process and the predicted information is within a predetermined value. If a plurality of the predicted target information exists within the predetermined value, the signal processing unit 18 judges that the predicted information, of which the difference value between the paired data target information of the current process and the predicted information is within the lowest predetermined value, has the temporally consecutive relation with the paired data target information of the current process, and the signal processing unit 18 performs a process of filtering the paired data (hereinafter referred to as past correspondent paired data) of the current process having the temporally consecutive relation with the predicted information (step S110), which will be described later.

Further, if the difference value of the vertical distance, the horizontal distance and the relative speed between the pared data target information of the current process and the predicted information is not within the predetermined value, the signal processing unit 18 judges that there is no temporally consecutive continuity between pared data target information of the current process and the predicted information.

The paired data (hereinafter referred to as newly paired data) of the current process which is judged that there is no temporally consecutive continuity with the predicted information becomes paired data corresponding to the target first derived in the current process. In this instance, for the newly paired data, since there is no target of the previous process having the temporally consecutive relation in the filtering process (step S110), the predicted information is not predicted, and the vertical distance, the horizontal distance, and the relative speed of the newly paired data become target information about the target of the current process.

The signal processing unit 18 derives paired data corresponding to the moving target from the information about the speed of the vehicle CR and the relative speed of the paired data (step S109), and sets the moving target flag of the paired data corresponding to the moving target to the on state. Since the process is performed, it is possible to derive the paired data having the necessity which should be preferentially processed.

If there is the temporally consecutive continuity between pared data target information of the current process and the predicted information, the signal processing unit 18 performs the filtering of the vertical distance, the horizontal distance, and the relative speed of the pared data target information of the current process and the predicted information (step S110), and derives the target information of the target derived by the current filtering process as the target information about the target of the current process.

The signal processing unit 18 adds, for example, a filter constant value 0.25 to the current horizontal distance which is the horizontal distance of the paired data of the current process corresponding to the moving target, and adds a filter constant value 0.75 to the predicted horizontal distance predicting the horizontal distance of the target of the current process from the horizontal distance determined in the previous process which is the horizontal distance of the target of the previous process. The result obtained by adding both horizontal distances after the weighting is derived as the horizontal distance determined in the current process (e.g., (current horizontal distance×filter constant 0.25)+(predicted horizontal distance×filter constant 0.75)=currently determined horizontal distance). Further, the vertical distance and the relative speed are filtered using a predetermined filter constant, respectively.

In step S111, the signal processing unit 18 derives a predicted value (predicted vertical distance, predicted relative speed, predicted horizontal distance, or the like) of the target information used in a next historical peak extracting process (step S104) which is performed next to the current process. Specifically, the signal processing unit 18 derives 20 target information having the high priority after the vehicle is controlled, and calculates the predicted values, such as a frequency of the peak signal of the up and down periods, of the current process, which will be used in the next process of deriving the historical peak. In the case of performing the ACC control, the target having the horizontal distance corresponding to the same traffic lane as the traveling vehicle CR and the relatively short vertical distance with respect to the vehicle CR has the high priority, while the target having the horizontal distance corresponding to an adjacent traffic lane and the relatively long vertical distance with respect to the vehicle CR has the low priority. Further, in the case of the PCS, the target having the relatively short time-to-collision (hereinafter referred to as TTC) has the high priority, while the target having the relatively long TTC has the high priority.

As illustrated in FIG. 6. The signal processing unit 18 derives the possibility that the target exits in the same traffic lane as the vehicle, from two-dimensional map data of the self-lane possibility having the relative horizontal distance and the vertical distance which are stored in the memory 182 as the parameters in advance (step S112). As the absolute value of the horizontal distance of the target is increased, the value of the self-lane possibility is decreased. Further, as the value of the vertical distance of the target is increased, the value of the self-lane possibility is decreased. In this instance, as the value of the self-lane possibility is high, the target exists in the same traffic lane as the traveling vehicle CR, and thus the vehicle control device 2 executes, for example, the vehicle control of the ACC for the target.

The signal processing unit 18 performs a process of judging the on-road target which is the stationary target which is not necessary to be output to the vehicle control device 2, with respect to the stationary target derived by the above processes (step S113). Specifically, the signal processing unit 18 judges whether or not the stationary target is the on-road target (e.g., stationary target corresponding to the on-road object which is a traffic button such as a chatter bar attached with a reflective plate which is installed to a median strip or a curve road, a manhole installed on a road surface of a traffic lane, or a joint member for jointing a road and a road) existing at a relatively low position in a reference direction which is the height direction for the road surface on which the vehicle CR exists (i.e., flat road surface relative to the ascent road surface on which the on-road target exists). The process of judging whether or not the stationary target is the on-road target will be described in detail later.

Next, the signal processing unit 18 performs a process of uniting plural target information as one target information corresponding to one object (step S114). For example, in the case where the transmission wave is emitted from the transmission antenna 13 of the radar apparatus 1, plural the reflection waves to be received by the reception antenna 14 exist when the transmission wave is reflected from the target. That is, the reflection waves from a plurality of reflection points arrive at the reception antenna 14 for the same object. As a result, the signal processing unit 18 derives plural target information having different positions based on the respective reflection waves, but since it is originally the target of one object, the signal processing unit 18 performs the process of uniting each target as one to be handled as the target information of the same object. For this reason, if each relative speed of the plurality of targets is substantially equal, and the vertical distance and the horizontal distance of each target are within a predetermined range, the signal processing unit 18 regards the plurality of targets as the target of the same object, and then performs the process of uniting plurality of targets as the target corresponding to one target.

The signal processing unit 18 outputs the target information of the target, which has the high priority to be output to the vehicle control device 2, to the vehicle control device 2 (step S115), except for the stationary target of which the on-road target flag is set to the on state, from the target information united in the process (step S114).

<2-2. Process of Judging on-Road Target>

Next, the process of judging the on-road target (step S113) in FIG. 6 will be described. An example of a scene, in which the process of judging the on-road target is performed, will be described first with reference to FIGS. 7 and 8. FIG. 7 is a diagram describing the reflection wave in the case where the vehicle CR and the stopped vehicle FC, and the vehicle CR and the on-road object RF are away from each other at a first distance (e.g., vertical distance of 70 m), respectively.

That is, the upper drawing in FIG. 7 shows the reflection wave in the cases where the vehicle CR and the stopped vehicle FC are away from each other at the first distance, and the lower drawing in FIG. 7 shows in the case where the vehicle CR and the on-road object RF are away from each other at the first distance.

Specifically, the upper drawing in FIG. 7 shows that the transmission wave of the beam pattern NA is output from the transmission antenna 13a of the radar apparatus 1 of the vehicle CR, and is reflected from the rear portion of the stopped vehicle FC, and a direct wave dr1 and a multi-path wave mr1 are received by the reception antenna 14 of the radar apparatus 1. In this instance, the vertical distance of the stopped vehicle FC with respect to the vehicle CR is the first distance, and the road surface R2 on which the stopped vehicle FC exists has a given angle with respect to the road surface R1 on which the vehicle CR exists. That is, the road surface R2 on which the stopped vehicle FC exists is an ascent with respect to the road surface R1 on which the vehicle CR exists. In other words, supposing that the height of the road surface R1 is 0 with respect to the reference direction, the position of the vehicle CR has a height 0 in the reference direction of the vehicle CR, while the position of the stopped vehicle FC has a height h2 in the reference direction, so that a height difference between the heights is h2.

The lower drawing in FIG. 7 shows that the transmission wave of the beam pattern NA is output from the transmission antenna 13a of the radar apparatus 1 of the vehicle CR, and is reflected from the on-road object RF, and a direct wave dr11 and a multi-path wave mr11 are received by the reception antenna 14 of the radar apparatus 1. In this instance, the vertical distance of the on-road object RF with respect to the vehicle CR is the first distance, and the road surface R2 on which the on-road object RF exists has a given angle with respect to the road surface R1 on which the vehicle CR exists. That is, the road surface R2 on which the on-road object RF exists is an ascent with respect to the road surface R1 on which the vehicle CR exists. In other words, supposing that the height of the road surface R1 is 0 with respect to the reference direction, the position of the vehicle CR has a height 0 in the reference direction, while the position of the on-road object RF has a height 112 in the reference direction, so that a height difference between the heights is h2.

Figure 8:
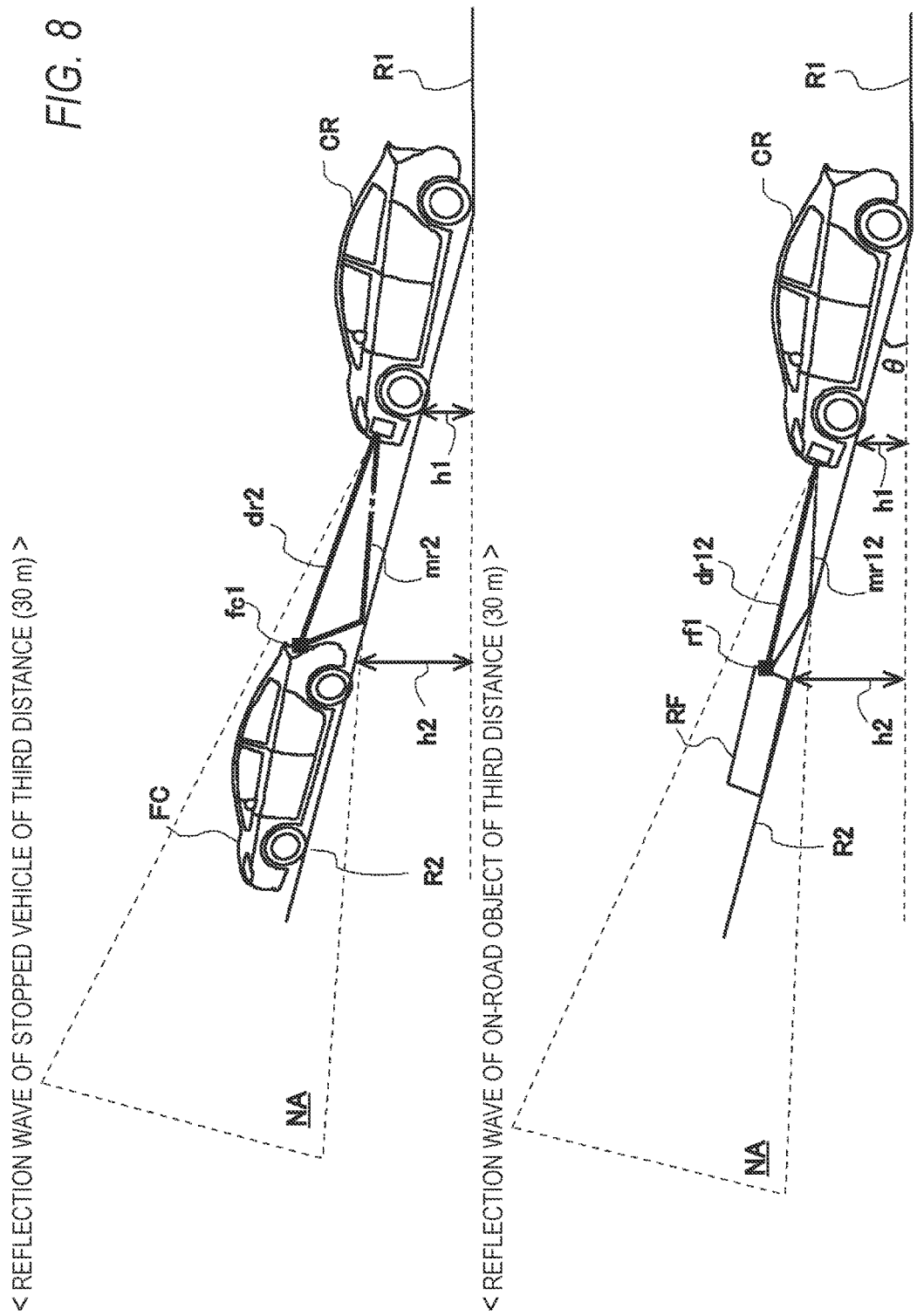
FIG. 8 is a diagram describing a reflection wave in cases where a vehicle and a stopped vehicle, and the vehicle and an on-road object are away from each other at a third distance, respectively.

Through the target deriving process is performed in several times, the reflection wave in the case where the vehicle Cr and the stationary targets (stationary target fc1 and stationary target rf1) of the stopped vehicle FC and the on-road object RF get into close with each other, and thus the distance between the vehicle Cr and the stopped vehicle FC is a second distance (e.g., vertical distance of 50 m), and then is at third distance (e.g., vertical distance of 30 m) will be described with reference to FIG. 8. FIG. 8 is a diagram describing the reflection wave in the cases where the vehicle CR and the stopped vehicle FC, and the vehicle CR and the on-road object RF are away from each other at the third distance, respectively.

In brief, the upper drawing in FIG. 8 shows the reflection wave in the case where the vehicle CR and the stopped vehicle FC are away from each other at the third distance, while the lower drawing in FIG. 8 shows the reflection wave in the case where the vehicle CR and the on-road object RF are away from each other at the third distance. Specifically, the upper drawing in FIG. 8 shows that the transmission wave of the beam pattern NA is output from the transmission antenna 13a of the radar apparatus 1 of the vehicle CR, and is reflected from the rear portion of the stopped vehicle FC, and a direct wave dr2 and a multi-path wave mr2 are received by the reception antenna 14 of the radar apparatus 1. In this instance, as the vehicle CR gets into close with the stopped vehicle FC, the vertical distance of the vehicle CR with respect to the vehicle FC is the third distance, and the road surface on which the vehicle CR exists is the road surface R2 different from the road surface R1 when the vertical distance is the first distance. For this reason, the vehicle CR exists at the position higher than the position of the road surface R1 when the vertical distance is the first distance. In other words, supposing that the position of the road surface R1 is 0 with respect to the reference direction, the position of the vehicle CR has a height 1, while the position of the stopped vehicle FC has a height h2 in the reference direction, so that a height difference between the heights is h2−h1.

The lower drawing in FIG. 8 shows that the transmission wave of the beam pattern NA is output from the transmission antenna 13a of the radar apparatus 1 of the vehicle CR, and is reflected from the on-road object RF, and a direct wave dr12 and a multi-path wave mr12 are received by the reception antenna 14 of the radar apparatus 1. Further, as the vehicle CR gets into close with the on-road object RF, the vertical distance of the on-road object RF with respect to the vehicle CR is the third distance, and the road surface on which the vehicle CR exists is the road surface R2 different from the road surface R1 when the vertical distance is the first distance. For this reason, the vehicle CR exists at the position higher than the position of the road surface R1 when the vertical distance is the first distance. In other words, supposing that the position of the road surface R1 is 0 with respect to the reference direction, the position of the vehicle CR has a height 1, while the position of the stopped vehicle FC has a height h2 in the reference direction, so that a height difference between the heights is h2−h1.

The vertical distance of the stopped vehicle FC with respect to the vehicle CR becomes the third distance closer than the first distance, as the vehicle CR gets into close to the stopped vehicle FC. The height difference between both vehicles is decreased by h2−h1 from h2. Since the vehicular body of the stopped vehicle FC has a certain height, the reflection paths of the direct wave dr2 and the multi-path wave mr2 are different from each other. Therefore, as the value of the signal level regarding to each receiving signal of the direct wave dr2 and the multi-path wave mr2 in the upper drawing of FIG. 8 gets strong as the distance of both vehicles gets into close to each other. For this reason, a direct signal of the direct wave dr2 and a multi-path signal of the multi-path wave mr2 are synthesized, thereby obtaining an angular signal having a high amplitude variation with respect to the stationary target fc1 of the stopped vehicle FC as the vertical distance approaches.

As the vehicle CR gets into close to the on-road vehicle RF, the signal level of the multi-path wave mr12 of the stationary target of the on-road object RF gets weak. The vertical distance of the on-road object RF with respect to the vehicle CR becomes the third distance closer than the first distance, as the vehicle CR gets into close to the on-road object RF. The height difference between both vehicle and object is decreased by h2−h1 from h2. As a result, the reflection paths of the direct wave dr12 and the multi-path wave mr12 are the substantially same path, and thus the signal level regarding to the multi-path signal of the multi-path wave mr12 is decreased. As a result, a direct signal of the direct wave dr12 and a multi-path signal of the multi-path wave mr12 are synthesized, thereby obtaining an angular signal having a low amplitude variation with respect to the stationary target rf1 of the on-road object RF as the vertical distance approaches.

Subsequently, the angular signal used for judging whether the stationary target (stationary target fc1 and stationary target rf1) is the on-road target or not will be described with reference to an angular signal transitive graph for every vertical distance. A vertical axis in FIG. 9 represents a value (dB) of the signal level, and a horizontal axis represents the vertical distance (m) of the stationary target with respect to the vehicle, and process timing of the target deriving process at that time. The timing consists of a predetermined period (e.g., 50 msec).

The upper drawing in FIG. 9 shows the transition of the signal level of the angular signal according to the vertical distance (predetermined process timing (e.g., for every 50 msec)) of the stationary target fc1 of the stopped vehicle FC by a graph line L1. Since the signal level of the angular signal is decreased (amplitude variation) depending on the distance due to the effect of the direct wave and the multi-path wave from the stationary target fc1, a maximum value and a minimum value are generated depending on the distance. For example, at the process timing ta of the first distance (vertical distance of 70 m) shown in the upper drawing in FIG. 7, the signal level corresponding to the maximum b1 indicative of the maximum value, in which the graph line L1 is changed from an upward trend to a downward trend, becomes the angular signal.

Herein, the maximum is a portion in which the value of the signal level is shifted from the upward trend to the downward trend, and its value is referred to as the maximum value. Further, the minimum is a portion in which the value of the signal level is shifted from the downward trend to the upward trend, and its value is referred to as the minimum value. For this reason, for example, judging that the value of the signal level is the maximum value at the first distance requires at least three value of the signal levels of the process timing, that is, a value of the signal level of the process timing before the process timing ta, a value of the signal level of the process timing ta, and a value of the signal level of the process timing after the process timing ta. Based on the variation in three values of the signal levels, it is judged that the value of the maximum b1 at the process timing after the process timing ta is the maximum value. The maximum value and the minimum value shown below are derived by at least three values of the signal levels of the process timing.

As the vehicle CR gets into close to the stopped vehicle FC, the distance of the vehicle CR with respect to the stopped vehicle FC becomes the second distance (vertical distance of 50 m and process timing tb) and the third distance (vertical distance of 30 m and process timing tc). At the process timing tc of the third distance illustrated in the upper drawing in FIG. 8, the signal level corresponding to the minimum s2 becomes a value of the signal level of the angular signal. In this instance, two maximum and two minimum, that is, the maximum b1 and b2 and the minimum s1 and s2, are shown from the first distance to the third distance of the graph L1, and two maximum and one minimum, that is, the maximum b3 and b4 and the minimum s3, are shown from the third distance to the fourth distance (vertical distance of 15 m and the process timing td). As the distance between the vehicle CR and the stopped vehicle FC approaches. The amplitude of the graph line L1 is increased, and the value of the signal level is also increased.

The lower drawing in FIG. 9 shows the transition of the signal level of the angular signal according to the vertical distance (predetermined process timing) of the stationary target rf1 of the on-road vehicle RF by a graph line L2. Even in this instance, since the signal level of the angular signal is decreased (decrease in signal level of multi-path wave) depending on the distance due to the effect of the direct wave and the multi-path wave from the stationary target fc1, a maximum value and a minimum value are generated depending on the distance. However, for the on-road object RF, since its height is low relative to the stopped vehicle FC, a decreased amount of the multi-path wave is smaller than the stopped vehicle FC, and the signal level and the decreased amount (amplitude variation amount) become small, if the distance between the vehicle CR and the on-road object RF is below any vertical distance (e.g., 30 m), similar to that the height difference of the reference direction between the road surface on which the vehicle CR exists and the road surface on which the on-road object RF exists is further decreased. For example, at the process timing to of the first distance shown in the lower drawing in FIG. 7, the signal level which is slightly decreased from the maximum b11 of the graph line L2 becomes the value of the signal level.

As the vehicle CR gets into close to the on-road object RF, the distance of the vehicle CR with respect to the on-road object RF becomes the second distance and the third distance. At the process timing tc of the third distance illustrated in the lower drawing in FIG. 8, the signal level corresponding to the maximum b15, at which the graph line L2 indicates the maximum value, becomes a value of the signal level of the angular signal. In this instance, four maximum and four minimum, that is, the maximum b12, b13, b14 and b15 and the minimum s1, s12, s13 and s14, are shown from the first distance to the third distance of the graph L2. Two maximum and two minimum, that is, the maximum b16 and b17 and the minimum s15 and s16, are shown from the third distance to the fourth distance of the graph line L2. As the distance between the vehicle CR and the stationary target rf approaches. The amplitude of the graph line L2 is relatively increased, and the value of the signal level is also increased. As the distance between the vehicle CR and the on-road object RF further approaches from the third distance, the amplitude of the graph line L2 is relatively decreased, and the value of the signal level is also decreased.

The reason why the amplitude of the graph line L2 on either side of the third distance is relatively decreased is that, as the vehicle CR gets into close to the on-road object RF, as described with reference to the lower drawings in FIGS. 7 and 8, the height difference in the reference direction between the position of the vehicle CR and the position of the on-road object RF is decreased, and thus the path of the multi-path wave is overlapped with the path of the direct wave to reduce the multi-path wave, that is, it hardly receives the multi-path wave. Also, the reason why the value of signal level of the graph line L2 is decreased is that when the vehicle CR gets into close to the on-road object RF having a low height relative to the stopped vehicle FC, the on-road object RF is deviated from the region of the beam pattern NA of the transmission wave, and thus the direct wave is reduced, that is, it hardly receives the multi-path wave.

The present invention is created based on the phenomenon in that the decreased amount (amplitude variation amount) of the receiving signal, which is caused by the effect of the multi-path in the case where the on-road object RF exists on the ascent, is smaller than the decreased amount which is caused by the case of the stopped vehicle FC.

According to the present invention, the stationary object of the stopped vehicle FC and the on-road object of the stationary object RF can be distinguished by integrating the fluctuation values of the signal level relating to the receiving signal.

Figure 10:
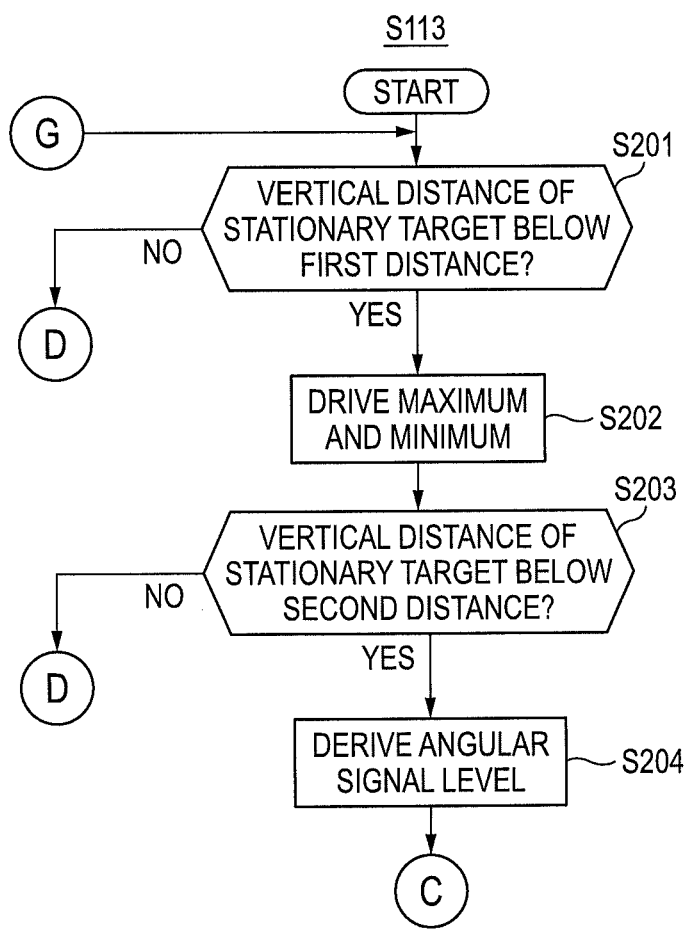
FIG. 10 is a flowchart illustrating a process of judging an on-road target.
Figure 11:
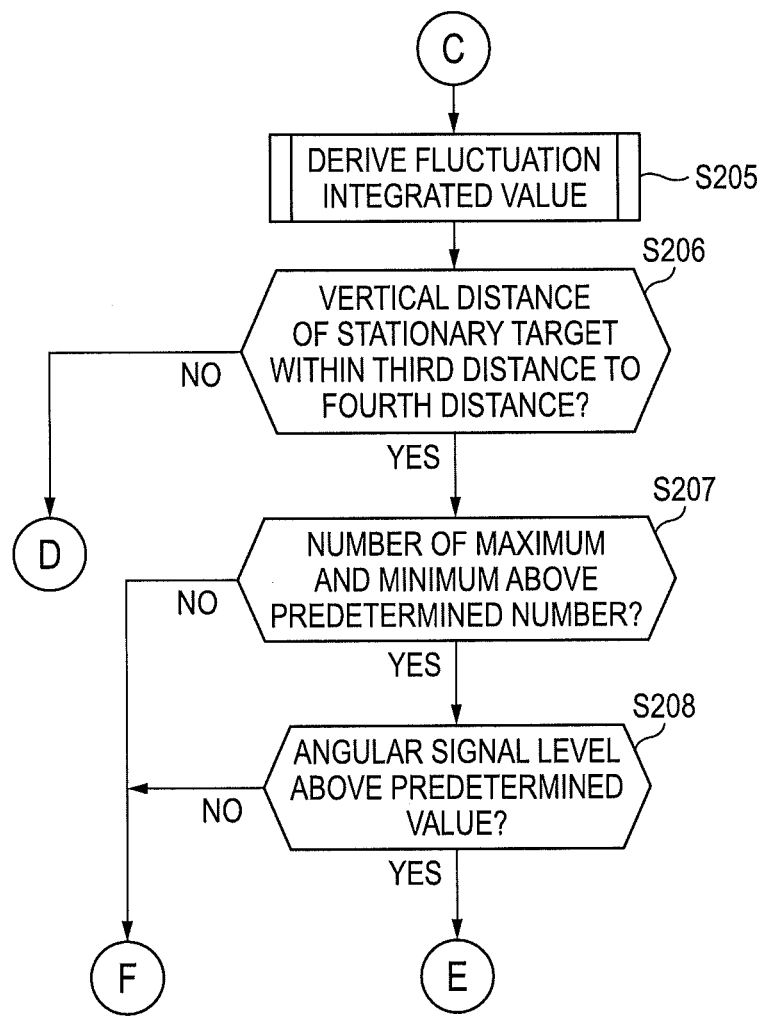
FIG. 11 is a flowchart illustrating the process of judging the on-road target.
Figure 12:
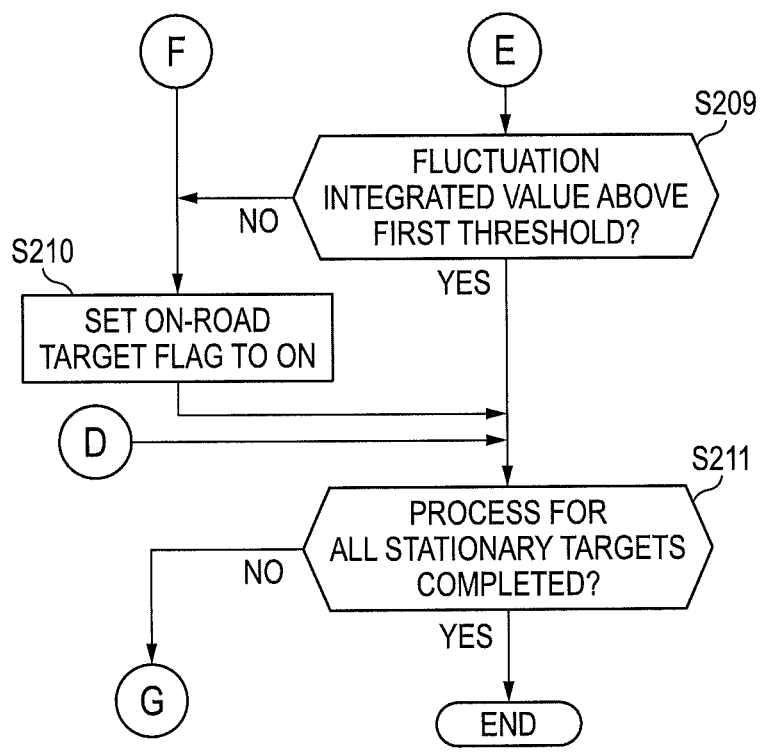
FIG. 12 is a flowchart illustrating the process of judging the on-road target.

Next, the process contents of the process of judging the on-road target will now be described. FIGS. 10 to 12 are flowcharts illustrating the process of judging the on-road target.

In FIG. 10, the signal processing unit 18 judges whether or not the vertical distance of the stationary target, which is processed in the on-road target judging process, among the plurality of stationary targets derived from the target driving process is below the first distance (e.g., vertical distance of 70 m) at the current process timing (step S201).

If the vertical distance of the stationary target is below the first distance (Yes in step S201), the signal processing unit 18 derives the number of maximum and minimum of the angular signal level (step S202). That is, the process of step S202 is initiated if the vertical distance of the stationary target is below the first distance. In this instance, the number of maximum and minimum is used to judge whether or not the target is the on-road object RF in step S207. For the stationary target fc1 of the stopped vehicle FC in the upper drawing in FIG. 9, for example, letting the next process timing of the process timing tc be the current process timing, the number of maximum is two (maximum b1 and b2) and the number of minimum is two (minimum s2 and s2), between the process timing ta to tc. Further, for the stationary target rf1 of the on-road object RC in the lower drawing in FIG. 9, letting the next process timing of the process timing tc be the current process timing, the number of maximum is four (maximum b12, b13, b14 and b15) and the number of minimum is four (minimum s11, s12. s13 and s14), between the process timing ta to tc.

In the process of step S201 in FIG. 10, if the vertical distance of the stationary target is above the first distance (No in step S201), the signal processing unit 18 judges whether or not the process of judging the on-road target for all stationary targets is completed (step S211 in FIG. 12). If it is judged that the process of judging the on-road target for all stationary targets is completed (Yes in step S211), the signal processing unit 18 completes the process. In this instance, if it is judged that the process of judging the on-road target for all stationary targets is not completed (No in step S211), the signal processing unit 18 proceeds to the process of step S201 in FIG. 10 to repeat the process.

Returning back to step S203 in FIG. 10, the signal processing unit 18 judge whether or not the vertical distance of the stationary target is below the second distance (e.g., vertical distance of 50 m) (step S203). If the stationary target is below the second distance (Yes in step S203), the signal processing unit 18 derives a value of the signal level of the angular signal (step S204). That is, the process of step S204 is initiated if the vertical distance of the stationary target is below the second distance, and it derives the value of the signal level derived at the process timing which is most close to the current process timing. In this instance, the process is used to judge whether or not the target is the on-road object RF in step S208 which will be described later. According to the graph line L1 of the stationary target fc1 in the upper drawing in FIG. 9, for example, letting the process timing tb be the current process timing, the value of the signal level becomes a value corresponding to the maximum b1. Further, letting the process timing tc be the current process timing, the value of the signal level becomes a value corresponding to the maximum b2.

In addition, according to the graph line L2 of the stationary target rf1 in the lower drawing in FIG. 9, for example, letting the process timing tb be the current process timing, the value of the signal level becomes a value corresponding to the maximum b12. Further, letting the process timing tc be the current process timing, the value of the signal level becomes a value corresponding to the maximum b14. In this instance, in the process (step S203) in FIG. 10, if the stationary target is above the second distance (No in step S203), the signal processing unit 18 judges whether or not the process for all stationary targets is completed (step S211).

Returning back to step S205 in FIG. 11, the signal processing unit 18 derives a fluctuation integrated value of the angular signal (step S205). The process of step S205 will be described in detail with reference to a graph illustrating a fluctuation value of the angular signal in FIG. 13 and a flowchart illustrating a process of a fluctuation integrated value of the angular signal in FIG. 14. In this instance, the process of step S205 is initiated if the vertical distance of the stationary target is the second distance (e.g., below vertical distance of 50 m), similar to the process of step S204.

FIG. 13 is generally a diagram describing the fluctuation value between the maximum and the minimum of the transition graph of the signal level of the angular signal shown in FIG. 9. The method of deriving the fluctuation value of the maximum and the minimum is varied on either side of a reference distance (e.g., vertical distance of 20 m and process timing tj) in the vertical distance of the stationary target. That is, if the stationary target exists at a position exceeding the reference distance, the signal processing unit 18 derives the fluctuation value from the maximum value to the minimum value. This is the reason that if the stationary target exists at a position above the reference distance, since the signal level has an increasing tendency as the vertical distance becomes short, the fluctuation value from the maximum to the minimum, in which the fluctuation value is decreased rather than that from the minimum to the maximum, is adopted to easily distinguish the on-road object RF and the stopped object FC. If the stationary target exists at the position below the reference distance, the signal processing unit 18 derives the fluctuation value from the minimum value to the maximum value. This is the reason that if the stationary target exists at the position below the reference distance, since the signal level has a decreasing tendency as the vertical distance becomes short, the fluctuation value from the minimum to the maximum, in which the fluctuation value is decreased rather than that from the maximum to the minimum, is adopted to easily distinguish the on-road object RF and the stopped object FC. Therefore, it is possible to perform the correct judgment based on the feature appearing in the signal level of the stationary target other than the object to be controlled in the case where the vehicle CR gets into close to the stationary target within a predetermined distance.

Specifically, if the vertical distance of the stationary target is above the reference distance, the signal processing unit 18 derives fluctuation values of a value of the minimum (hereinafter referred to as recent minimum) derived at the recent process timing, and a value of the maximum (hereinafter referred to as past maximum) derived at the past process timing than the process timing of driving the recent minimum. That is, the fluctuation values of the value of the recent minimum and the value of the past maximum are derived during an integration period ad1 between the second distance (vertical distance of 50 m) and the reference distance. The signal processing unit 18 derives the fluctuation integrated value by integrating the derived fluctuation values. For example, letting the process timing next to the process timing tc be the current process timing, the signal processing unit 18 sets the minimum s2 at the current process timing of the graph line L1 as the recent minimum, and sets the maximum b2 as the past maximum. The signal processing unit 18 derives the fluctuation value df1 of the minimum s2 and the maximum b2. Since the fluctuation value df1 is initially derived in the integration period ad1, the fluctuation integrated value becomes the same value as the fluctuation value df1.

Further, letting the process timing next to the process timing tc be the current process timing, the signal processing unit 18 sets the minimum s14 at the current process timing of the graph line L1 as the recent minimum, and sets the maximum b14 as the past maximum. The signal processing unit 18 derives the fluctuation value df12 of the minimum s14 and the maximum b14. In the process prior to the fluctuation value df12, the fluctuation value df11 of the minimum s13 and the maximum b13 is derived in the integration period ad1. For this reason, the fluctuation integrated value (df11+df12) obtained by integrating the fluctuation values df11 and df12 is derived at the time of the process timing tc. In addition, even after the process timing tc, the signal processing unit 18 sets the minimum s15 as the recent minimum, and sets the maximum b1b as the past maximum to derive the fluctuation value df13 of the minimum s15 and the maximum b15. The fluctuation value df13 is integrated into the fluctuation integrated value (df11+df12) obtained by integration up to that time. In this way, if the vertical of the stationary target is above the reference distance, the signal processing unit 18 derives the fluctuation values of the value of the recent minimum and the value of the past maximum, and derives the fluctuation integrated value obtained by integrating the fluctuation values derived.

Subsequently, if the vertical distance of the stationary target is below the reference distance, the signal processing unit 18 derives fluctuation values of a value of the maximum (hereinafter referred to as recent maximum) derived at the recent process timing, and a value of the minimum (hereinafter referred to as past minimum) derived at the past process timing than the process timing of driving the recent maximum. That is, the fluctuation values of the value of the recent maximum and the value of the past minimum are derived during an integration period ad2 between the reference distance and the vertical distance of 0 m. The signal processing unit 18 derives the fluctuation integrated value by integrating the derived fluctuation values.

For example, letting the process timing next to the process timing td be the current process timing, the signal processing unit 18 sets the maximum b4 at the current process timing of the graph line L1 as the recent maximum, and sets the minimum s3 as the past maximum. The signal processing unit 18 derives the fluctuation value df1 of the maximum b4 and the minimum s3. The fluctuation value df1 is integrated into the fluctuation integrated value (fluctuation value df1) derived up to that time, thereby deriving a new fluctuation integrated value (df1+df2).

Further, letting the process timing next to the process timing td of the stationary target be the current process timing, the signal processing unit 18 sets the maximum b17 at the current process timing of the graph line L2 of the stationary target rf as the recent maximum, and sets the minimum s16 as the past minimum. The signal processing unit 18 derives the fluctuation value d14 of the maximum b17 and the minimum s16. In the integration period ad1 of the process prior to the fluctuation value d14, the fluctuation values df11, df12 and df13 are derived in the integration period ad1. For this reason, the fluctuation integrated value (df11+df12+df13+df14) obtained by integrating the fluctuation values df11, df12, df13 and d14 is derived at the process timing next to the process timing td. In this way, if the vertical of the stationary target of the stationary target is below the reference distance, the signal processing unit 18 derives the fluctuation values of the value of the recent maximum and the value of the past minimum, and derives the fluctuation integrated value obtained by integrating the fluctuation values derived.

The reason of changing the method of deriving the fluctuation values on either side of the reference distance is as follows. If the stationary target exists at the position above the reference distance, since the signal level has an increasing tendency as the vertical distance becomes short, the fluctuation value from the maximum to the minimum, in which the fluctuation value is decreased rather than that from the minimum to the maximum, is adopted to easily distinguish the on-road object RF and the stopped object FC. Further, in the case where the vertical distance of the stationary target rf1 which is the on-road object is below the third distance (vertical distance of 30 m), the amplitude of the graph line L2 indicative of the angular signal level of the stationary target rf1 is relatively decreased than that up to that time, and the value of the signal level is also lowered.

This is the reason that, as illustrated in the lower drawing in FIG. 8, as the position of the vehicle CR moves to the road surface R2 from the road surface R1, the height difference in the reference direction between the position of the vehicle CR and the position of the on-road object RF is decreased, and thus the path of the multi-path wave is overlapped with the path of the direct wave, so that the reception of the multi-path wave is reduced. Also, this is the reason that if the vehicle CR gets into close to the on-road object RF, and thus the distance between the vehicle and the object is below the third distance, the on-road object RF is deviated from the region of the beam pattern NA of the transmission wave, and thus the reception of the direct wave is reduced. As a result, in the integration period ad2 shown in the lower drawing in FIG. 13, the fluctuation value of the recent maximum and the past minimum is decreased relative to the fluctuation value of the recent minimum and the past maximum. Specifically, in the graph line L2, the fluctuation value (fluctuation value df14 from the minimum value to the maximum value) of the maximum b17 and the minimum s16 is decreased relative to the fluctuation value (fluctuation value from the maximum value to the minimum value) of the maximum b16 and the minimum s16.

Conversely, this is the reason that, as illustrated in the upper drawing in FIG. 8, as the position of the vehicle CR moves to the road surface R2 from the road surface R1, even though the height difference in the reference direction between the position of the vehicle CR and the position of the stopped vehicle FC is decreased, since the stopped vehicle FC has a certain vehicular height, the path of the multi-path wave is not overlapped with the path of the direct wave. That is, the multi-path wave is received together with the direct wave by the reception antenna 14 at a certain signal level.

In addition, if the vehicle CR gets into close to the stopped vehicle FC, and thus the distance between both vehicles is below the third distance, the stopped vehicle FC is not deviated from the region of the beam pattern NA of the transmission wave. That is, the direct wave is received by the reception antenna 14 at a relatively strong signal level as the vertical distance approaches. As a result, in the integration period ad2 shown in the upper drawing in FIG. 13, the fluctuation value of the recent maximum and the past minimum is increased relative to the fluctuation value of the recent minimum and the past maximum. Specifically, in the graph line L1, the fluctuation value (fluctuation value df2 from the minimum value to the maximum value) of the maximum b4 and the minimum s3 is decreased relative to the fluctuation value (fluctuation value from the maximum value to the minimum value) of the maximum b3 and the minimum s3.

Therefore, it is possible to perform the correct judgment based on the feature appearing in the signal level of the stationary target other than the object to be controlled in the case where the vehicle CR gets into close to the stationary target within a predetermined distance.

Figure 14:
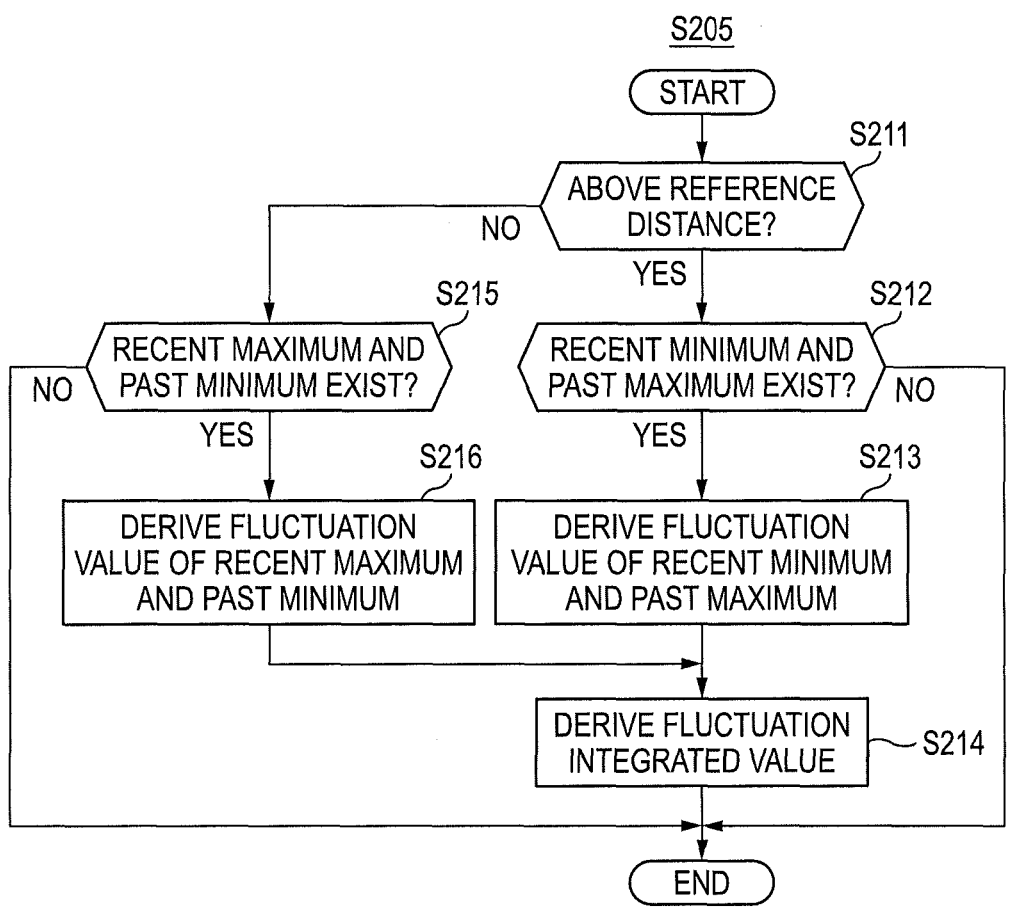
FIG. 14 is a flowchart illustrating a process of deriving a fluctuation integrated value of the angular signal.

Next, the process of deriving the fluctuation value and the fluctuation integrated value described in FIG. 13 will be described with reference to the flowchart of FIG. 14. FIG. 14 is a flowchart illustrating the process of deriving the fluctuation value and the fluctuation integrated value of the angular signal level. The signal processing unit 18 judges whether or not the vertical distance of the stationary target is above the reference distance (vertical distance of 20 m) (step S211). If the vertical distance of the stationary target is above the reference distance (Yes in step S211), the signal processing unit 18 judges whether or not the values of the recent minimum and the past maximum are derived at the current process timing based on the minimum value and the maximum value derived in step S201 (step S212). In this instance, the recent minimum and the past maximum which are already used to derive the fluctuation value are excluded. That is, this means the recent minimum and the past maximum from which the fluctuation value is not derived in the process up to that time. If the value of the recent minimum and the value of the past maximum of the angular signal are derived (Yes in step S212), the signal processing unit 18 derives the fluctuation values of the value of the recent minimum and the value of the past maximum (step S213).

The signal processing unit 18 calculates the fluctuation integrated value by integrating the fluctuation values (step S214). In step S212, if both the value of the recent minimum and the value of the past maximum are not derived (No in step S212), the signal processing unit 18 completes the process.

Returning back to step S211, if the vertical distance of the stationary target is below the reference distance (No in step S211), the signal processing unit 18 judges whether or not the values of the recent maximum and the past minimum are derived at the current process timing (step S215). In this instance, the recent maximum and the past minimum which are already used to derive the fluctuation value are excluded. If the value of the recent maximum and the value of the past maximum are derived (Yes in step S215), the signal processing unit 18 derives the fluctuation values of the value of the recent maximum and the value of the past minimum (step S216).

The signal processing unit 18 calculates the fluctuation integrated value by integrating the fluctuation values (step S214). Since the fluctuation values and the fluctuation integrated value are calculated, it is possible to define the feature of the signal level in the stationary target of the object to be controlled and the feature of the signal level in the stationary target other than the object to be controlled. Therefore, if the vehicle CR gets into close to the stationary target within a predetermined distance, it is possible to perform the correct judgment based on the feature appearing in the signal level of the stationary level other than the object to be controlled. In step S215, if both the value of the recent maximum and the value of the past minimum are not derived (No in step S215), the signal processing unit 18 completes the process.

Returning back to the flowchart of FIG. 11, the process of step S206 will be described. The signal processing unit 18 judges whether or not the vertical distance of the stationary target is between the third distance and the fourth distance. The signal processing unit 18 performs judgment of the number of maximum and minimum derived for every given process timing from the first distance of step S201, and judgment of the signal level of the angular signal initiated from the second distance of step S203. That is, if the vertical distance of the stationary target is between the third distance and the fourth distance (Yes in step S206), the signal processing unit 18 judges whether or not the number of maximum and minimum derived from the first distance above the predetermined number (step S207).

For example, if the predetermined number of maximum and minimum is two, respectively, the on-road target flag is set to the on state (step S210), when the number of maximum and minimum of the angular signal of the stationary target is respectively below one (No in step S207). After that, the signal processing unit 18 judges whether the process for all stationary targets is completed or not (step S211). Further, if the vertical distance of the stationary target is not between the third distance and the fourth distance, the signal processing unit 18 judges whether the process for all stationary targets is completed or not (step S211).

For example, unlike the on-road object RF existing on the road surface R2 having a slope with respect to the road surface R1 on which the vehicle CR exists, which have been described with reference to the lower drawings in FIGS. 7 and 8, since the on-road object existing on the road surface having the same height as the road surface R1 of the vehicle CR does not have the height according to the slope of the road surface in the reference direction, the path of the direct wave and the path of the multi-path wave are equal to each other in the path of the reflection wave at the transmission wave. That is, since the reflection wave at the transmission wave becomes almost direct wave, and the multi-path wave is not generated, the amplitude variation hardly happens in the angular signal. For this reason, counting the number of maximum and minimum from the position (first distance) from which the vehicle CR is spaced apart to a certain extent can judge the stationary target having the number of maximum and minimum which is below the predetermined number in the angular signal, as the on-road object existing on the flat road surface.

However, as illustrated in the lower drawings in FIGS. 7 and 8, for the road surface R1 on which the vehicle CR exists, the amplitude variation happens in the angular signal of the stationary target rf1, illustrated in the lower drawing in FIG. 9, of the on-road object RF existing on the road surface R2 having the slope, and thus the number of maximum and minimum is above the predetermined number. Therefore, the correct judgment may not be performed in the process of counting the number of maximum and minimum. As a result, even for the on-road target, the number of maximum and minimum is above the predetermined number (Yes in step S207), and it may proceed to the next process of step S208. That is, the stationary target of the on-road object existing on the road surface having the slope relative to the road surface on which the vehicle CR exists, may not be judged as the on-road target in the judgment process of step S207.

Returning back to the process of step S208, the signal processing unit 18 judges whether or not the value of the signal level of the angular signal derived in step S204 for every given process timing from the second distance exceeds a predetermined value (step S208). For example, if the predetermined value of the signal level of the angular signal is −35 dB, the on-road target flag of the stationary target is set to the on state (step S210) in the case where the value of the signal level of the angular signal is −35 dB or less. After that, the signal processing unit 18 judges whether the process for all stationary targets is completed or not (step S211).

For example, unlike the on-road object RF existing on the road surface R2 having a slope with respect to the road surface R1 on which the vehicle CR exists, which have been described with reference to the lower drawings in FIGS. 7 and 8, since the on-road object existing on the road surface having the same height as the road surface R1 of the vehicle CR does not have the height according to the slope of the road surface in the reference direction, the value of the signal level of the angular signal is small even though the stationary object exists within the region of the beam pattern NA of the transmission wave. As the vehicle CR gets into close to the on-road object, the on-road object starts to get out of the region of the beam pattern NA of the transmission wave, the value of the signal level of the angular signal becomes a smaller value. For this reason, the stationary target, of which the value of the signal level of the angular signal from the position (second distance) from which the vehicle CR is spaced apart to a certain extent is below the predetermined value, can be judged as the on-road object existing on the flat road surface.

However, as illustrated in the lower drawings in FIGS. 7 and 8, since the on-road object RF existing on the road surface R2 having the slope with respect to the road surface R1, on which the vehicle CR exists, exists at the relatively high position in the reference direction, the value of the signal level of the angular signal may be above the predetermined value. For this reason, the correct judgment may not be performed in the process based on the value of the signal level of the angular signal. As a result, the value of the signal level of the angular signal of the on-road target is above the predetermined value (Yes in step S208), and it proceeds to the next process of step S209. That is, the stationary target of the on-road object existing on the road surface having the slope relative to the road surface, on which the vehicle CR exists, may not be judged as the on-road target.

After the process of step S208, the signal processing unit 18 judge whether or not the fluctuation integrated value obtained by integrating the fluctuation values derived at every given process timing from the second distance is above a first threshold (e.g., 50 dB) (step S209). If the fluctuation integrated value is above the first threshold, the signal processing portion 18 judges that the stationary target is not the on-road target, but is a stationary target to be controlled. For example, in the case of the angular signal of the stationary target fc1 illustrated in the upper drawing in FIG. 13, the fluctuation value which is below the reference distance is increased than the fluctuation value which is above the reference distance, so that the fluctuation value is integrated (fluctuation value df1+df2). If the fluctuation integrated value is above the first threshold (Yes in step S209), the signal processing unit 18 judges whether the process for all stationary targets is completed or not (step S211).

Further, in the case of the stationary target rf1 illustrated in the lower drawing in FIG. 13, the fluctuation value which is below the reference distance is decreased than the fluctuation value which is above the reference distance, so that the fluctuation value is integrated (fluctuation value df11+ df12+df13+df14). If the fluctuation integrated value is below the first threshold (No in step S209), the signal processing unit 18 judges the stationary target as the on-road target, and sets the on-road target flag of the stationary target to the on state (step S210). Further, the signal processing unit 18 judges whether the process for all stationary targets is completed or not (step S211).

In this instance, the stationary target of which the on-road target flag is set to the on state is not treated as an output subject to the vehicle control device 2 in the target output process illustrated in FIG. 6. That is, the stationary target is judged as the stationary target other than the control subject of the vehicle control device 2. In this instance, for the stationary target of which the on-road target flag is set to the on state, the signal processing unit 18 continuously integrates the fluctuation value even while the vertical distance with the vehicle CR is within a predetermined distance (e.g., 30 m to 0 m). if the fluctuation integrated value within the predetermined distance is above the first threshold, the on-road target flat of the stationary target is switched from the on state to the off state.

Second Embodiment

Next, the second embodiment will be described. The signal processing unit 18 of the radar apparatus 1 according to the second embodiment adds a new process to the on-road target judging process which has been mostly described with reference to FIGS. 10 to 12 in the first embodiment, to further correctly perform the distinction of the on-road target and the stationary target.

The configuration and processing of the radar apparatus 1 according to the second embodiment are substantially identical to those of the first embodiment, except for a part of the on-road target judging process. Now, a description will be given on the basis of its difference with reference to FIGS. 15 to 17.

3. Flowchart

Figure 15:
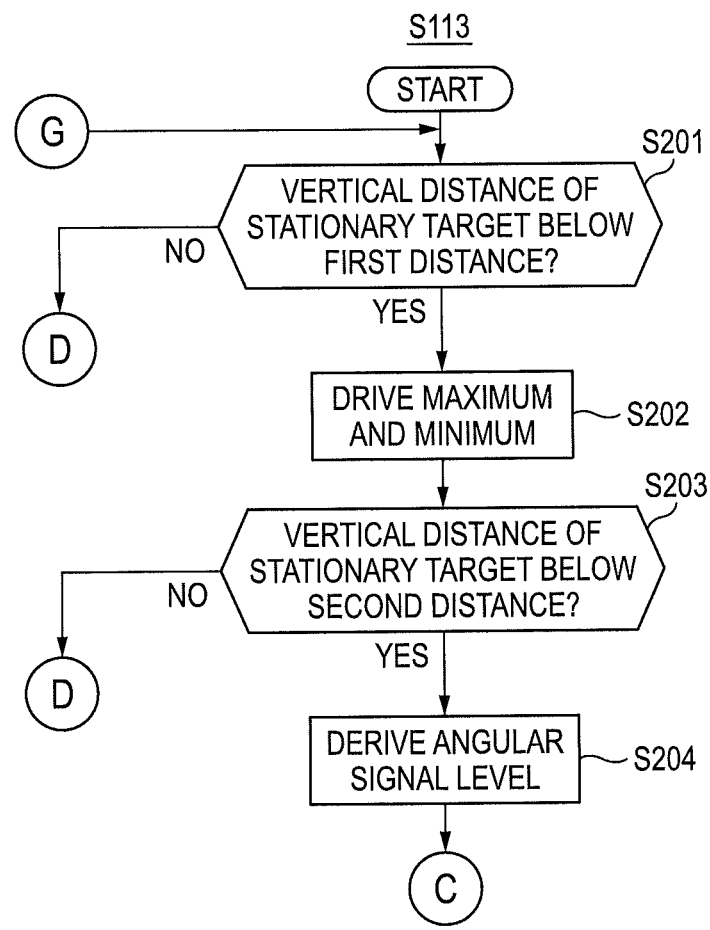
FIG. 15 is a flowchart illustrating a process of judging the on-road target.
Figure 16:
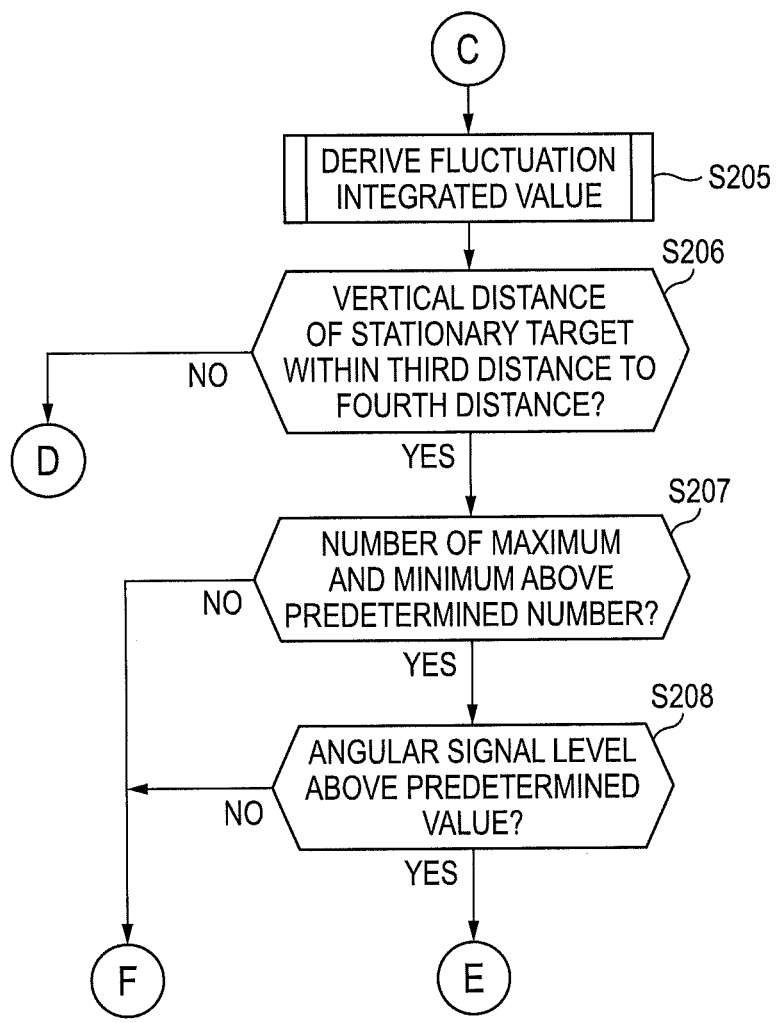
FIG. 16 is a flowchart illustrating a process of judging the on-road target.
Figure 17:
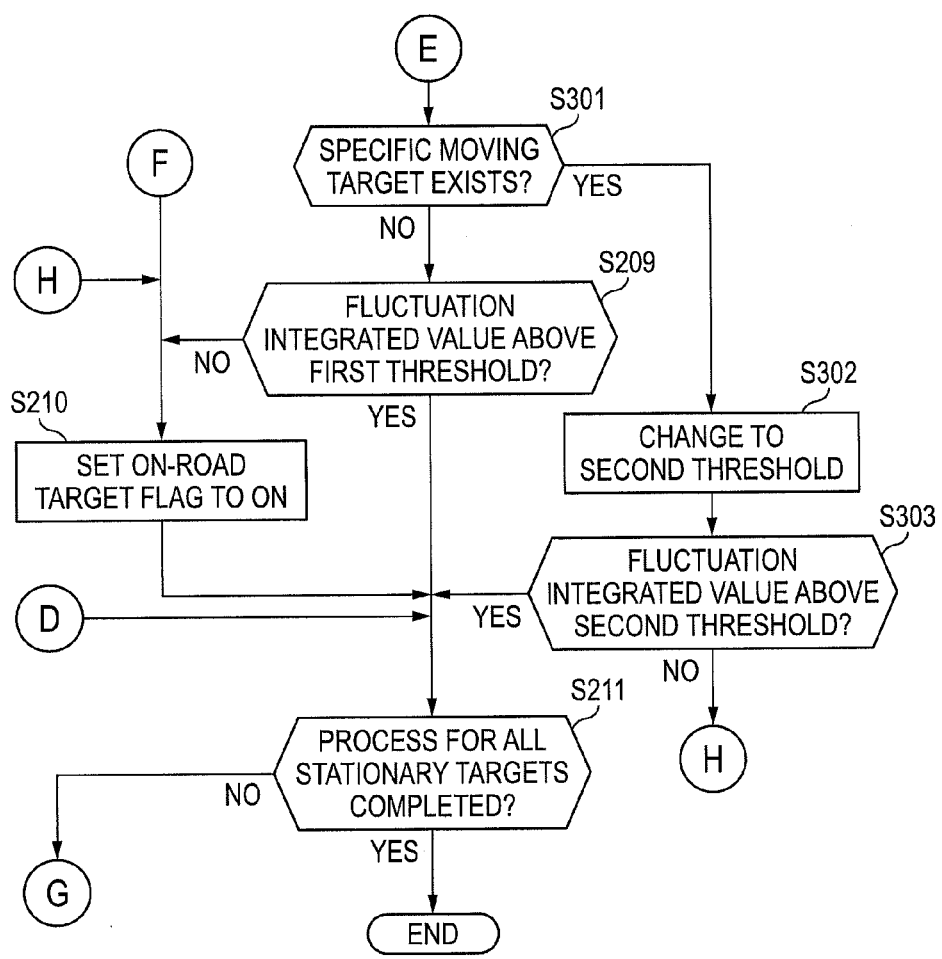
FIG. 17 is a flowchart illustrating a process of judging the on-road target.

FIGS. 15 to 17 are flowcharts of the on-road target judging process. FIGS. 15 to 17 add processes of step S301 to step S303 to the flowcharts of FIGS. 10 to 12 which have been described in the first embodiment. Specifically, to correctly judging whether or not the stationary target is the on-road target, a judgment threshold of the fluctuation integrated value is changed to a second threshold (e.g., 65 dB) higher than a first threshold (e.g., 50 dB) to easily judge the stationary target as the on-road target when the moving target, such as a preceding vehicle, exists ahead of the stationary target in the front of the vehicle CR. Accordingly, it is possible to correctly perforin the judgment of the stationary target other than the control subject, such as an on-road target, having a feature similar to the feature of the signal level of the stationary target of the control subject, such as a stationary target.

In step S208 in FIG. 16, the signal processing unit 18 judges whether or not the value of the signal level of the angular signal derived at every given process timing from the second distance exceeds a predetermined value (step S208). If the value of the signal level of the angular signal of the stationary target is above the predetermined value (Yes in step S208), it proceeds to a process of step S301 illustrated in FIG. 17.

If a specific moving target exists ahead of the vehicle CR (Yes in step S301), the signal processing unit 18 changes the first threshold (e.g., 50 dB) of the fluctuation integrated value to the second threshold (e.g., 65 dB) higher than the first threshold (step S302). Herein, the specific moving target is, for example, a moving target existing ahead of the vehicle CR, and is a target having a horizontal distance within ±1.5 m on the basis of the stationary target and a short vertical distance with respect to the vehicle CR than the stationary target.

If the fluctuation integrated value of the stationary target is below the second threshold (Yes in step S303), the signal processing unit 18 sets the on-road target flag of the stationary target to the on state (step S210).

If the fluctuation integrated value of the stationary target is above the second threshold (Yes in step S303), the signal processing unit 18 judges whether the process for all stationary targets is completed or not (step S211). The fact that the specific moving target existing ahead of the stationary target, which exists in front of the vehicle CR, more than the vehicle CR is continuously running has high possibility that the stationary target existing ahead is the on-road target, and thus the threshold of the fluctuation integrated value is increased. That is, in a case where the moving target exists at a distance closer than the stationary target, it makes the stationary target to be easily judged as the target other than the control subject, so that the stationary target is easily judged as the stationary target other than the control subject. In other words, it is difficult to judge the stationary target as the target of the control subject. If the stationary target is incorrectly judged as the target of the control subject despite the target other than the control subject, and thus the moving target exists ahead of the stationary target, the target of the control subject is a moving target closer to the vehicle CR, but a wrong control, such as deceleration, is executed for the stationary target at the time when the moving target passes the stationary target. If the stationary target is a stationary target which becomes a correct control subject, the moving target ahead of the vehicle CR avoids the stationary target, such as deceleration. Therefore, there is no problem if the vehicle CR is controlled for the moving object. Accordingly, if the moving target exists ahead of the stationary target, it is hard to judge the stationary target as the target of the control subject, thereby preventing the wrong control due to the wrong judgment.

Third Embodiment

Next, the third embodiment will be described. The signal processing unit 18 of the radar apparatus 1 according to the third embodiment adds a new process to the on-road target judging process which has been mostly described with reference to FIG. 14 in the first embodiment, to further correctly perform the distinction of the on-road target and the stationary target.

The configuration and processing of the radar apparatus 1 according to the third embodiment are substantially identical to those of the first embodiment, except for a part of the on-road target judging process. Now, a description will be given on the basis of its difference with reference to FIG. 18.

4. Processing Flowchart

Figure 18:
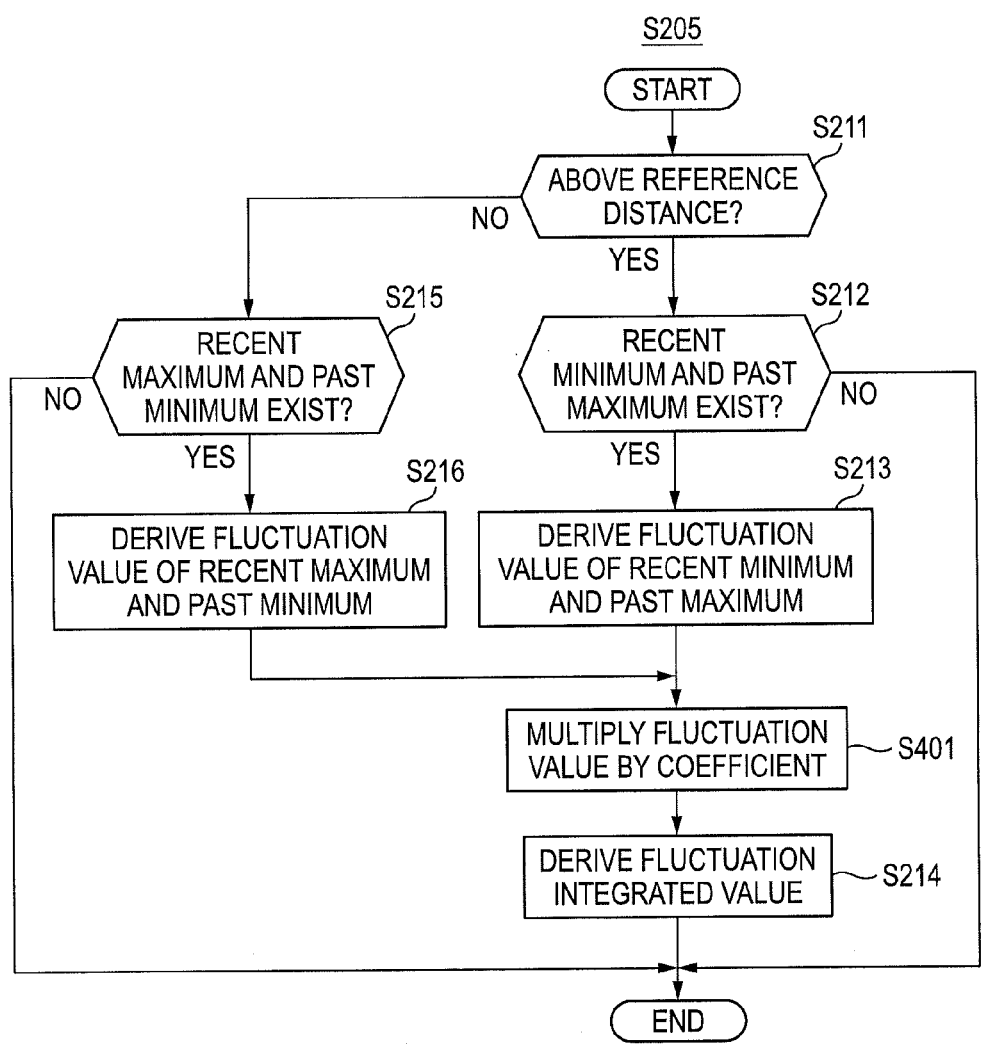
FIG. 18 is a flowchart illustrating a process of deriving the fluctuation value and the fluctuation integrated value of the angular signal.

FIG. 18 is a flowchart illustrating a process of deriving the fluctuation value and the fluctuation integrated value of the angular signal. FIG. 18 adds a process of step S401 to the flowchart of FIG. 14 which has been described in the first embodiment. Specifically, the signal processing unit 18 multiplies the fluctuation value by a coefficient according to the value of the signal level (maximum value) of the angular signal. In other words, as the signal level of the angular signal is high, an integration rate of the fluctuation value is increased. Herein, the maximum value of the angular signal is, for example, a maximum value derived at the process timing most close to the current process timing.

After the fluctuation value of the recent minimum value and the past maximum value in the process of step S213 in FIG. 18 is derived, or after the fluctuation value of the recent maximum value and the past minimum value in the process of step S216 is derived, the signal processing unit 18 multiplies the fluctuation value by the coefficient according to the maximum value of the signal level of the angular signal. The coefficient is increased as the maximum value of the signal level of the angular signal is increased. For example, the signal processing unit 18 multiplies the fluctuation by a coefficient 1.5 in the case where the maximum value is −35 dB, while multiplies the fluctuation by a coefficient 2.0 in the case where the maximum value is −30 dB. That is, the multiplication rate of the fluctuation value is increased. Accordingly, the difference between the signal level of the stationary target to be controlled, such as the stationary target, and the signal level of the stationary target other than the control subject, such as the on-road target becomes clear, thereby correctly performing the judgment of the on-road target. After the process of step S401 is completed, the signal processing unit 18 multiplies the fluctuation value to derive the fluctuation integrated value (step S214).

Fourth Embodiment

Next, the fourth embodiment will be described. The signal processing unit 18 of the radar apparatus 1 according to the fourth embodiment adds a new process to the on-road target judging process which has been mostly described with reference to FIGS. 10 to 12 in the first embodiment, to further correctly perform the distinction of the on-road target and the stationary target.

The configuration and processing of the radar apparatus 1 according to the fourth embodiment are substantially identical to those of the first embodiment, except for a part of the on-road target judging process. Now, a description will be given on the basis of its difference with reference to FIGS. 19 to 21.

5. Processing Flowchart

Figure 19:
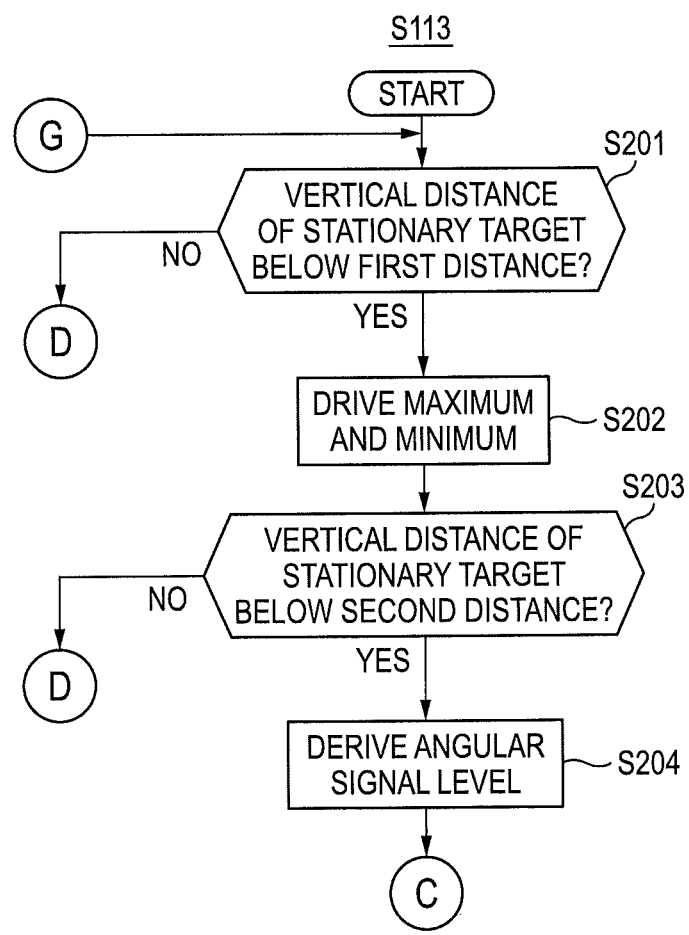
FIG. 19 is a flowchart illustrating a process of judging the on-road target.
Figure 20:
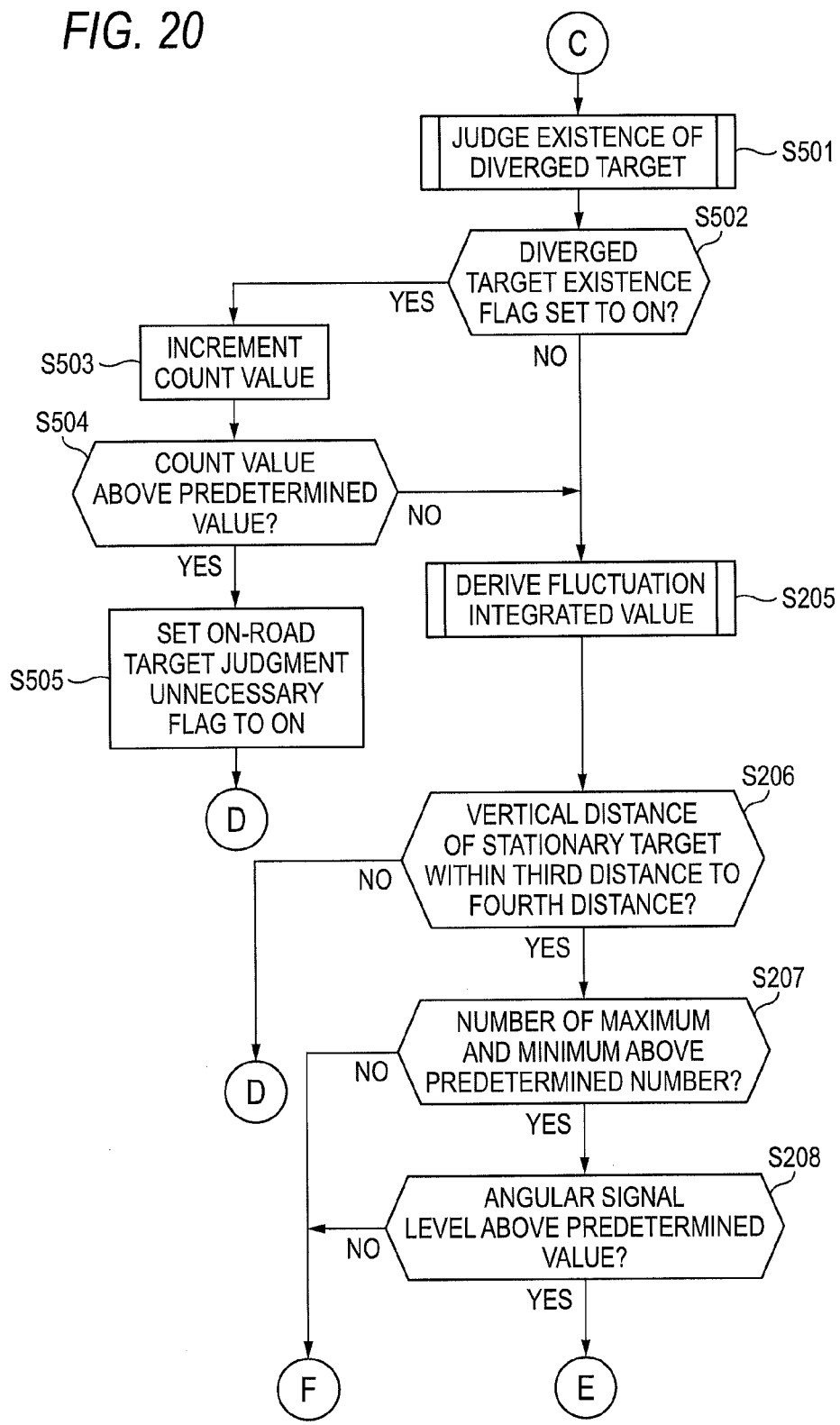
FIG. 20 is a flowchart illustrating a process of judging the on-road target.
Figure 21:
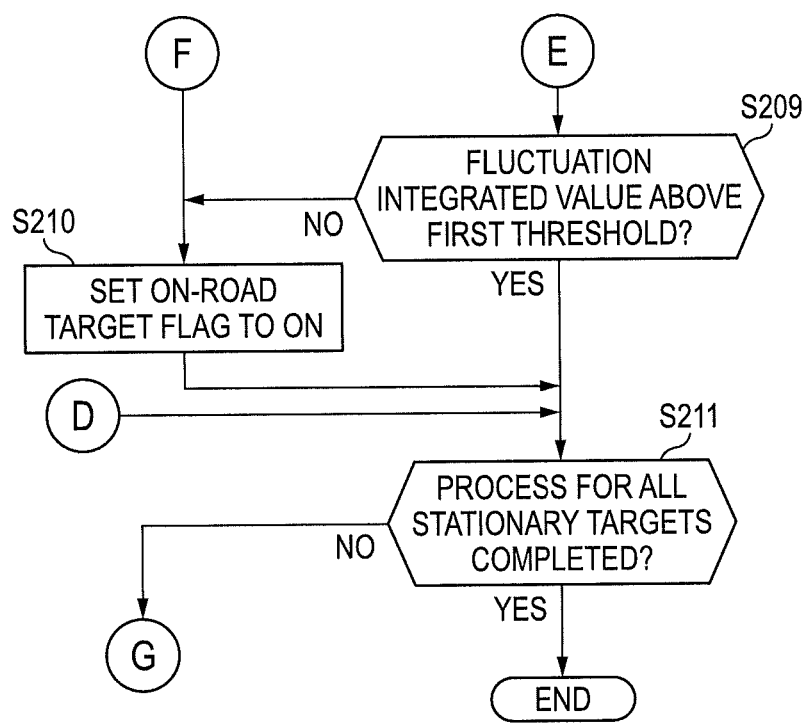
FIG. 21 is a flowchart illustrating a process of judging the on-road target.

FIGS. 19 to 21 are flowcharts of the on-road target judging process. FIGS. 19 to 21 add a process of steps S501 to S505 to the flowcharts of FIGS. 10 to 12 which have been described in the first embodiment. Specifically, the signal processing unit 18 judges whether a diverged target which is an other stationary target belonging to the same object as the stationary target exists or not, to correctly judge whether the stationary target is the on-road target. If the diverged target exists, the signal processing unit 18 increments a count value of a counter, in which the process of judging the on-road target for the stationary target is performed when the counter value is above a predetermined count value. If the count value is above the predetermined value, the signal processing unit 18 does not perform the on-road target judging process for the stationary target in the target deriving process after the next step. Therefore, it is possible to prevent mis-judgment in which the stationary target other than the control subject, such as the on-road target, is judged as the stationary target to be controlled, thereby decreasing a process load caused by judging whether it is the stationary target other than the control subject.

In step S204 in FIG. 19, if the stationary target is below the second distance, the signal processing unit 18 derives a value of the signal level of the angular signal (step S204), and proceeds to step S501 illustrated in FIG. 20. The signal processing unit 18 judges whether the diverged target belonging to the same object as the stationary target exists or not (step S501).

Figure 22:
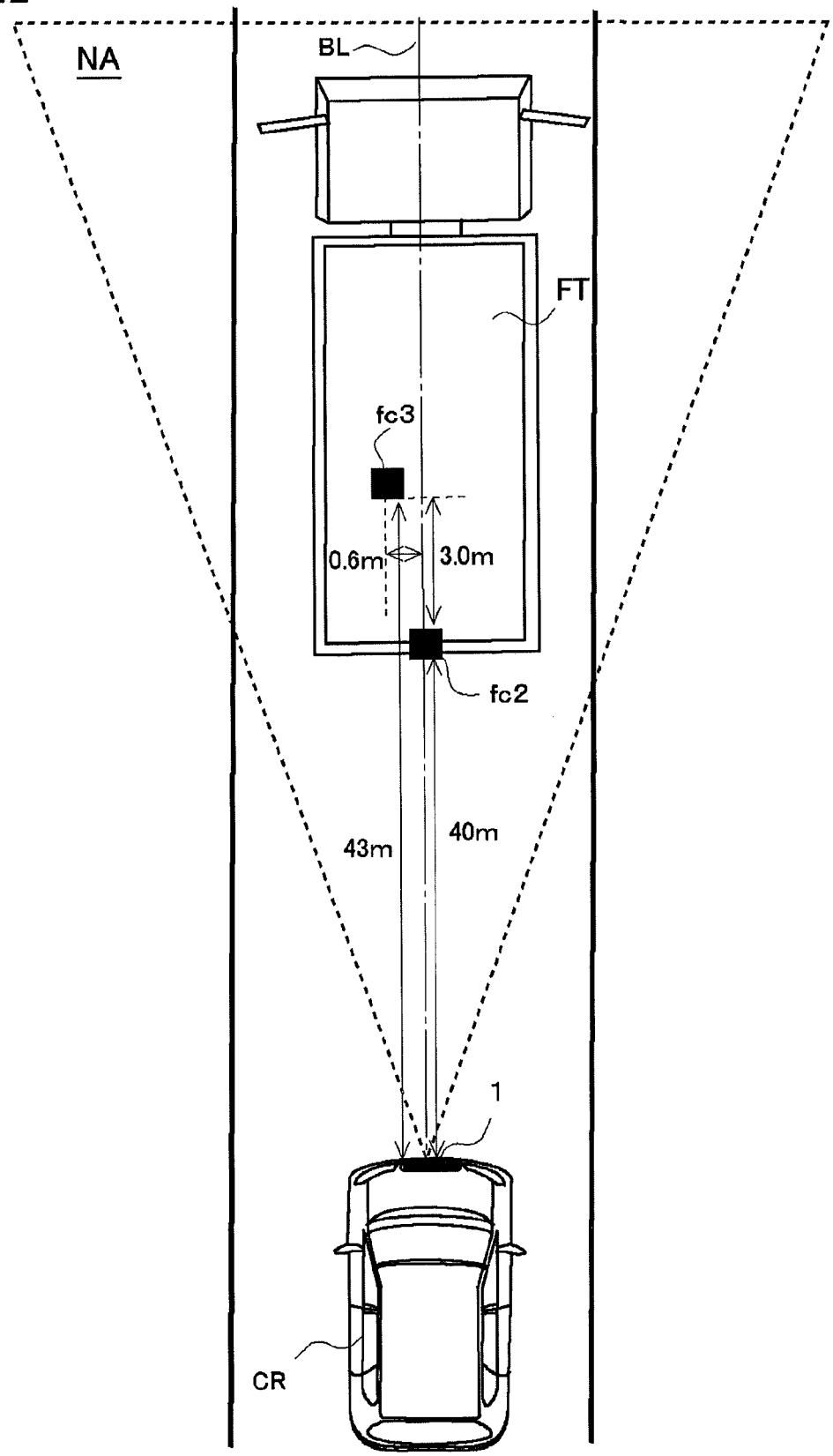
FIG. 22 is a diagram describing a diverged target relating to a stopped vehicle ahead of a vehicle.

After the diverged target is described with reference to FIGS. 22 and 23, the process of judging the diverged target will be described in detail with reference to FIGS. 24 and 25. FIG. 22 is a diagram describing the diverged target relating to the stopped vehicle FT ahead of the vehicle CR. A stationary target fc2 and a stationary target fc3 are derived in FIG. 22. The stationary target fc3 is a diverged target of the stationary target fc2. In other words, letting one stationary target fc2 be a reference stationary target, a stationary target with a relative speed difference of approximately 0 km/h located at a position near the stationary target fc2 becomes the diverged target. For example, if the preceding stopped vehicle FT is a truck, a target (stationary target fc2) may be derived based on the reflection wave from a rear end portion of the object having a certain size in the same traveling direction of the vehicle CR as the stopped vehicle FT, and, simultaneously, the transmission wave may enter between the vehicular body and the road surface to derive a target (stationary target fc2) based on the reflection wave from a bottom portion of the vehicular body.

Concretely describing the fourth embodiment with reference to FIG. 22, the stopped vehicle FT is included in the beam pattern NA of the transmission wave ahead of the vehicle CR. The stationary target fc2 derived based on the reflection wave from a rear end portion of the stopped vehicle FT is a target of which a vertical distance with respect to the vehicle CR is 40 m, a vertical distance is 0 m, and a relative speed is the substantially same speed (e.g., 60 km/h) as the speed of the vehicle CR. Other stationary target fc3 belonging to the same object (stopped vehicle FT) as the stationary target fc2 is a target of which a vertical distance difference with respect to the stationary target fc2 is 3.0 m, a horizontal distance difference is 0.6 m, and a relative speed difference is 0 km/h. Since the target meets the condition to judge the diverged target which will be described below, it is judged as the diverged target. The signal processing unit 18 does not perform the on-road target judging process for the stationary target fc2 in which the diverged target (stationary target fc3) exists.

Figure 23:
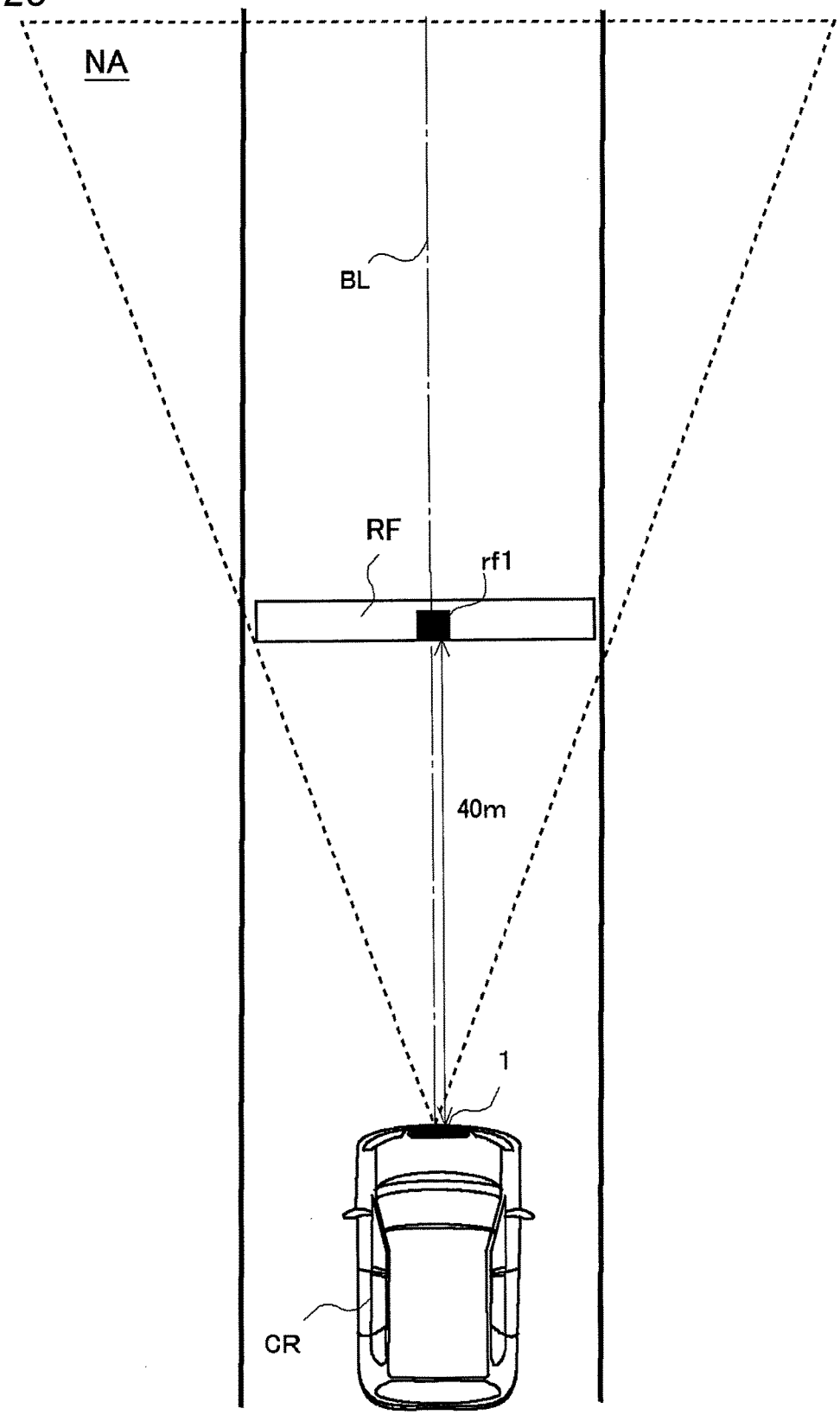
FIG. 23 is a diagram describing a target relating to an on-road object ahead of a vehicle.

However, as illustrated in FIG. 23, the on-road RF, such as a joint member of a road and a road, has almost no size in the traveling direction of the vehicle CR as comparison to the stopped vehicle FT. Therefore, since the transmission wave does not enter between the on-road object and the road surface, the diverged target for the stationary target rf1 is not formed. FIG. 23 is a diagram describing the target relating to the on-road object RF ahead of the vehicle CR. FIG. 23 shows the stationary target rf1 corresponding to the on-road object RF. Herein, the on-road object RF has almost no size in the traveling direction of the vehicle CR as comparison to the stopped vehicle FT, as described above. Therefore, since the transmission wave does not enter between the on-road object and the road surface, there is no stationary target having the substantially same relative speed near the stationary target rf1 even in the case the stationary target rf1 is set to the reference target. The target processing unit 18 performs the on-road target judging process for the stationary target rf1 in which the diverged target does not exist.

Next, a process of judging the existence of the diverged target will be described with reference to FIGS. 24 and 25. FIGS. 24 and 25 are flowcharts of a diverged target judging process. The signal processing unit 18 judges whether or not the vertical distance of the stationary target to the vehicle CR is blow 50 m (step S511). If the vertical distance of the stationary target is below 50 m (Yes in step S511), the signal processing unit 18 judges whether or not the horizontal distance of the stationary target to the vehicle CR is below ±0.7 m (step S512). If the horizontal distance of the stationary target is below ±0.7 m (Yes in step S512), the signal processing unit 18 sets the stationary target as the reference target (step S513). In this instance, the signal processing unit S512 completes the process if the vertical distance of the stationary target is above 50 m, or if the horizontal distance of the stationary target is above 0.7 m.

Returning back to a process of step S514, the signal processing unit 18 judges whether or not the other stationary target exists within a range of the vertical distance difference of 0 to 4.0 m to the reference target (step S514). If the stationary target exists within the range of the vertical distance difference of 0 to 4.0 m to the reference target (Yes in step S514), the signal processing unit 18 judges whether or not, among the stationary targets existing within the range of the vertical distance difference of 0 to 4.0 m, the stationary target exists within a range of the horizontal distance difference of ±1.0 (step S515). If among the stationary targets meeting the condition (condition of step S514) of the vertical distance difference, the stationary target exists within the range of the horizontal distance difference of ±1.0 (Yes in step S515), the signal processing unit 18 judges whether or not a stationary target exists within a range of the relative speed difference of ±1.0 m/s$^2$, among the stationary targets meeting the condition of the vertical distance and the condition of the horizontal distance (conditions of step S515) (step S516 in FIG. 25).

Figure 24:
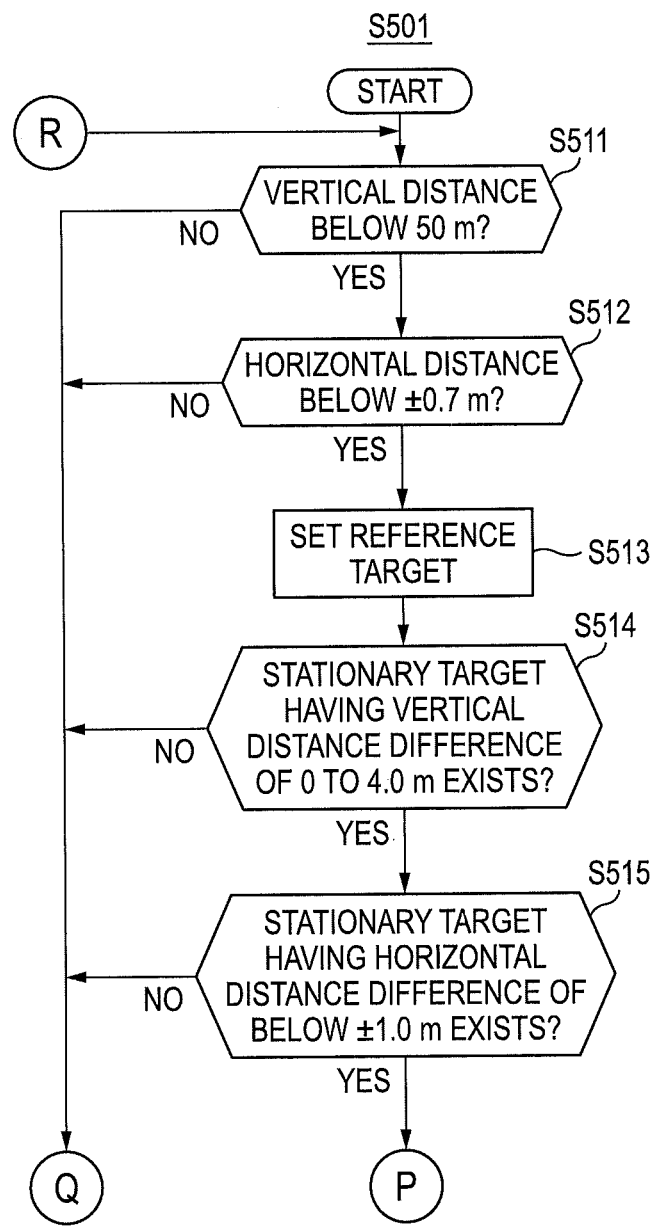
FIG. 24 is a flowchart of a diverged target judging process.
Figure 25:
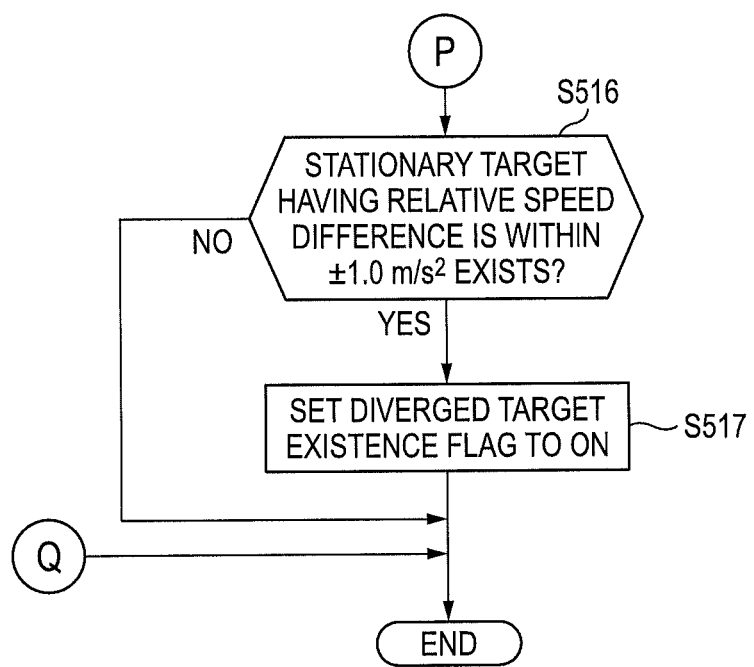
FIG. 25 is a flowchart of the diverged target judging process.

If there is the stationary target meeting the conditions (step of step S516) of the vertical distance difference, the horizontal distance difference, and the relative speed difference (Yes in step S516), the signal processing unit 18 Returning back to a process of step 502 in FIG. 20, if a diverged target existence flag for the stationary flag which becomes the reference target in the description of FIGS. 24 and 25 is set to the on state, that is, if the diverged target belonging to the same object as the stationary target (Yes in step S502), the signal processing unit 18 increments a count value of a counter (step S503). If the count value of the counter is above a predetermined count value (Yes in step S504), the signal processing unit 18 sets an on-road target judgment unnecessary flag of the stationary target to the on state (step S505).

As a result, in the target deriving process after the next process, the signal processing unit 18 does not perform the on-road target judgment of the stationary target of which the on-road target judgment unnecessary flag is set to the on state. Accordingly, it is possible to prevent misjudgment in which the stationary target other than the control subject, such as the on-road target, is judged as the stationary target to be controlled, thereby decreasing a process load caused by judging whether it is the stationary target other than the control subject. After the process of step S505, the signal processing unit 18 judges whether or not the process for all stationary targets is completed (step S211). In the process of step S504, if the count value of the counter is below the predetermined count value, the signal processing unit 18 performs a process of deriving the fluctuation integrated value.

Fifth Embodiment

Next, the fifth embodiment will be described. The signal processing unit 18 of the radar apparatus 1 according to the fifth embodiment adds a new process to the on-road target judging process which has been mostly described with reference to FIGS. 10 to 12 in the first embodiment, to further correctly perform the distinction of the on-road target and the stationary target.

The configuration and processing of the radar apparatus 1 according to the fifth embodiment are substantially identical to those of the first embodiment, except for a part of the on-road target judging process. Now, a description will be given on the basis of its difference with reference to FIGS. 26 to 29.

5. Processing Flowchart

FIGS. 26 to 29 are flowcharts of the on-road target judging process. FIGS. 26 to 29 add steps S601 to S604 and the process of steps S503 to S505 which has been described in the fourth embodiment to the flowcharts of FIGS. 10 to 12. Specifically, to correctly judge whether or not the stationary target is the on-road target, in the case where there is a plurality of stationary targets (hereinafter referred to as a continuous stationary target) continuously existing in the traveling direction of the vehicle CR, as the stationary target such as a wall or a guardrail existing on at least one of left and right sides of the stationary target, the signal processing unit 18 judges whether or not the stationary target has a substantially symmetrical positional relation with the other stationary target, with the continuous stationary target being interposed.

If the stationary target has a substantially symmetrical positional relation with the other stationary target via the continuous stationary target, the signal processing unit 18 increments a count value of a counter, in which the process of judging the on-road target for the stationary target is performed when the counter value is above a predetermined count value. If the count value is above the predetermined value, the signal processing unit 18 does not perform the on-road target judging process for the stationary target in the target deriving process after the next step. Therefore, it is possible to prevent mis-judgment in which the stationary target other than the control subject is judged as the stationary target to be controlled, thereby decreasing a process load caused by judging whether it is the stationary target other than the control subject.

Figure 26:
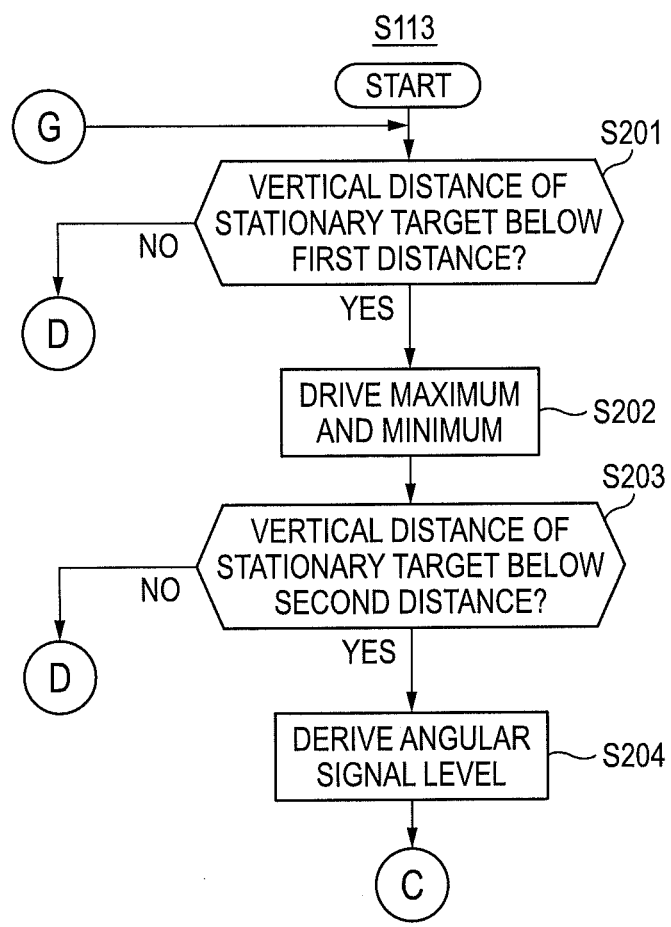
FIG. 26 is a flowchart of the diverged target judging process.

In step S204 of FIG. 26, if the stationary target is below the second distance, the signal processing unit 18 derives a value of the signal level of the angular signal (step S204), and proceeds to a process of step S601 shown in FIG. 27. The signal processing unit 18 performs the process of deriving the continuous stationary target (step S601). If there is the continuous stationary target (Yes in step S602), the signal processing unit 18 judges whether or not there is a stationary target (hereinafter referred to as a reflective target) which is derived at a position in which the continuous stationary target is interposed (step S603).

If the transmission wave of the radar apparatus 1 is reflected from the object such as the stopped vehicle FC ahead of the vehicle, and the reflection wave is not directly received by the reception antenna 14 of the radar apparatus 1, but is reflected at the wall or the like which is the continuous stationary wall, the target for the continuous stationary target, such as a wall where the preceding vehicle exists, is not derived from the existing side of the vehicle CR, but is derived from a side opposite to the existing side of the vehicle CR, that is, the position in which the continuous stationary target is interposed.

Hereinafter, the continuous stationary target and the reflective target will be described with reference to FIGS. 30 and 31, and then the process of judging the existence of the reflective target will be described with reference to FIGS. 32 and 33.

Figure 30:
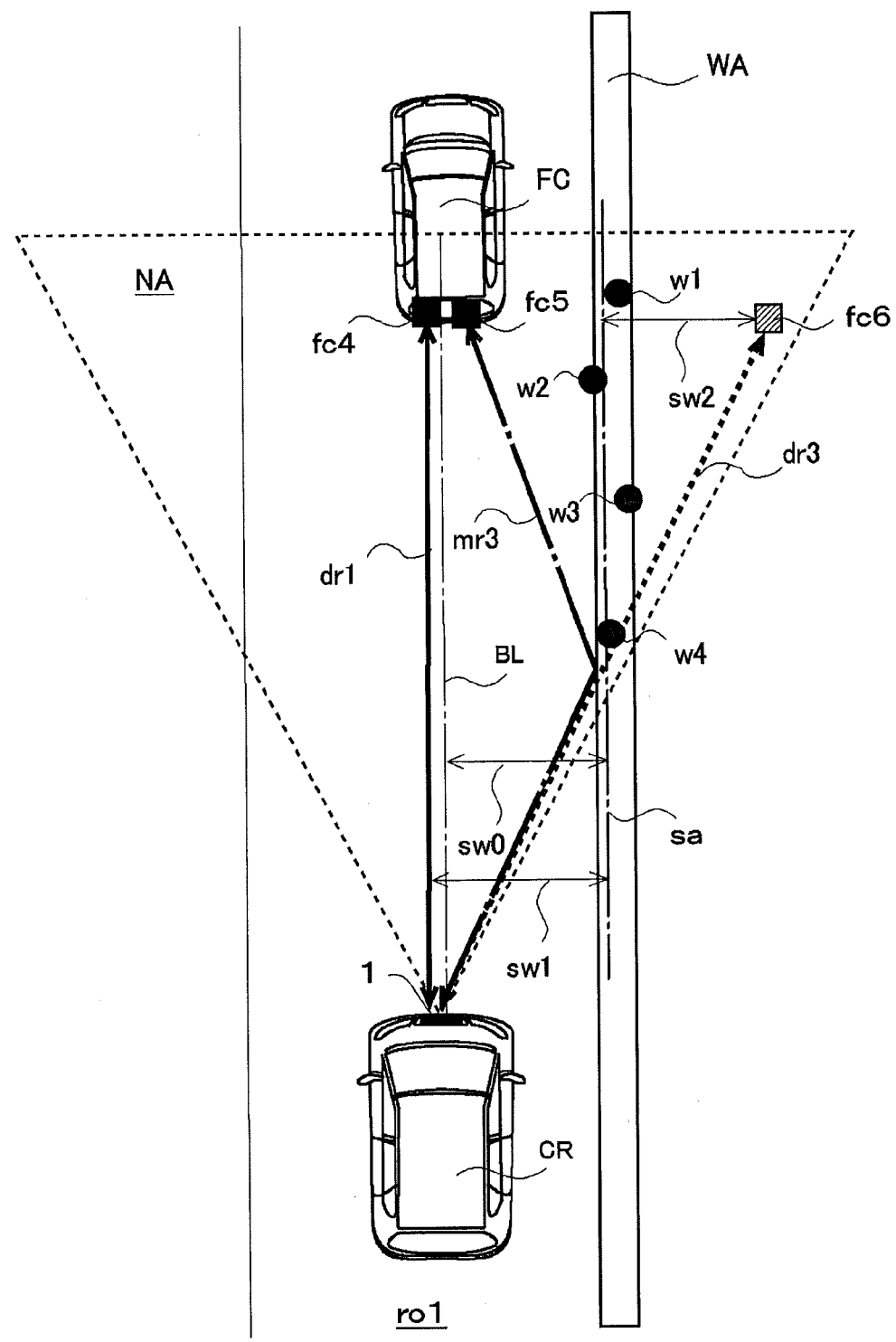
FIG. 30 is a diagram describing continuous stationary targets and a reflective target relating to a stopped vehicle ahead of a vehicle.

FIG. 30 is a diagram describing the continuous stationary target and the reflective target relating to the stopped vehicle FC ahead of the vehicle CR. FIG. 31 is a diagram describing the reflective target relating to the stopped vehicle RF ahead of the vehicle CR. In FIG. 30, the vehicle CR runs in a traffic lane ro1, and the stopped vehicle FC exists ahead. A plurality of stationary targets (stationary targets w1, w2, w3 and w4) corresponding to a wall WA in the traveling direction of the vehicle CR are derived from a right side of the traffic lane ro1. The signal processing unit 18 derives a position (hereinafter referred to as a representative position) obtained by taking an average on the horizontal distances of the continuous stationary targets, which are the plurality of stationary targets. In this instance, the horizontal distance of the representative position becomes a representative horizontal distance sw0.

As illustrated in FIG. 30, in the case where the wall WA exists at the side of the stopped vehicle FC, the reflection wave from the stopped vehicle FC may include a direct wave dr1 directly received by the reception antenna 14 as a reflection wave of the stationary target fc4, and a multi-path wave mr3 reflected from the wall WA and then received by the reception antenna 14 as the reflection wave of the stationary target fc5. The reason why reflection waves of plural paths are generated based on the stationary target fc4 and the stationary target fc5 (fc6) among the reflection waves of the stopped vehicle FC is as follows. That is, the rear portion of the stopped vehicle FC is a relatively large portion, and its surface has a plurality of recessed portions, thereby generating the reflection waves of plural paths.

Since the direct wave dr1 is received by the reception antenna 14, target information of the actual position is acquired from the stationary target fc4 from which the target information is derived, but when the multi-path wave mr3 is received by the reception antenna 14, not the target information of the actual position, but target information of the position indicating the stationary target fc6 is acquired from the stationary target fc5 from which the target information is derived. That is, the signal processing unit 18 derives the target information of the multi-path wave mr3 as the target information of the direct wave dr3, thereby deriving the target information of the position different from the position at which the original stationary target f5 exists.

Figure 31:
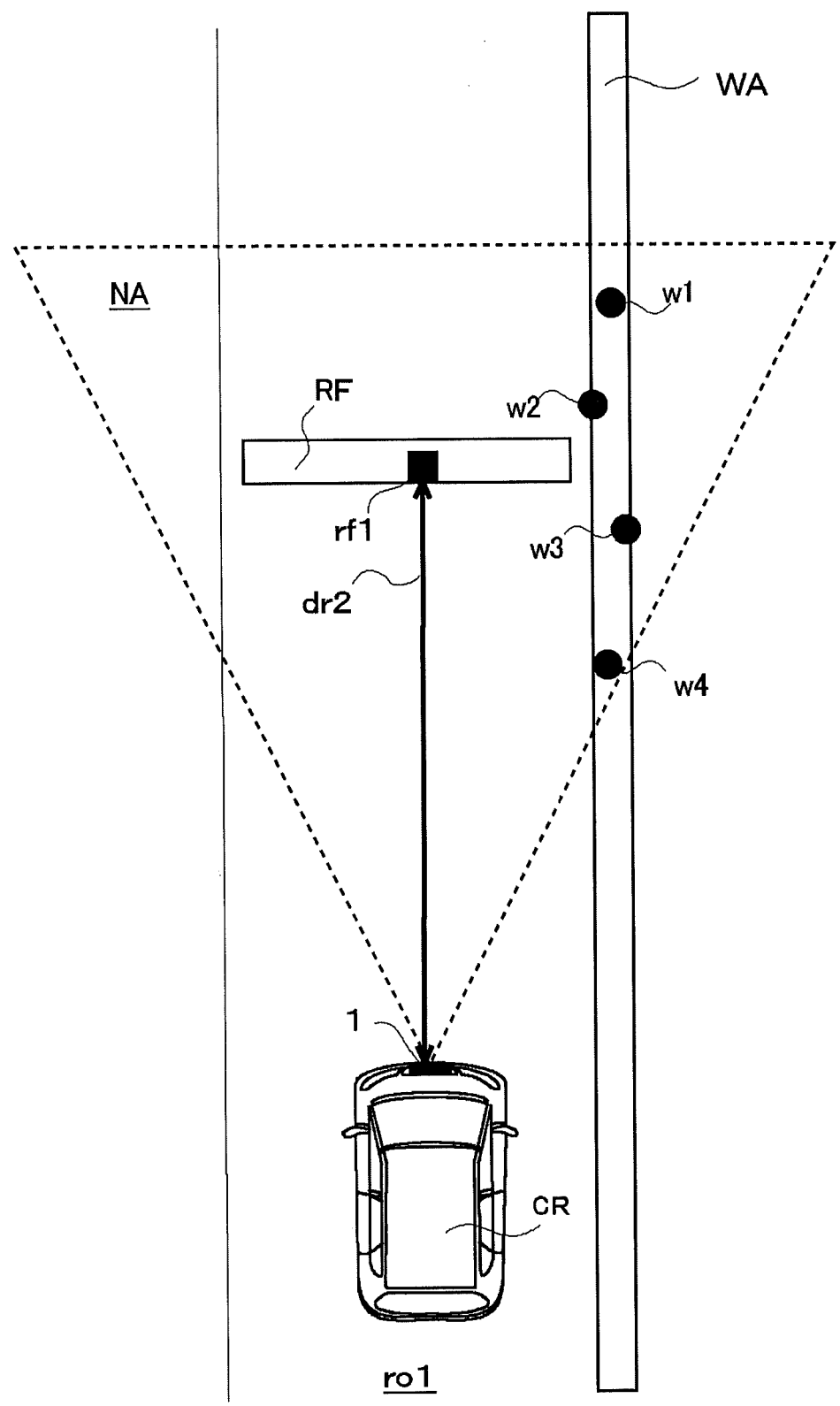
FIG. 31 is a diagram describing a reflective target relating to a stopped vehicle ahead of a vehicle.

In the case of the on-road object RF illustrated in FIG. 31, however, only the direct wave dr2 is received by the antenna 14, but the multi-path wave is not generated. For this reason, the multi-path wave is not received by the reception antenna 14. The on-road object RF has almost no height as comparison to the height of the vehicular body, contrary to the stopped vehicle FC, and has a relatively small surface area. Further, since the surface of the on-road object RF has a relatively uniform shape, the reflection waves of plural paths are not generated, and only the path of the direct wave dr2 is generated, as illustrated in FIG. 31.

In the case of the stopped vehicle FC, as illustrated in FIG. 30, the signal processing unit 18 derives a horizontal distance sw1 of the stationary target fc4 of the direct wave dr1, and a horizontal wave sw2 of the stationary target fc6 of the direct wave dr3, based on a representative position sa. If the difference between the horizontal distance sw1 and the horizontal distance sw2 is within a predetermined range (e.g., within +0.5 m), the signal processing unit 18 judges that the reflective target (stationary target fc6) exists in the stationary target fc4, and thus sets the reflective target existence flag of the stationary target fc4 to the on state. The signal processing unit 18 does not perform the on-road target judging process for the stationary target fc4 in which the reflective target exists.

In this instance, there is no reflective target with respect to the stationary target rf1 illustrated in FIG. 31. The signal processing unit 18 performs the on-road target judging process for the stationary target fr1 in which there is no reflective target.

Next, the process of judging the existence of the reflective target will be described with reference to the flowcharts of FIGS. 32 and 33. FIGS. 32 and 33 are flowcharts illustrating the process of judging the existence of the reflective target. The signal processing unit 18 judges whether or not the vertical distance of the stationary target with respect to the vehicle CR is below 50 m (step S611). If the vertical distance of the stationary target is below 50 m (Yes in step S611), the signal processing unit 18 judges whether or not the horizontal distance of the stationary target with respect to the vehicle CR is below ±0.7 m (step S612). If the horizontal distance of the stationary target the vehicle CR is below ±0.7 m (Yes in step S612), the signal processing unit 18 sets the stationary target as the reference target (step S613). For example, if the stationary target fc4 of FIG. 30 and the stationary target rf1 of FIG. 31 which are the subject of the on-road target judging process meet the condition of the vertical distance and the horizontal distance, the signal processing unit 18 completes the process if the vertical distance of the stationary target is above 50 m or if the horizontal distance of the stationary target is above 0.7 m.

Returning back to a process of step S614, the signal processing unit 18 whether or not there is a stationary target (hereinafter referred to as a vertical approximate stationary target) having the substantially same vertical distance as the reference target (step S614). If the vertical approximate stationary target exists (Yes in step S614), the signal processing unit 18 judges whether or not the difference between the horizontal distance sw1 of the reference target based on the representative position sa and the horizontal wave sw2 of the vertical approximate stationary target based on the representative position sa is within +0.5 in (step S615), letting the representative position sa be a reference position (e.g., 0 m).

If the difference between the horizontal distance sw1 of the reference target based on the representative position sa and the horizontal wave sw2 of the vertical approximate stationary target based on the representative position sa is within ±0.5 m (Yes in step S615), the signal processing unit 18 sets the reflective target existence flag indicating the existence of the reflective target with respect to the stationary target of the reference target to the on state (step S616 in FIG. 33), and then completes the process.

Figure 32:
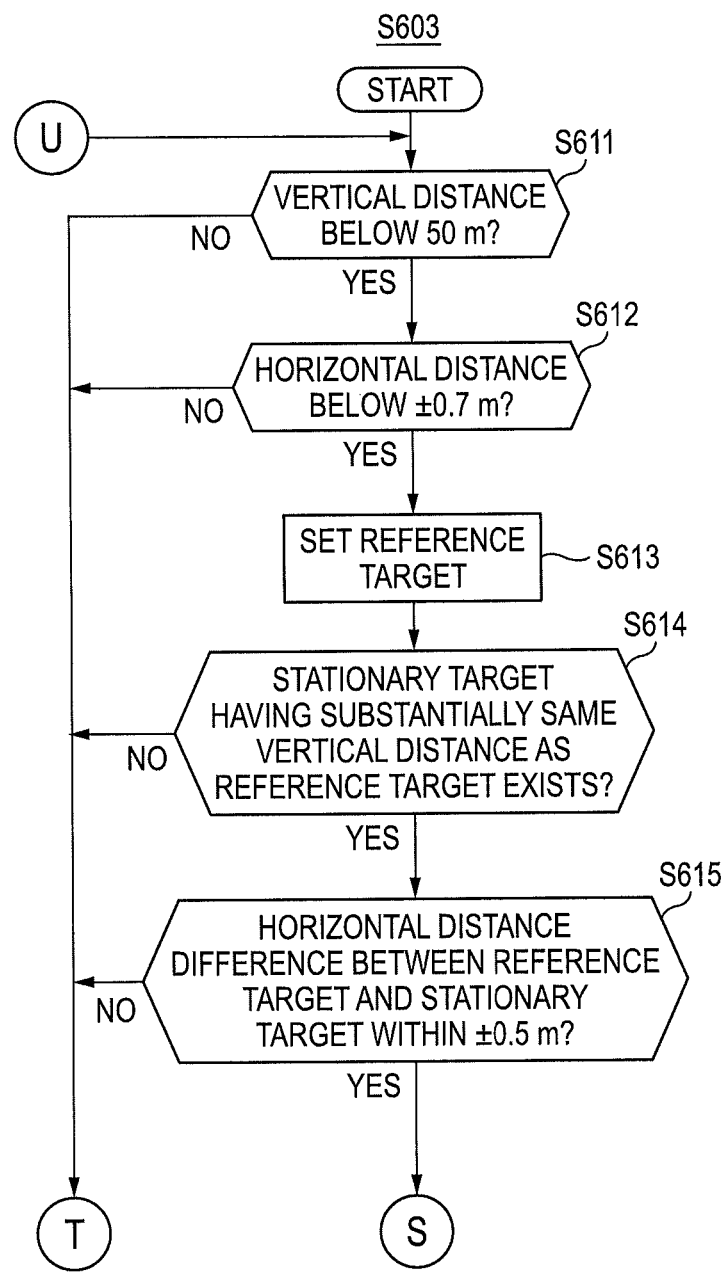
FIG. 32 is a flowchart illustrating a process of judging existence of a reflective target.
Figure 33:
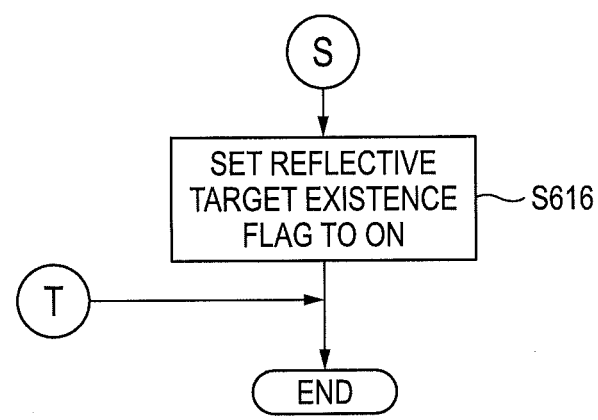
FIG. 33 is a flowchart illustrating the process of judging the existence of the reflective target.

In the process of step S614 in FIG. 32, if there is no vertical approximate stationary target (No in step S614), or in the process of step S615, letting the representative position sa be a reference position (e.g., 0 m), if the difference between the horizontal distance sw1 of the reference target based on the representative position sa and the horizontal wave sw2 of the vertical approximate stationary target based on the representative position sa is not within ±0.5 m (No in step S615), the signal processing unit 18 completes the process.

Figure 27:
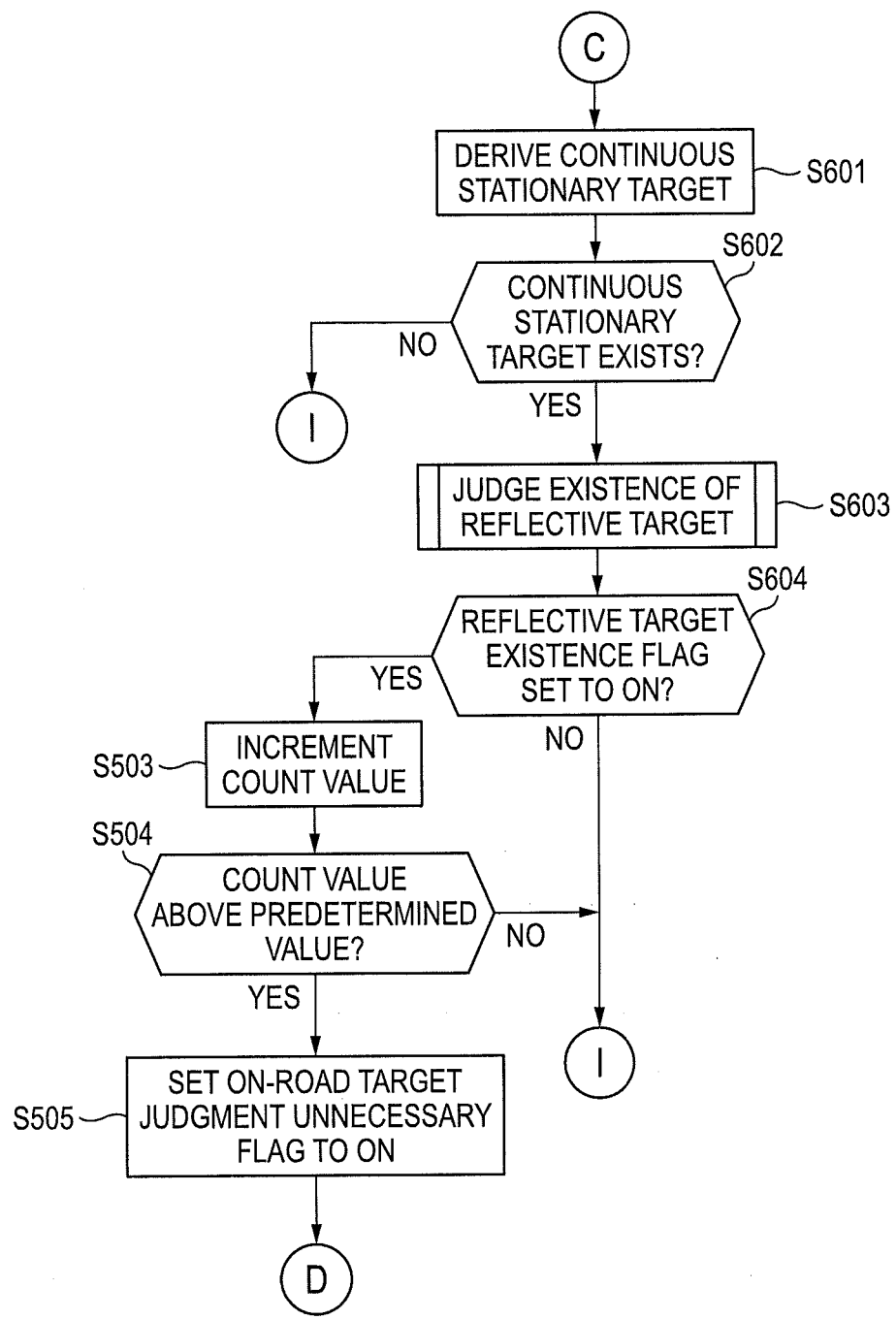
FIG. 27 is a flowchart of the diverged target judging process.
Figure 28:
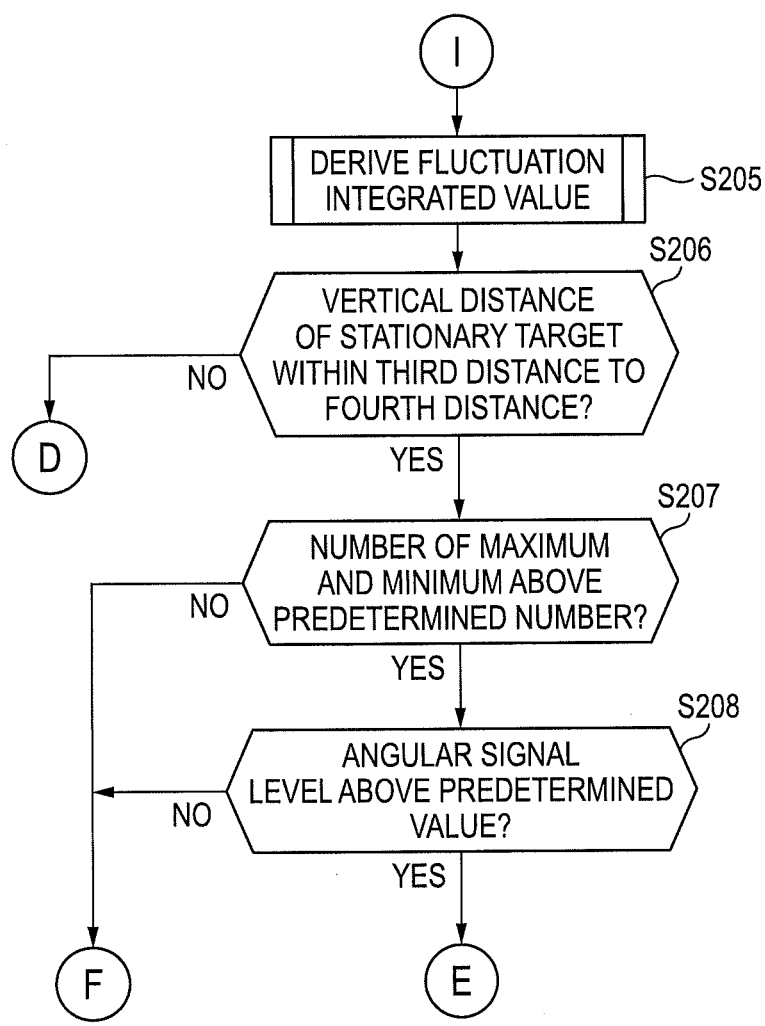
FIG. 28 is a flowchart of the diverged target judging process.
Figure 29:
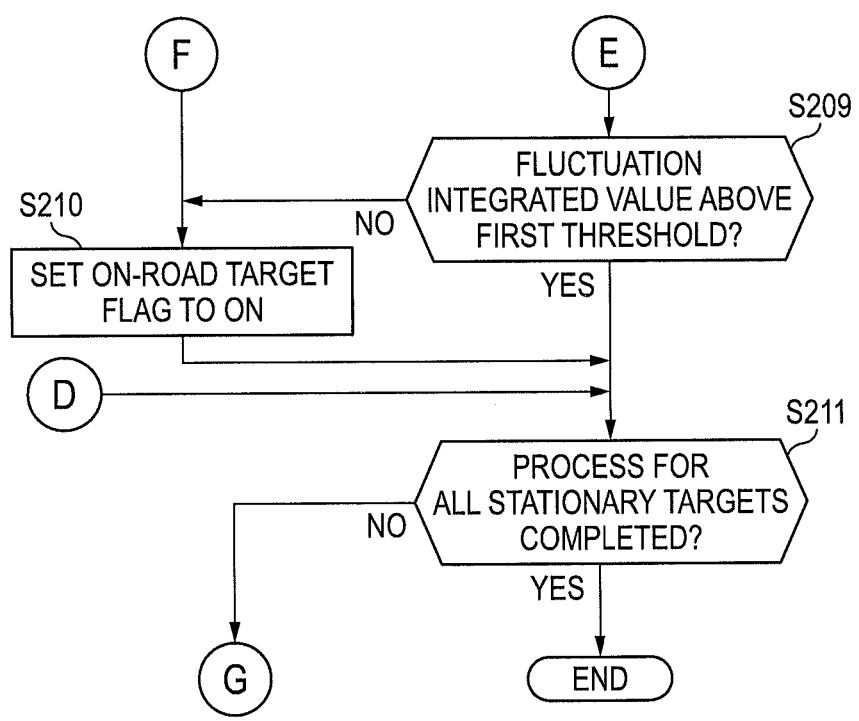
FIG. 29 is a flowchart of the diverged target judging process.

Returning back to a process of step 604 in FIG. 27, if the reflective target existence flag for the stationary target is set to the on state, that is, if there is the reflective target for the stationary target (Yes in step S604), the signal processing unit 18 increments a count value of a counter (step S503). If the count value of the counter is above a predetermined count value (Yes in step S504), the signal processing unit 18 sets an on-road target judgment unnecessary flag of the stationary target to the on state (step S505).

As a result, the signal processing unit 18 does not perform the on-road target judging process for the stationary target, of which the on-road target judgment unnecessary flag is set to the on state, in the target deriving process after the next step. Therefore, it is possible to prevent misjudgment in which the stationary target other than the control subject, such as the on-road target, is judged as the stationary target to be controlled, thereby decreasing a process load caused by judging whether it is the stationary target other than the control subject.

After the process of step S505, the signal processing unit 18 judges whether or not the process of judging the on-road target for all stationary targets is completed (step S211). In the process of step S504, if the count value of the counter is below a predetermined count value, the signal processing unit 18 performs the process of deriving the fluctuation integrated value (step S205). Further, in the process of step S604, if the reflective target flag of the stationary target of the control subject is set to the off state, the signal processing unit 18 derives the fluctuation integrated value (step S205).

Sixth Embodiment

Next, the sixth embodiment will be described. The signal processing unit 18 of the radar apparatus 1 according to the sixth embodiment adds a new process to the on-road target judging process which has been mostly described with reference to FIGS. 19 to 21 in the first embodiment, to further correctly perform the distinction of the on-road target and the stationary target.

The configuration and processing of the radar apparatus 1 according to the sixth embodiment are substantially identical to those of the fourth embodiment, except for a part of the on-road target judging process. Now, a description will be given on the basis of its difference with reference to FIGS. 34 to 36.

5. Processing Flowchart

Figure 34:
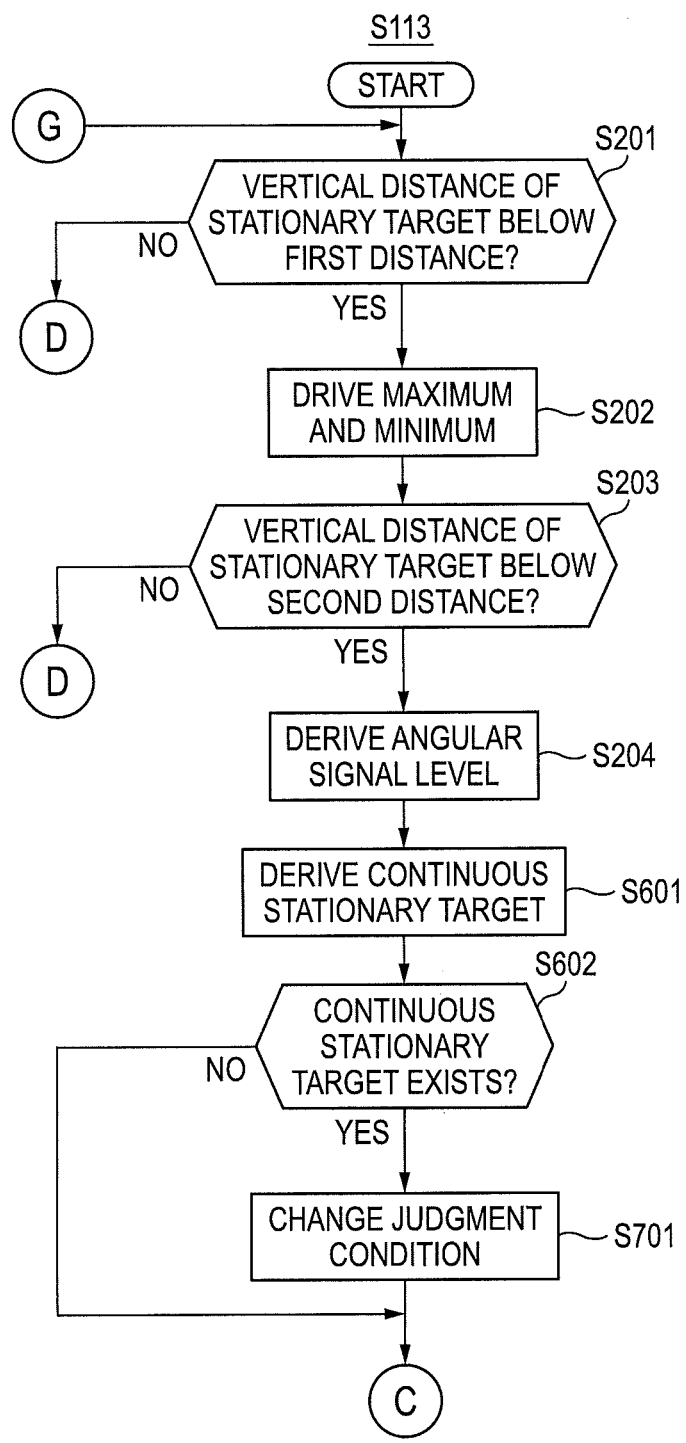
FIG. 34 is a flowchart of an on-road target judging process.
Figure 35:
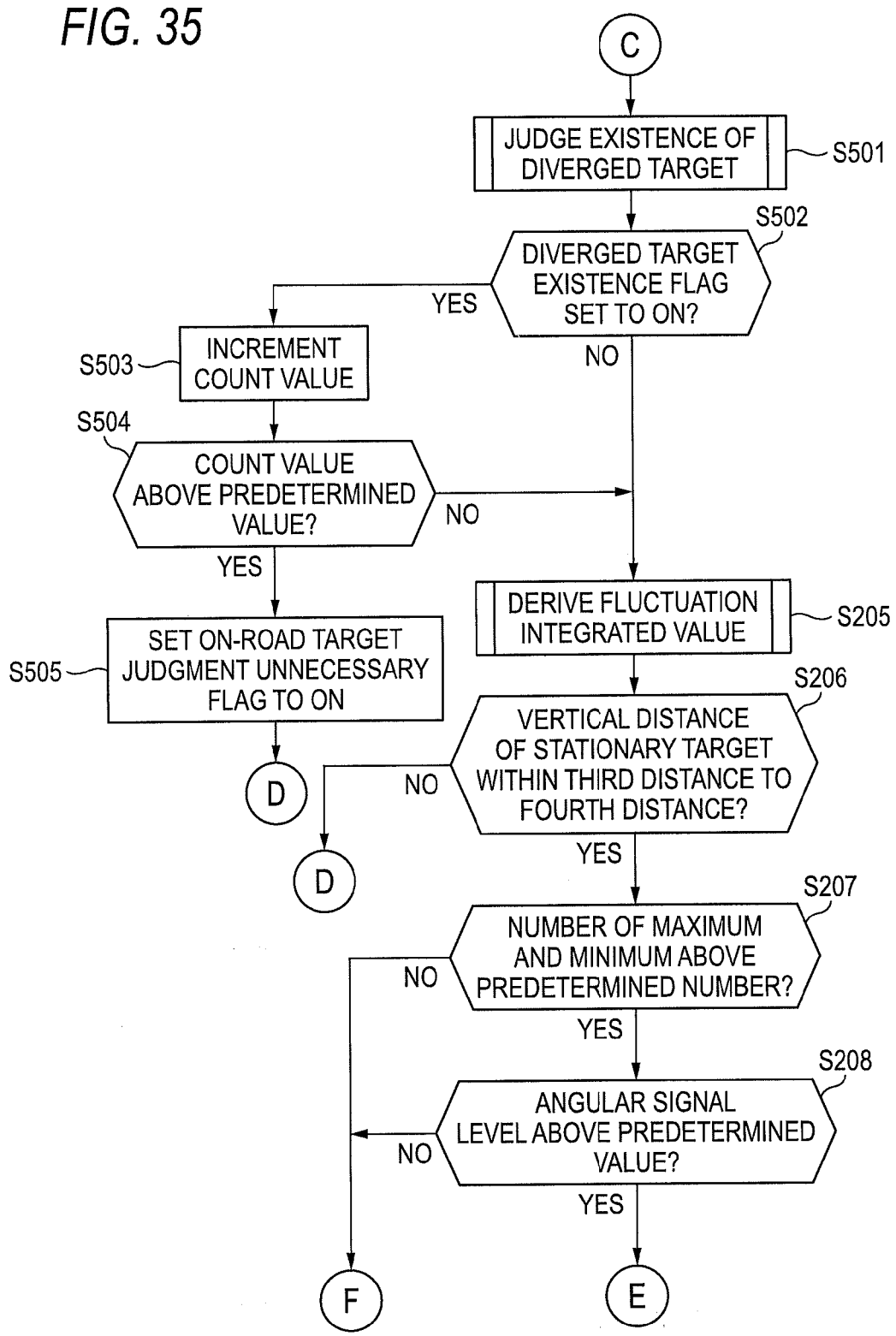
FIG. 35 is a flowchart of the on-road target judging process.
Figure 36:
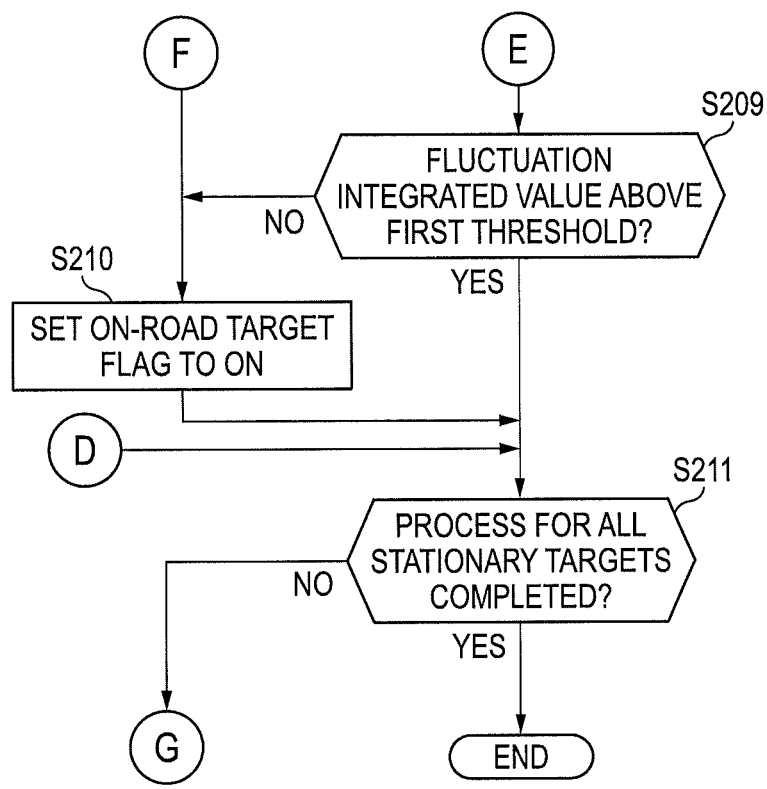
FIG. 36 is a flowchart of the on-road target judging process.

FIGS. 34 to 36 are flowcharts of the on-road target judging process. FIGS. 34 to 36 add the steps S601 and S602 which have been described in the fifth embodiment and a new step S701 to the flowcharts of FIGS. 19 to 21 which has been described in the fourth embodiment. Specifically, if the continuous stationary target exists, the signal processing unit 18 changes a threshold of the counter by which the process of judging the on-road target for the stationary target is executed when it is above the predetermined count value. For example, in a case where the threshold of the counter is set to 1 or more, the signal processing unit 18 changes the setting to 2 or more when the continuous stationary target exists. Since the condition of the diverged target for the reference target is satisfied by changing the threshold, even though the count value of the counter is incremented and thus the count value becomes 1, the process of judging the on-road target is continuously performed in the target deriving process after the next process. In other words, if the count value of the counter is 1, when the count value is incremented to be 2 or more in the next process, the signal processing unit 18 does not perform the on-road target judgment of the stationary target, in which the counter value becomes 2 in the target deriving process after the next process.

Explaining the sixth embodiment with reference to FIG. 31 which has been described in the fifth embodiment, the stationary target rf1 is the on-road target for the on-road object RF. However, if the stationary target corresponding to the wall WA exists in plural near the stationary target rf1, and the stationary target (e.g., stationary target w2) corresponding to the wall WA meets the condition of the diverged target for the stationary target rf1, the count value of the counter is incremented. As a result, the stationary target rf1 may be judged as the stationary target. For this reason, the judgment of the on-road target is correctly performed by increasing the threshold of the counter. Therefore, it is possible to prevent the mis-judgment which judges the stationary target other than the control subject as the stationary target to be controlled, irrespective of driving circumference of the vehicle.

In step S204 of FIG. 34, if the stationary target is below the second distance, the signal processing unit 18 derives a value of the signal level of the angular signal (step S204), and proceeds to the process of step S601. In the process of step S601, if the stationary target is below the second distance, the signal processing unit 18 derives a value of the signal level of the angular signal (step S204), and proceeds to the process of step S601. In this process, the signal processing unit 18 performs the process of deriving the continuous stationary target (step S601).

If the continuous stationary target exists (Yes in step S602), the signal processing unit 18 changes the judgment condition of the diverged target (step S701), and performs whether the diverged target exists or not (step S501 in FIG. 35). Specifically, the threshold of the counter is changed, for example, from 1 to 2 in the process of step S701. In this instance, if there is no continuous stationary target (No in step S602), the signal processing unit 18 judges whether the diverged target exists or not (step S501 in FIG. 35).

<Modification>

Hereinbefore, the embodiments of the present invention have been described. However, the present invention is not limited to those embodiments, and various modifications may be made. Hereinafter, such modifications will be described. On the other hand, all forms, including forms described in the above-described embodiments and forms to be described hereinafter, can be appropriately combined.

In the above embodiments, the angular direction estimation of the radar apparatus 1 has been described as the ESPRIT, but may use any one of algorithms such as DBF (Digital Beam Forming), PRISM (Propagator method based on an Improved Spatial-smoothing Matrix), and MUSIC (Multiple Signal Classification).

Further, in the above embodiments, the radar apparatus 1 may be used for various applications (e.g., at least any one of monitoring flying airplanes and sailing vessels).

Although the above embodiments has described that the method of integrating the fluctuation values is changed according to the vertical distance, a gyro sensor may be installed to the vehicle CR, and the method of integrating the fluctuation values may be changed in a case where the slope of the road surface on which the vehicle CR runs is varied, in addition to the vertical distance. Further, the vehicle CR may be provided with a navigation device to acquire location information of the vehicle CR, and the method of integrating the fluctuation values may be changed in a case where the position of the vehicle CR becomes a location where the slope of the road surface is changed.

In the above embodiments, a process of deriving the target existing at an upper position of the vehicle may be performed in the process of step S113, in addition to the on-road target. Specifically, it may to perform a process of deriving a stationary target (e.g., road sign of a cantilever type or gate type installed above the road) existing at a position (e.g., higher than a vehicular height of the vehicle CR) higher than a given height.

In the second embodiment, as the example in which the stationary target is easily judged as the target other than the control subject in the case where the moving target exists at the distance closer than the stationary target, it has been described that the threshold of the fluctuation integrated value is increased in the on-road target judging process. In addition to this, in a case where the moving target exists at the distance closer than the stationary target, the on-road target judging process may be stopped (canceled)

Further, in the fifth and sixth embodiments, if it is judged that the continuous stationary target exists, the process is performed under a condition in which the continuous stationary target exists during at least predetermined time (e.g., 1 sec). Accordingly, it is possible to prevent the judged result from being frequently changed.

In the sixth embodiment, the process (step S701) of changing the judgment condition has been described by change of the counter value of the counter, but the horizontal distance difference in the process of step S515 in FIG. 24 may be changed within a range from ±1.0 in to ±0.7 m. Therefore, in the case where a plurality of stationary targets which are the continuous stationary target exist near the stationary target to be controlled, the plurality of stationary targets are prevented from being judged as the diverged target belonging to the same object as the stationary target to be controlled.

Further, in the sixth embodiment, the process (step S701) of changing the judgment condition has been described by change of the counter value of the counter, but it is possible to increase the number of times taking moving-average of the signal levels of the angular signal illustrated in FIG. 9 (e.g., from twice to three times).

What is claimed is:

1. A radar apparatus capable of emitting a transmission wave relating to a transmitting signal which is frequency-modulated, and receiving a reflection wave coming from a target at which the transmission wave is reflected as a receiving signal, to derive at least position information of the target based on the receiving signal, the radar apparatus comprising:
a deriving unit configured to derive a plurality of fluctuation values of a signal level of the receiving signal for a stationary target among the targets;
a calculating unit configured to calculate a fluctuation integrated value by integrating the plurality of fluctuation values of the signal level of the receiving signal; and
a judging unit configured to judge the stationary target as a target other than a control subject if the fluctuation integrated value is below a predetermined threshold.

2. The radar apparatus according to claim 1, wherein the plurality of fluctuation values are derived from a maximum value and a minimum value of the signal level of the receiving signal.

3. The radar apparatus according to claim 2, wherein the deriving unit derives the plurality of fluctuation values from the maximum value to the minimum value if the stationary target exists at a position which is above a predetermined distance, and derives the plurality of fluctuation values from the minimum value to the maximum value if the stationary target exists at a position which is below the predetermined distance.

4. The radar apparatus according to claim 1, wherein the judging unit is configured to judge the stationary target as the target other than the control subject when a moving target exists at a distance closer than the stationary target.

5. The radar apparatus according to claim 1, wherein the calculating unit increases an integration rate of the plurality of fluctuation values when the signal level is high.

6. The radar apparatus according to claim 1, further comprising a target judging unit configured to judge, on the basis of comparison of horizontal and vertical distances between the stationary target and an other stationary target, whether or not the other stationary target is a diverged target belonging to the same object as the stationary target.

7. The radar apparatus according to claim 1, further comprising a continuous target judging unit configured to judge, on the basis of comparison of horizontal and vertical distances between the stationary target and an other stationary target, whether or not the stationary target and the other stationary target are a continuous stationary target which continuously exists in a traveling direction of a vehicle mounted with the radar apparatus at a side of a traffic lane on which the vehicle is traveling.

8. The radar apparatus according to claim 6, further comprising a continuous target judging unit configured to judge whether or not there is a continuous stationary target which continuously exists in a traveling direction of a vehicle mounted with the radar apparatus at a side of a traffic lane on which the vehicle is traveling,
wherein the target judging unit changes a judgment condition of the diverged target if the continuous stationary target exists.

9. A signal processing method of emitting a transmission wave relating to a transmitting signal which is frequency-modulated, and receiving a reflection wave coming from a target at which the transmission wave is reflected as a receiving signal, to derive at least position information of the target based on the receiving signal, the signal processing method comprising:
deriving a plurality of fluctuation values of a signal level of the receiving signal for a stationary target among the targets;
calculating a fluctuation integrated value by integrating the plurality of fluctuation values of the signal level of the receiving signal; and
judging the stationary target as a target other than a control subject if the fluctuation integrated value is below a predetermined threshold,
wherein the deriving, calculating and judging are performed by a processor.

10. The radar apparatus according to claim 3, wherein the predetermined distance is a predetermined vertical distance.

* * * * *